United States Patent
Hattori et al.

(10) Patent No.: US 6,447,979 B1
(45) Date of Patent: Sep. 10, 2002

(54) IMAGE RECORDING BODY

(75) Inventors: Ryoji Hattori; Shigehiro Kitamura; Hideki Takahashi; Seiji Hidaka, all of Hino (JP)

(73) Assignee: Konica Corporation, Tokyo (JP)

( * ) Notice: Subject to any disclaimer, the term of this patent is extended or adjusted under 35 U.S.C. 154(b) by 21 days.

(21) Appl. No.: 09/604,068

(22) Filed: Jun. 26, 2000

(30) Foreign Application Priority Data

Jun. 29, 1999 (JP) ............................................. 11-184270
Jun. 29, 1999 (JP) ............................................. 11-221573

(51) Int. Cl.$^7$ .......................... G03F 7/004; B32B 27/00
(52) U.S. Cl. ............................... 430/270.1; 430/286.1; 430/281.1; 428/448; 428/500; 428/915; 428/421
(58) Field of Search ................................... 428/141, 142, 428/448, 914, 915, 345, 500, 421; 430/272.1, 281.1, 286.1, 270.1

(56) References Cited

U.S. PATENT DOCUMENTS

| | | | | |
|---|---|---|---|---|
| 4,272,574 A | * | 6/1981 | Lippits et al. | 428/64 |
| 4,904,737 A | * | 2/1990 | Sato et al. | 525/286 |
| 5,679,440 A | * | 10/1997 | Kubota | 428/195 |
| 5,787,218 A | * | 7/1998 | Ohtaka et al. | 385/123 |

* cited by examiner

Primary Examiner—Rosemary Ashton
(74) Attorney, Agent, or Firm—Frishauf, Holtz, Goodman & Chick, P.C.

(57) ABSTRACT

A foil transferring a resin layer is disclosed. The foil comprises a support and a resin layer provided on the support, and a breaking elongation of the resin layer is 5 to 90 percent. An image recording body is also disclosed. The image recording body comprises a support, an image recording layer and an actinic light-hardened resin layer forming outermost layer and a breaking elongation of the actinic light-hardened resin layer is 5 to 90 percent.

20 Claims, 20 Drawing Sheets

OPTICAL VARIABLE DEVICE TRANSFER FOIL 43

IMAGE AREA A

AREA B OTHER THAN SAID AREA

AREA D OTHER THAN SAID AREA

43

PART C IN THE WIDTH DIRECTION

IMAGE RECORDING BODY

FIELD OF THE INVENTION

The present invention relates to an image recording body and a transfer foil which are suitably applied to a contact- or non-contact type electronic or magnetic card, sheet, and the like, which store personal information and the like for which security is demanded to prevent forgery, altetration and the like.

BACKGROUND OF THE INVENTION

In recent years, contact- or non-contact-type electronic or magnetic cards, and the like, have increasingly been issued in the field of service industry such as banks, business organizations, educational institutions, public agencies, and the like. Personal information such as a portrait, a name, and the like, is recorded on image recording bodies such as cash cards, employee cards, company membership cards, membership cards, student cards, aliens registration cards, various types of license cards, and the like, which are employed in various fields. Accordingly, these cards are subjected to security treatment so that forgery as well as altetration is not readily carried out.

For example, a hologram layer is provided onto a card substrate and a special image is formed so that a portrait, a name, issue date, and the like are not readily imitated. Said image is generally called a diffraction grating image or athologram image. Said hologram image is formed employing interference infringes obtained by overlapping waves which are reflected from a body or transmitted through a body with the reference waves. By employing said hologram image, the image of the body is stereoscopically reproduced. The surface of the hologram layer is covered with a protective sheet having high light transmission. Employed as said protective sheet are transparent resins and the like which are employed for lamination, and the hologram layer, which exhibits less strength than the card substrate, is covered with the protective sheet and thereby protected.

Heretofore, frequently employed as transparent resins for protective layers, as well as protective sheets, are actinic light-hardened resins. Actinic light-hardened resins, especially ultraviolet radiation-hardened resins, are mainly divided into two types, that is, cation polymerization type resins and radical polymerization type resins. In the cation polymerization type resins, compounds, which exhibit strong stimuli to human body and pollute the environment, have frequently been employed as polymerization initiators. Accordingly, the radical polymerization type resins have preferably been employed in many cases. However, the protective layer comprised of the radical polymerization type actinic light-hardened resins is excessively hard and has had problems in which abrasion is readily caused, and images such as portraits, and the like recorded on an image recording body are not recognizable. On the other hand, a protective layer comprised of the cation polymerization type actinic light-hardened resins is relatively soft in most cases. However, such protective layer is too soft and has also had problems in which abrasion is readily caused.

SUMMARY OF THE INVENTION

The inventors of the present invention have diligently investigated the problems and have discovered that in order to clarify the ease of abrasion, a parameter, designated as breaking elongation, plays a big role. It has been found that the radical polymerization type actinic light-hardened resins, which are excessively hard and are readily abraded, have a breaking elongation of 1 to 2 percent, while the cation polymerization type actinic light-hardened resins, which are too soft and are readily abraded, have a breaking elongation of at least 150 percent.

Accordingly, it is an object of the present invention to obtain an actinic light-hardened resin layer which is neither too hard nor too soft and tends not to suffer abrasion, while paying attention to the parameter designated as breaking elongation. Further, it is another object of the present invention to obtain an abrasion resistant resin layer, as well as a protective layer in addition to the protective layer comprised of an actinic light-hardened resin, and a protective layer employed only to protect the hologram.

The radical polymerization type actinic light-hardened resin layer is preferred environmentally. However, as described above, many of them are very hard, and thus it has been difficult to obtain a resin layer having breaking elongation in the range of the present invention. Accordingly, it is still another object of the present invention to obtain a radical polymerization type actinic light-hardened resin layer which has suitable breaking elongation and is preferred environmentally.

Further, heretofore, when the actinic light-hardened resin layer is provided on an image recording body, a common method has been one in which an actinic light-hardened resin coating composition is directly applied onto said image recording body which has been subjected to image recording, and thereafter actinic light-hardened resin layer is provided by hardening said layer, being subjected to actinic light exposure. However, when such a method is employed, problems have occurred in which the resulting image is not clearly seen due to the non-uniformity of the surface on account of non-uniform coating, the resulting appearance is not preferred due to a slightly yellow-tinted protective layer, and the like.

Thus, the inventors of the present invention have diligently investigated the problems and discovered the following. When a transfer foil is employed which is comprised of an actinic light-hardened resin layer which has been subjected to hardening, employing actinic light exposure, and exhibits breaking elongation in the range of the present invention, it is possible to obtain an image recording body which exhibits excellent transferability, surface properties, and abrasion resistance while transferring the actinic light-hardened resin layer onto the image recording body which has been subjected to image recording. Further, it has been found that compared to the coating method, the transfer method exhibits advantages in which the protective layer may be provided at high speed and maintainability is improved.

Accordingly, it is a further object of the present invention to obtain a resin layer (a protective layer) transfer foil which makes it possible to obtain an image recording body which is readily transferred, and further exhibits excellent surface properties as well as excellent abrasion resistance.

Further, a precaution is required to minimize blocking of the transfer foil when wound in a roll and stored for an extended period of time. Namely, it is a still further object of the present invention to minimize blocking of the transfer foil.

Further, according to the production method of cards using the conventional system, for instance, a laminate film and a hologram sheet are separately formed, and after passing through a laminating process, the extra laminate film is trimmed. Excellent forgery preventing functions are particularly demanded for photo-bearing company membership cards, driver's license cards, and the like, and further, demanded are excellent surface protective properties, surface abrasion resistance, as well as excellent design properties and identification properties.

The present invention was achieved to solve the aforementioned problems. It is a still further object of the present invention to provide an image recording body as well as an optical variable device transfer foil which exhibits excellent forgery inhibiting functions, excellent surface protection properties, excellent surface abrasion resistance, extreme difficulty for non-detectable forgery as well as altetration, and further, design properties, and identification properties.

In order to solve the aforementioned problems as well as to achieve objects, the present invention is embodied as described below.

(1) A foil transferring a resin layer comprising a support and an actinic light-hardened resin layer which is transferred, wherein a breaking elongation of the actinic light-hardened resin layer is 5 to 90 percent.

(2) The foil described in (1) wherein the actinic light-hardened resin layer is a UV-hardened resin layer.

(3) The foil described in (1) wherein the actinic light-hardened resin layer comprises an unsaturated group containing resin having an average molecular weight of 5,000 to 50,000.

(4) The foil described in (1) wherein wherein the actinic light-hardened resin layer comprises a compound composed of a monomer having ethylenic unsaturated group or an oligomer having ethylenic unsaturated group.

(5) The foil described in (1) wherein the actinic light-hardened resin layer comprises a non-hardened resin.

(6) The foil described in (1) wherein a surface static friction coefficient of the actinic hardened resin layer is 0.01 to 0.5.

(7) The foil described in (6) wherein the actinic hardened resin layer comprises a silicon or fluorine compound.

(8) The foil described in (7) wherein the silicon or fluorine compound contains an unsaturated group containing silicon or fluorine compound.

(9) The foil described in (6) wherein the actinic light-hardened resin layer comprises a coupling agent.

(10) The foil described in (1) comprising a release layer and an adhesive layer wherein the actinic hardened resin layer is provided on the release layer.

(11) The foil described in (1) wherein at least one side of the support having a central line average roughness (Ra) of 0.05 to 0.5 $\mu$m.

(12) The foil described in (11) wherein the side of the support having a central line average roughness (Ra) of 0.05 to 0.5 $\mu$m is a side on which the actinic light-hardened resin layer is not provided.

(13) An image recording body comprising a support, an image recording layer and an actinic light-hardened resin layer forming outermost layer, wherein a breaking elongation of the actinic light-hardened resin layer is 5 to 90 percent.

(14) The image recording body described in (13) wherein the actinic light-hardened resin layer is a UV-hardened resin layer.

(15) The image recording body described in (13) wherein the actinic light-hardened resin layer comprises an unsaturated group containing resin having an average molecular weight of 5,000 to 50,000.

(16) The image recording body described in (13) wherein the actinic light-hardened resin layer comprises a compound composed of a monomer having ethylenic unsaturated group or an oligomer having ethylenic unsaturated group.

(17) The image recording body bed in (13) comprising two actinic light-hardened resin layers.

(18) The image recording body bed in (13) comprising optical variable device layer.

(19) The image recording body bed in (13) wherein the actinic light-hardened resin layer is transferred from the foil transferring a resin layer.

(20) An image recording body characterized in that a transparent protective layer and/or an optical variable device layer is provided on an image recording layer, on which an actinic light-hardened resin layer, having a breaking elongation in the range of 5 to 90 percent, is provided.

(21) An image recording body characterized in that a transparent protective layer and/or an optical variable device layer is provided on an image recording layer, on which an actinic light-hardened resin layer, having a surface static friction coefficient in the range of 0.01 to 0.5, is provided.

(22) The image recording body of (20) or (21), characterized in that said actinic light-hardened resin layer comprises a non-hardened resin.

(23) The image recording body of (20) or (21), characterized in that said actinic light-hardened resin layer comprises an unsaturated group containing resin having an average molecular weight of 500 to 50,000.

(24) The image recording body of (20) or (21), characterized in that said actinic light-hardened resin layer comprises a silicon or fluorine compound containing resin.

(25) The image recording body of (24), characterized in that said Silicon or fluorine compound comprises an unsaturated group containing a Silicon or fluorine compound containing resin.

(26) The image recording body of (20) or (21), characterized in that said actinic light-hardened resin layer comprises a coupling agent.

(27) A preparation method for an image recording body characterized in that after providing the actinic light-hardened resin layer described in any one of (20) through (26), exposure is carried out employing actinic light, whereby a hardened layer is formed.

(28) A preparation method for an image recording body characterized in that a transparent protective layer and/or an optical variable device layer is provided on an image recording layer, on which the actinic light-hardened resin layer, described in any one of (20) through (26), is provided; thereafter, exposure is carried out employing actinic light; and a hardened layer is formed.

(29) A transfer foil characterized in that a resin layer having breaking elongation in the range of 5 to 90 percent is provided on the side having releasability of a releasable support.

(30) A transfer foil characterized in comprising a resin layer having a surface static friction coefficient in the range of 0.01 to 0.5 on the side having releasability of a releasable support.

(31) The transfer foil of (29) or (30), characterized in that said resin layer is comprised of at least one actinic light-hardened resin layer.

(32) The transfer foil described in any one of (29) through (31), characterized in that said resin layer comprises a non-hardenable.

(33) The transfer foil described in any one of (29) through (31), characterized in that said resin layer comprises an unsaturated group containing resin having an average molecular weight of 5,000 to 50,000.

(34) The transfer foil described in any one of (29) through (32), characterized in that said resin layer comprises a silicon or fluorine compound.

(35) The transfer foil of (34), characterized in that said silicon or fluorine compound comprises an unsaturated group containing a silicon or fluorine compound.

(36) The transfer foil described in any one of (29) through (32), characterized in that said resin layer comprises a coupling agent.

(37) The transfer foil described in any one of (29) through (36), characterized in that after forming said resin layer, an interlayer and an adhesive layer are successively provided.

(38) The transfer foil described in any one of (29) through (36), characterized in that after forming said resin layer, an optical variable device layer, an interlayer, and an adhesive layer are successively provided.

(39) An preparation method for an image recording body characterized in that said transfer foil is transferred to an adherend.

(40) A preparation method for an image recording body characterized in that the transfer foil described in (37) is transferred to an adherend which has been subjected to transfer of a transparent protective layer and/or an optical variable device layer onto an image recording layer.

(41) A preparation method for an image recording body characterized in that after applying the actinic light-hardened layer described in any one of (31) through (39) onto the side having releasability of a releasable support, a hardened layer is formed through exposure of actinic light, and thereafter interlayer and an adhesive layer are successively provided.

(42) A preparation method for an image recording body characterized in that after applying the actinic light-hardened layer of (38) onto the side having releasability of a releasable support, a hardened layer is formed through exposure of actinic light, and thereafter optical variable device layer, an interlayer, and an adhesive layer are successively provided.

(43) A preparation method for an image recording body characterized in that after applying the actinic light-hardened layer of (38) onto the side having releasability of a releasable support, a hardened layer is formed through exposure of actinic light, and thereafter adhesive layer, an optical variable device layer, an interlayer, and an adhesive layer are successively provided.

(44) "A preparation method for an image recording body characterized in that a transfer foil, produced employing the production method for a transfer foil described in any one of (41) through (43), is transferred to an adherend."

(45) A preparation method for an image recording body characterized in that a transfer foil produced employing the production method for a transfer foil described in any one of (41) through (43) is transferred to an adherend which has been subjected to transfer of an optical variable device layer.

(46) A preparation method for an image recording body characterized in that the interlayer, described in (37), (38), (41), and (43), comprises at least either polyvinyl butyral resins or polybutyral thermally hardened resins having a degree of polymerization of at least 1,000, and an adhesive layer comprises at least both urethane-modified ethylene-ethyl acrylate copolymers and polyacrylic acid ester copolymers.

(47) A preparation method for an image recording body characterized in that the interlayer of (44) or (45) comprises at least either polyvinyl butyral resins or polybutyral thermally hardened resins having a degree of polymerization of at least 1,000, and an adhesive layer comprises at least both urethane-modified ethylene ethyl acrylate copolymers and polyacrylic acid ester copolymers.

(48) A transfer foil characterized in that a support is employed which has a central line average roughness (Ra) in the range of 0.05 to 0.5 μm on one surface.

(49) In a transfer file in which a transfer layer is provided on a support, a transfer foil characterized in that a support is employed which has a central line average roughness (Ra) in the range of 0.05 to 0.5 μm on the surface which is not yet subjected to transfer.

(50) A transfer foil roll characterized in that the winding tension applied to a core for a transfer foil of (48) or (49) is in the range of 0.6 to 7 kg.

(51) The transfer foil described in any one of (29) through (38), (48) and (49), characterized in that a support is employed which has a central line average roughness (Ra) in the range of 0.05 to 0.5 μm on one side surface.

(52) A transfer foil roll in (51), characterized in that winding tension applied to a core for a transfer foil is in the range of 0.6 to 7 kg.

(53) In an image recording body comprising a support having thereon an information bearing layer, which bears at least one item of identification information or bibliographical information, and also an optical variable device layer, and a protective layer, an image recording body characterized in that the frequency and/or the depth of marking on said optical variable device is at least continuous at connections of cycles of a marking pattern.

(54) In an image recording body comprising a support having thereon an information bearing layer, which bears at least one item of identification information or bibliographical information, and also an optical variable device layer, and a protective layer, an image recording body characterized in that reflected wavelengths, when observed from a specified angle toward markings on said optical variable device, is continuous at the cyclic portion of a marking pattern.

(55) In an image recording body comprising a support having thereon an information bearing layer, which bears an image region having gradations as well as bibliographical information, an optical variable device layer, and a protective layer, an image recording body characterized in that said optical variable device layer is subjected to less optical conversion effects on said image region mainly comprised of a portrait than those on other regions.

(56) In an image recording body comprising a support having thereon an information bearing layer, which bears an image region having gradations as well as bibliographical information, an optical variable device layer, and a protective layer, an image recording body characterized in that the entire area of either a layer of the side of said image recording body or a layer on the surface side, or a portion corresponding to the continuation of cycles of a marking pattern on said optical variable device layer, has a layer which has unevenness or different light transmittance or said layer is located so as to partially cover the image region as well as the bibliographical information.

(57) In an image recording body comprising a support having thereon an information bearing layer, which bears identification information as well as bibliographical information, an optical variable device layer, and a protective layer, an image recording body characterized in that the ratio of the refractive index of said optical variable device layer to that of said protective layer is at least 0.8 and no more than 1.2.

(58) In an image recording body comprising a support having thereon an information bearing layer, which bears identification information as well as bibliographical information, an optical variable device layer, and a protective layer, an image recording body characterized in that the ratio of the linear thermal expansion coefficient of said optical variable device layer to that of said protective layer is at least 0.5 and no more than 2.0.

(59) An image recording body described in any one of (53) through (58), characterized in that said protective layer is a transparent hardenable protective layer hardened employing actinic light.

(60) An image recording body described in any one of (53) through (58), characterized in that said optical variable device layer is a hologram, a diffraction grating, an uneven relief body.

(61) An optical variable device transfer foil characterized in that a transfer foil comprises a support having thereon at least an optical variable device layer and an adhesive layer, said transfer foil is wound in a roll, and the frequency and/or the depth of marking on said optical variable device layer is continuous at connections of cycles of marking pattern in the foil length direction.

(62) An optical variable device transfer foil characterized in that a transfer foil comprises a support having thereon at least an optical variable device layer and an adhesive layer, said transfer foil is wound on a roll, and the reflected wavelengths when observed from a specified angle to marking on said optical variable device layer is continuous at connections of cycles of a marking pattern.

(63) An optical variable device transfer foil characterized in that a transfer foil comprises a support having thereon at least an optical variable device layer and an adhesive layer, said transfer foil is wound in a roll, and optical conversion effects in parts across the width is less than those in other regions and the part having said less optical conversion effects is overlapped with the image region after transfer.

(64) An optical variable device transfer foil described in any one of (61) through (66), characterized in that said protective layer is a transparent hardenable protective layer which has been hardened employing actinic light.

(65) An optical variable device transfer foil described in any one of (61) through (66), characterized in that between said support and said optical variable device layer, a release layer and a protective layer are provided in said order, and said protective layer is hardened employing actinic light.

(66) An optical variable device transfer foil described in any one of (61) through (65), characterized in that said optical variable device layer is a hologram, a diffraction grating, a uneven relief body.

(67) A preparation method for an image recording body characterized in that on a support, an information bearing layer, which bears at least one item of identification information or bibliographical information, is provided; an optical variable device layer, in which the frequency and/or the depth of markings on said image bearing layer is continuous at connections of cycles of marking pattern, is provided, and on said optical variable device layer, a protective layer is provided.

(68) A preparation method for an image recording body characterized in that on a support, an information bearing layer, which bears at least one item of identification information or bibliographical information, is provided; on said information bearing layer, an optical variable device layer, in which the reflected wavelengths when observed from a specified angle toward markings on said optical variable device layer is continuous at connections of cycles of a marking pattern, and on said optical variable device layer, a protective layer is provided.

(69) A preparation method for an image recording body characterized in that on a support, an information bearing layer, which bears at least one item of identification information or bibliographical information, is provided; on said information bearing layer, an optical variable device layer, in which the reflected wavelengths when observed from a specified angle toward markings on said optical variable device layer is continuous at connections of cycles of a marking pattern, and on said optical variable device layer, a protective layer is provided.

(70) A preparation method for an image recording body characterized in that on a support, an information bearing layer, which bears at least one item of identification information or bibliographical information, is provided; on said information bearing layer, an optical variable device layer is provided in a roll shape, in which optical conversion effects in parts across the width are less than those in other regions, and the part having said fewer optical conversion effects is overlapped with the image region after transfer, and on said optical variable device layer, a protective layer is provided.

(71) A preparation method for an image recording body described in any one of (67) through (70), characterized in that said protective layer is a transparent hardenable protective layer which has been hardened employing actinic light.

(72) A preparation method for an image recording body characterized in that said optical variable device layer is a hologram, a diffraction grating, a uneven relief body.

By employing the image recording body, the transfer foil, the preparation method of the image recording body, and the preparation method of the transfer foil of the present invention, security such as prevention for forgery, alliteration, and the like is enhanced, and scratch resistance is also enhanced, compared to the conventional methods. Thus it is possible to minimize abrasion as well as wrinkling.

Further, when the transfer foil is wound on a roll, blocking properties during storage for an extended time of period are improved, and it is also possible to minimize adhesion.

DETAILED DESCRIPTION OF THE PREFERRED EMBODIMENTS

Figure 1:
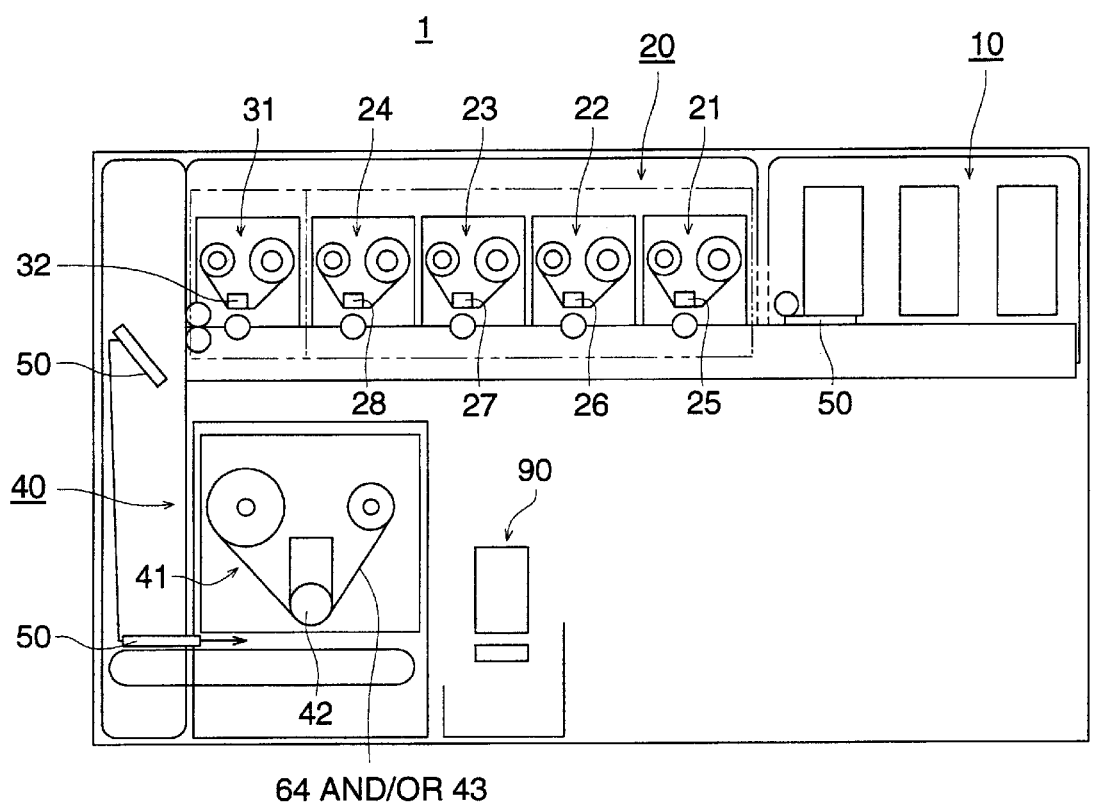
FIG. 1 is a schematic structural view showing an image recording body preparation apparatus of the first embodiment.
Figure 2:
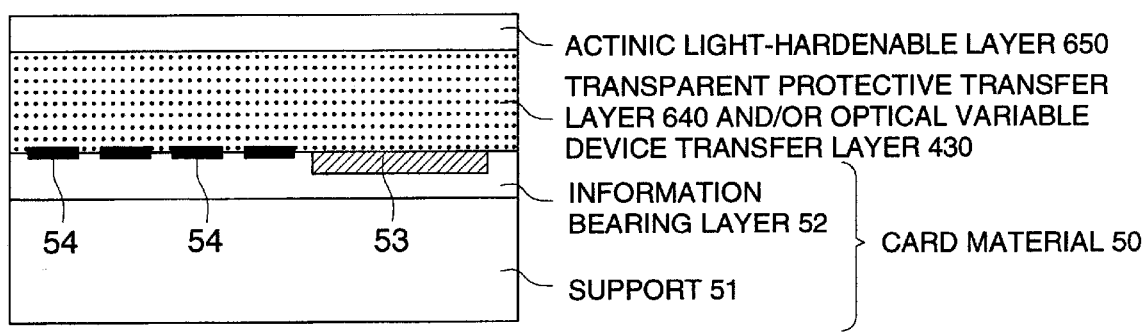
FIG. 2 is a view showing a layer structure of an image recording body.

The embodiments of the image recording body, the transfer foil, the transfer foil roll, the preparation method of the image recording body, and the production method for the transfer foil of the present invention will now be described below with reference to the drawings. However, the present invention is not limited to these embodiments, description and drawings. First, FIGS. 1 and 2 show an image recording body preparation apparatus of the first embodiment. FIG. 1 is a schematic structural view of the image recording body preparation apparatus, while FIG. 2 is a view showing the layer structure of an image recording body.

In image recording body preparation apparatus 1 in the present embodiment, card material supply section 10 and information recording section 20 are arranged at an upper position, and protection-providing section and/or optical variable device providing section 40, actinic light-hardened layer providing section and/or actinic light irradiating section 90 are arranged at a lower position. Apparatus 1 is capable of preparing cards as well as sheets as the image recording body.

In card material supplying section 10, in order to write personal information of a card user, a plurality of previously cut sheets of card material 50 are stored while the surface on which a portrait is recorded faces upward. In the present example, card material 50 is comprised of support 51 and information bearing layer 5. Each sheet of said card material 50 is automatically supplied at predetermined timing from card material supplying section 10.

In information recording section 20, yellow ribbon cassette 21, magenta ribbon cassette 22, cyan ribbon cassette 23, and black ribbon cassette 24 are arranged, and recording heads 25 through 28, corresponding to each ribbon cassette, are arranged. While the card material 50 is being conveyed, an images with gradation, such as the portrait of a card user, and the like, are recorded on image region 53 through thermal transfer employing thermal transfer sheets such as a yellow ribbon, magenta ribbon, cyan ribbon, and the like. Further, text ribbon cassette 31 and recording head 32 are arranged, and identification information 54 is recorded through thermal transfer employing a text ribbon and the like. Thus, an image recording layer is formed.

In the protection providing section and/or the optical variable device providing section 40, transfer foil cassette 41 is arranged and thermal transfer head 42 is arranged corresponding to said transfer foil cassette 41. Transparent protective transfer foil 64 and/or optical variable device transfer foil 43 is thermally transferred and transparent protective transfer layer 640 and/or optical variable device transfer layer 430 is provided.

Thereafter actinic light-hardened layer 650 is coated employing actinic light-hardened layer providing section and/or actinic light irradiating section 90, and exposure is carried out employing actinic light. The layer structure of the image recording body as structured in FIG. 2 is then obtained, and actinic light-hardened layer 650 is provided on transparent protective transfer layer 640 and/or optical variable device transfer layer 430.

It is extremely preferable to provide the actinic hardened layer whereby resistance to chemicals improves markedly.

Figure 3:
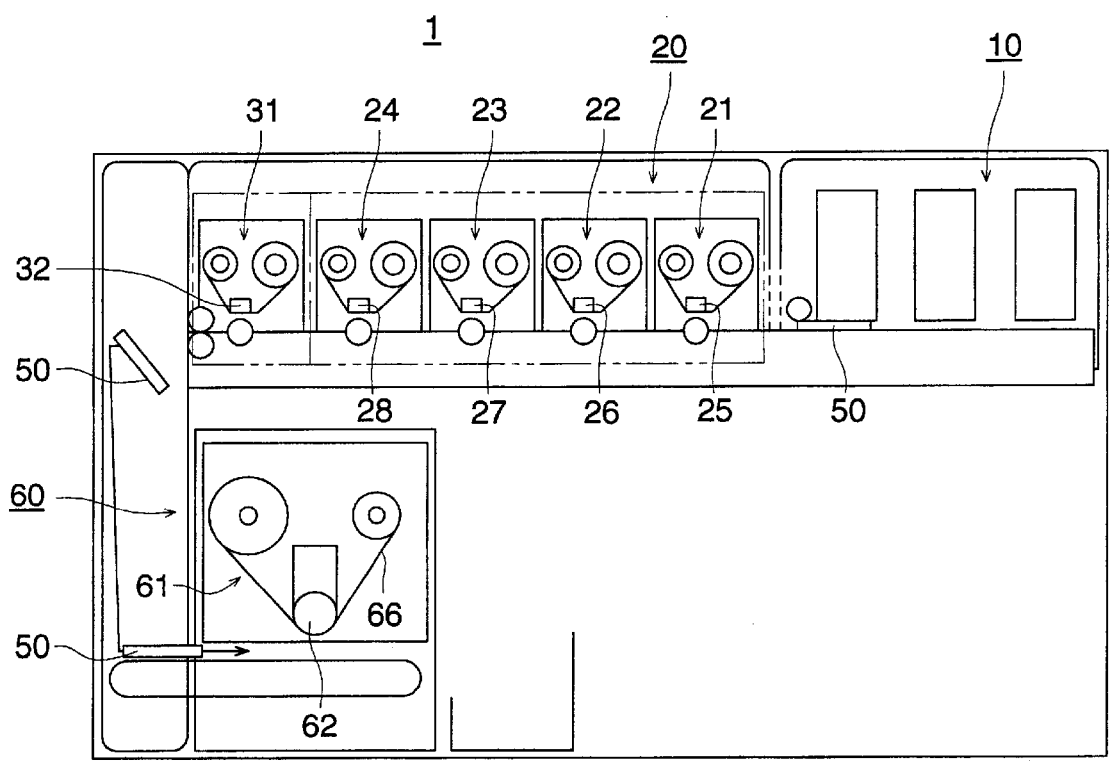
FIG. 3 is a schematic structural view showing an image recording body preparation apparatus of the second embodiment.
Figure 4:
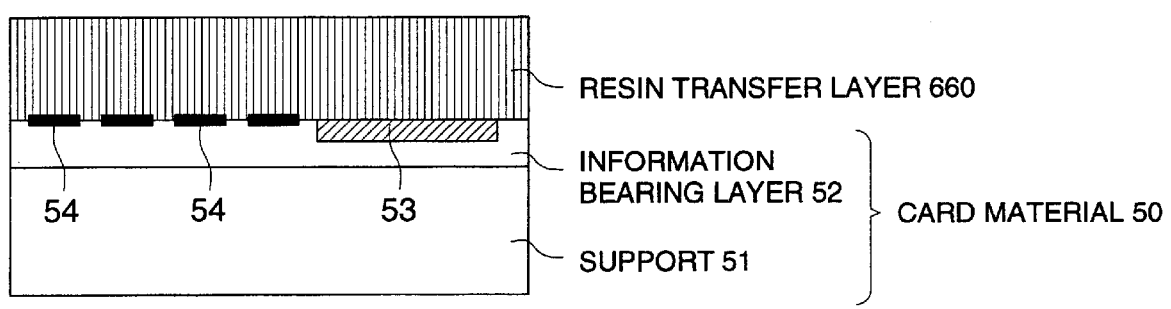
FIG. 4 is a view showing a layer structure of an image recording body.

Next, FIGS. 3 and 4 show an image recording body preparation apparatus of the second embodiment. FIG. 3 is a schematic structural view of said image recording body preparation apparatus, and FIG. 4 shows the layer structure of said image recording body.

In image recording body preparation apparatus 1 of this embodiment, card supplying section 10 as well as image recording section 20 is constituted in the same manner.

However, resin providing section 60 is arranged following information recording section 20.

In resin providing section 60, transfer foil cassette 61 is arranged, and thermal transfer head 62, corresponding to said transfer foil cassette 61, is arranged. Resin transfer foil 66 is placed in transfer foil cassette 61, and resin transfer layer (resin layer) 660 is provided upon transferring of said resin transfer foil 66. Further, said resin layer may be an actinic light-hardened resin layer.

Figure 5:
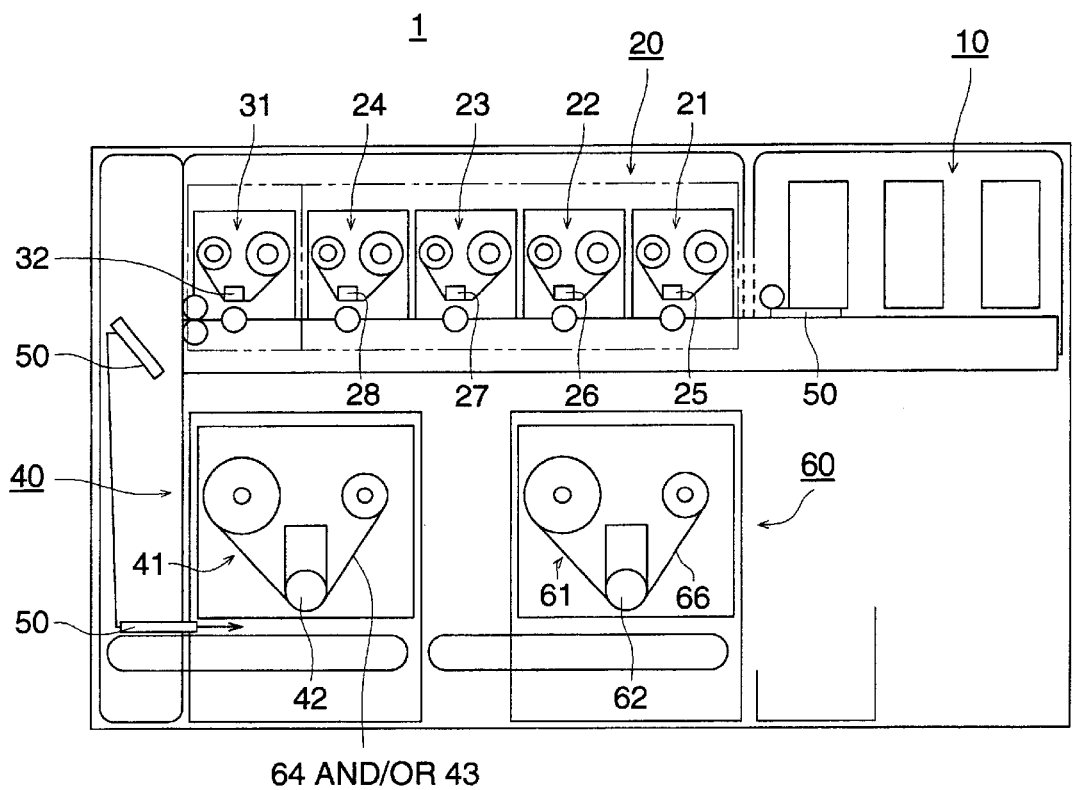
FIG. 5 is a schematic structural view showing an image recording body preparation apparatus of the third embodiment.
Figure 6:
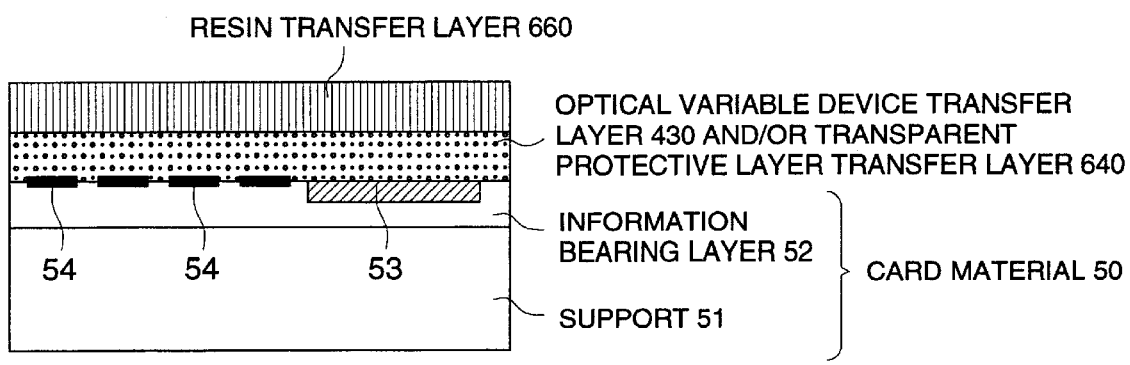
FIG. 6 is a view showing a layer structure of an image recording body.

Next, FIGS. 5 and 6 show the image recording body preparation apparatus of the third embodiment. FIG. 5 is a schematic structural view of said image recording body preparation apparatus, and FIG. 6 shows the layer structure of an image recording body.

In image recording body preparation apparatus 1 of this embodiment, card supplying section 10 as well as image recording section 20 is constituted in the same manner. However, protection providing section and/or optical variable device providing section 40 and resin providing section 60 is arranged following information recording section 20.

In protection providing section and/or optical variable device providing section 40, transparent protective transfer layer 640 and/or optical variable device transfer layer 430 are/is provided. In resin providing section 60, resin transfer foil 66 is thermally transferred onto an image recording body comprised of transparent protective transfer layer 640 and/or optical variable device layer 430 on information bearing layer 52. Thus resin transfer layer (resin layer) 660 is provided. Further, said resin layer may be an actinic light-hardened resin layer.

Figure 7:
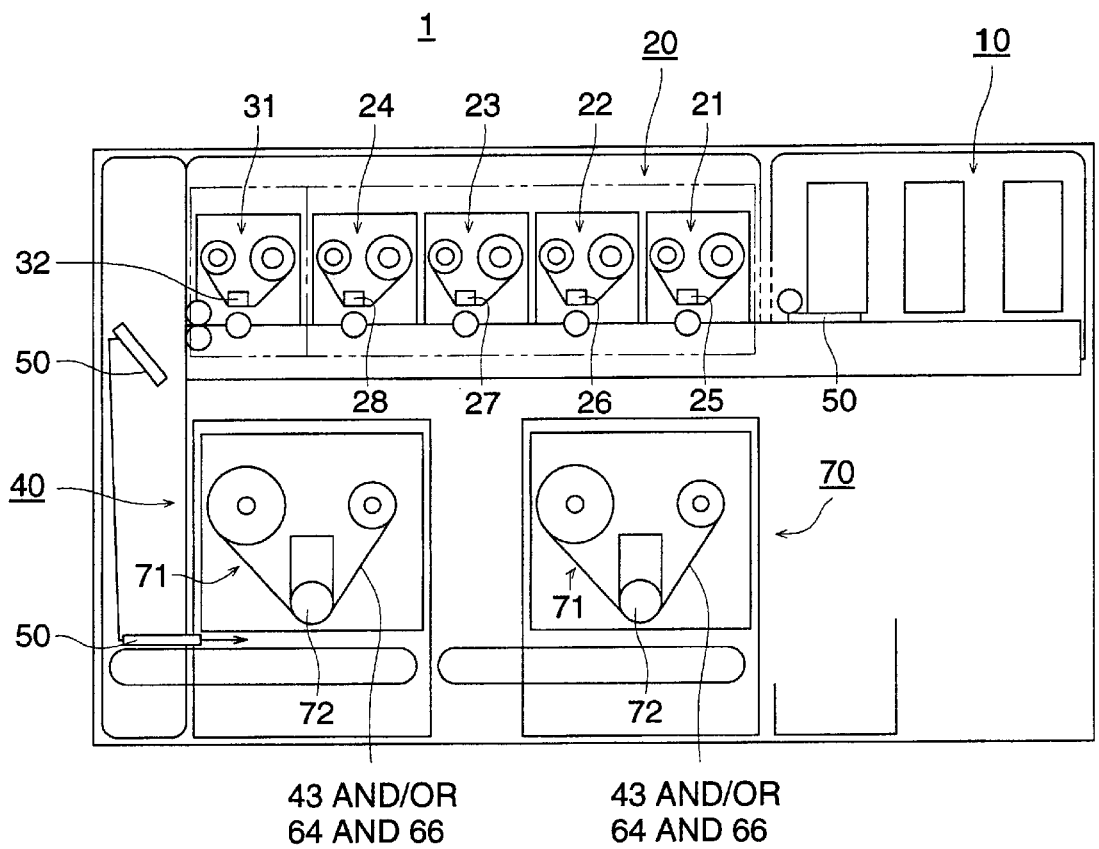
FIG. 7 is a schematic structural view showing an image recording body preparation apparatus of the fourth embodiment.
Figure 8:
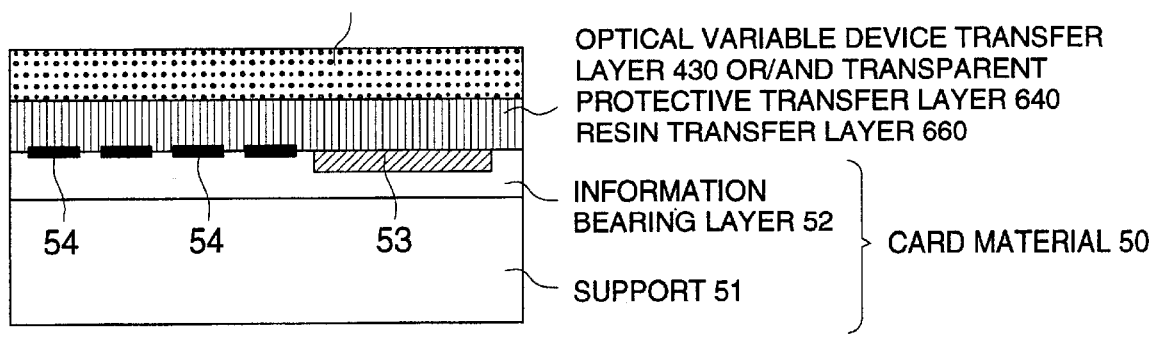
FIG. 8 is a view showing a layer structure of an image recording body.

Next, FIGS. 7 and 8 show the image recording body preparation apparatus of the fourth embodiment. FIG. 7 is a schematic structural view of said image recording body preparation apparatus, and FIG. 8 shows the layer structure of an image recording body.

In image recording body preparation apparatus 1 of this embodiment, card supplying section 10 as well as image recording section 20 is constituted in the same manner. However, transparent protective layer and/or optical variable device transfer layer providing section/or resin layer providing section 70 is arranged, and thereafter other transparent protective layer and/or optical variable device transfer layer providing section/or resin layer providing section 70 is also arranged. Further, either the transparent resin layer or resin layer may be an actinic light-hardened resin.

In transparent protective layer and/or optical variable device transfer layer providing section/or resin layer providing section 70, transfer foil cassette 71 is arranged, and thermal transfer head 72 corresponding to said transfer foil cassette 71 is arranged. Optical variable device transfer foil 43 and/or transparent protective transfer foil 64 and resin transfer foil 66 are transferred, and optical variable device transfer layer 430 and/transparent protective transfer layer 640 and resin transfer layer 660 are provided. Namely, in the present embodiment, two identical transparent protective transfer layers may be piled, and two identical resin transfer layers may be piled. Further, two identical optical variable device transfer layers may be piled, and two layers may be different from each other. When two layer are piled, the thickness of each layer is preferably between 0.1 and 10 μm, and is more preferably between 1 and 8 μm. The preferable way furthermore is to transfer both of two actinic light-hardened layers respectively.

Figure 9:
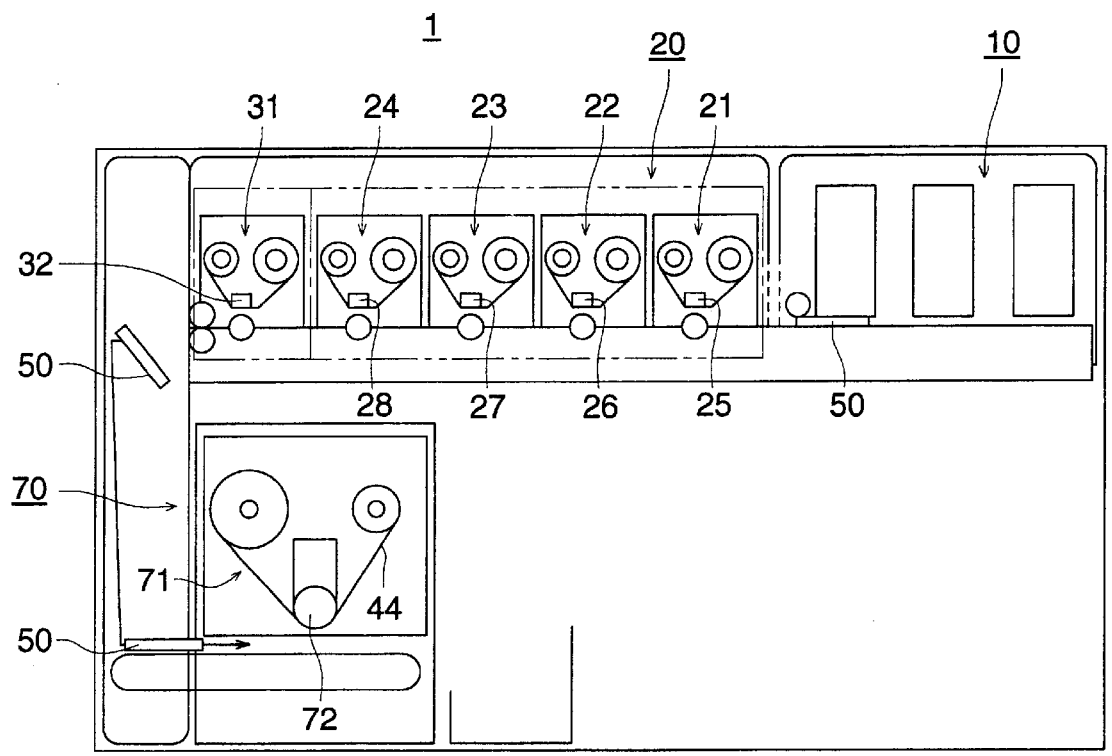
FIG. 9 is a schematic structural view showing an image recording body preparation apparatus of the fifth embodiment.
Figure 10:
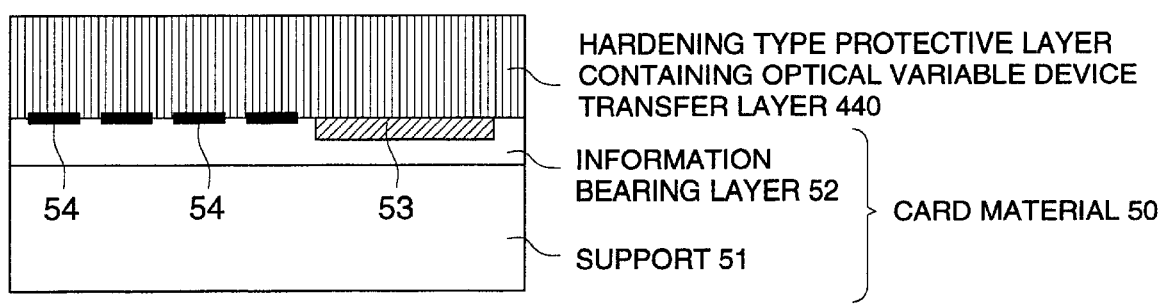
FIG. 10 is a view showing a layer structure of an image recording body.

Next, FIGS. 9 and 10 show the image recording body preparation apparatus of the fourth embodiment. FIG. 9 is a schematic structural view of said image recording body preparation apparatus, and FIG. 10 shows the layer structure of an image recording body.

In image recording body preparation apparatus 1 of this embodiment, card supplying section 10 as well as image recording section 20 is constituted in the same manner. However, transparent protective layer and/or optical variable device transfer layer providing section/or resin layer providing section 70 is arranged.

In transparent protective layer and/or optical variable device transfer providing section/or resin layer section 70, transfer cassette 71 is also arranged, and thermal transfer head 72 corresponding to said transfer foil cassette 71 is arranged. Hardenable type resin-containing optical variable device transfer foil 44 is transferred and hardenable type resin-containing optical variable device transfer layer 440 is provided. Further, said hardenable type resin-containing optical variable device transfer layer 440 may be regarded as a resin layer, as an actinic light hardened resin layer, or as an optical variable device layer.

The transparent protective transfer foil, as described in the present invention, means a transparent protective foil which protects an image, and the transparent protective layer, as described herein, means a layer comprised of a resin in which the breaking elongation as well as the friction coefficient of the present invention is specified. Further, the actinic light-hardened resin layer as described herein is one of several types of resin layers, which is the preferred embodiment in the present invention. However, as shown in FIGS. 1 and 2, occasionally, it is limited to a resin layer due to its production. The hardenable type resin-containing optical variable device layer, as described herein, means a layer in which a hardenable layer and an optical variable device layer are integrated. Further, the protection providing transfer foil, as described herein, means a transfer foil comprising at least one resin layer (preferably, comprised of an actinic light-hardened resin). Still further, said resin layer is preferably provided on the entire surface of the card.

Figure 11:
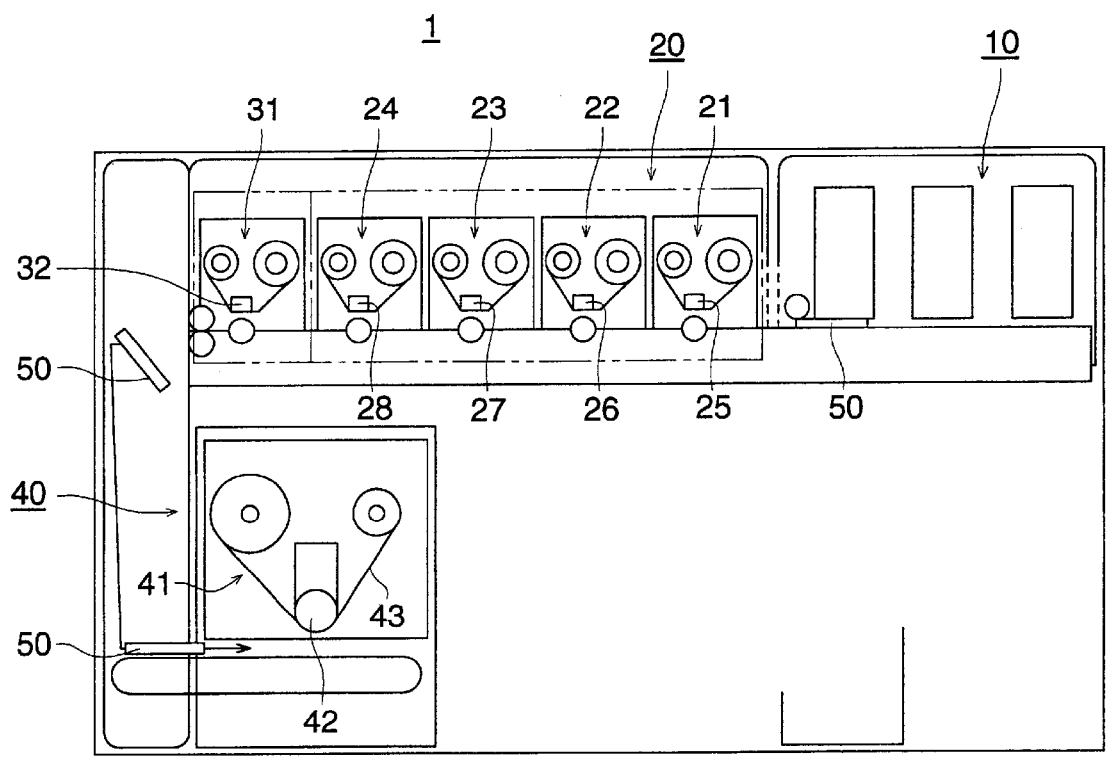
FIG. 11 is a schematic structural view showing an image recording body preparation apparatus of the first embodiment.
Figure 12:
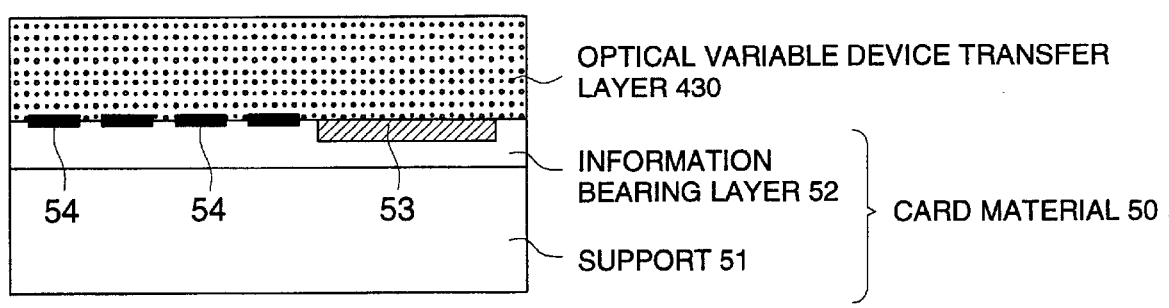
FIG. 12 is a view showing a layer structure of an image recording body.

Next, FIGS. 11 and 12 show the sixth embodiment. In image recording body preparation apparatus 1 in the present embodiment, card material supplying section 10 and information recording section 20 are arranged at the upper position, and security proving section 40 is arranged at the lower position. The apparatus 1 is capable of preparing cards as well as sheets as the image recording body.

In card material supplying section 10, in order to write personal information of the identification card user, a plurality of previously cut sheets of card material 50 are stored so that the surface, on which a portrait is recorded, faces upward. In this example, the card material 50 is to be comprised of support 51 and information bearing layer 52, and each sheet of said card material 50 is automatically supplied at predetermined timing from said card material supplying section 10.

In information recording section 20, yellow ribbon cassette 21, magenta ribbon cassette 22, cyan ribbon cassette 23, and black ribbon cassette 24 are arranged, and recording heads 25 through 28, corresponding to each ribbon cassette, are arranged. While card material 50 is being conveyed, images with gradation, such as the portrait of a card user, and the like, are recorded on image region 53 through thermal transfer, employing thermal transfer sheets such as a yellow ribbon, magenta ribbon, cyan ribbon, and the like. Further, text ribbon cassette 31 and recording head 32 are arranged, and identification information 54 is recorded through thermal transfer employing a text ribbon and the like. Thus, an image recording layer is formed.

In security providing section 40, transfer foil cassette 41 is arranged and thermal transfer head 42 is arranged corresponding to said transfer foil cassette 41. In transfer foil cassette 41, optical variable device transfer foil 43 is placed, which is subjected to transfer to provide optical variable device transfer layer 430.

When said optical variable device transfer layer 430 is provided, transparent protective layer 64a2 is preferably a hardenable transparent layer. Further, said transparent protective layer is provided on the entire surface of a card.

Figure 13:
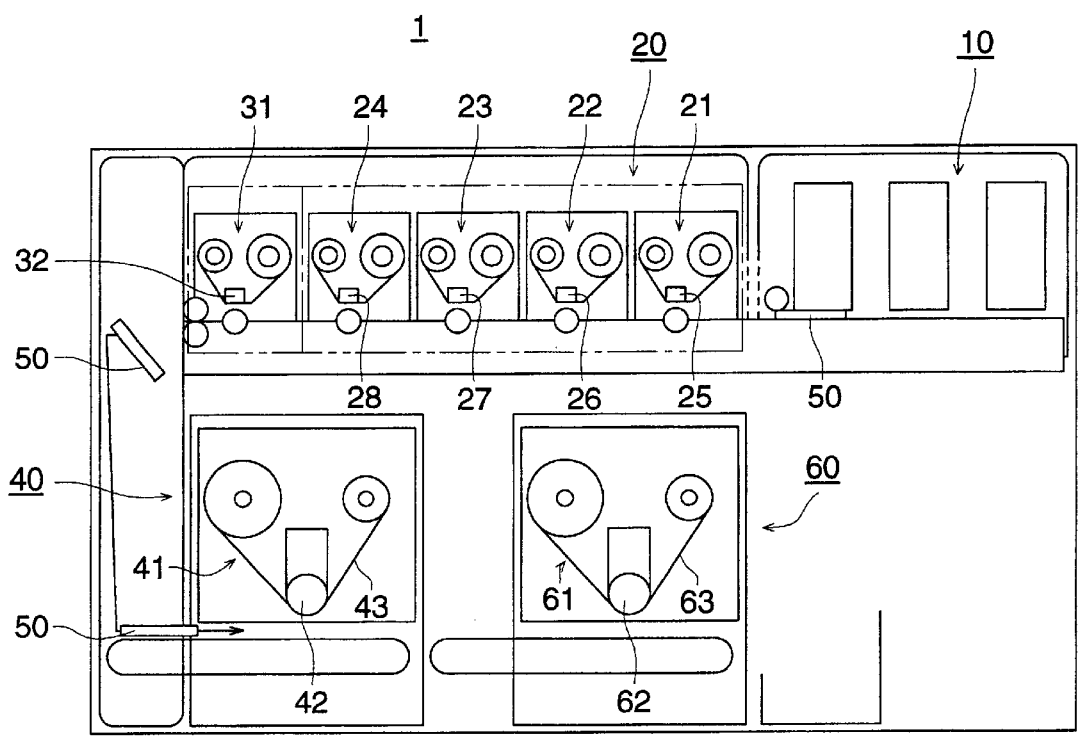
FIG. 13 is a schematic structural view showing an image recording body preparation apparatus of the first embodiment.
Figure 14:
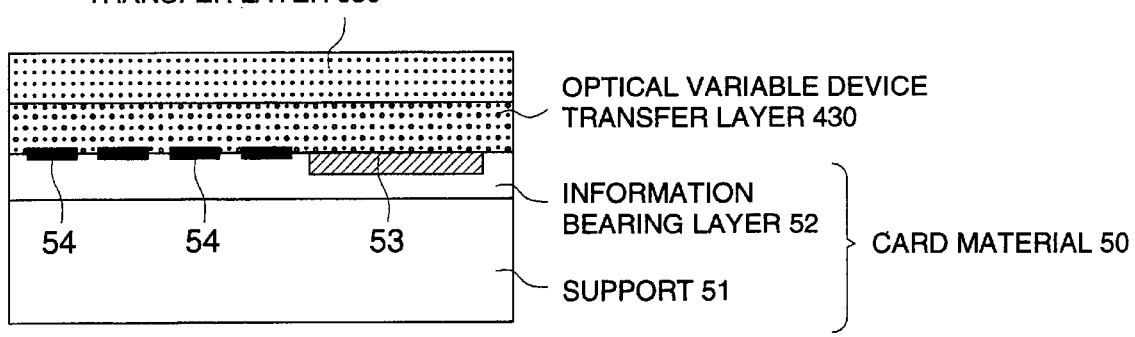
FIG. 14 is a view showing a layer structure of an image recording body.

Next, FIGS. 13 and 14 show the image recording body preparation apparatus of the seventh embodiment. FIG. 13 is a schematic structural view of said image recording body preparation apparatus, and FIG. 14 shows the layer structure of an image recording body.

In image recording body preparation apparatus 1 of this embodiment, card material supplying section 10 as well as security providing section 40 is constituted in the same manner. However, protection providing section 60 is arranged at a later stage of said security providing section 40, and either cards or sheets may be formed as the image forming body.

In protection providing section 60, transfer foil cassette 61 is arranged, and thermal transfer head 62 corresponding to said transfer foil cassette 61 is also arranged. Transparent protective transfer foil 63 is thermally transferred, and hardenable transparent protective transfer layer 630 is provided on optical variable device transfer layer 430.

Figure 15:
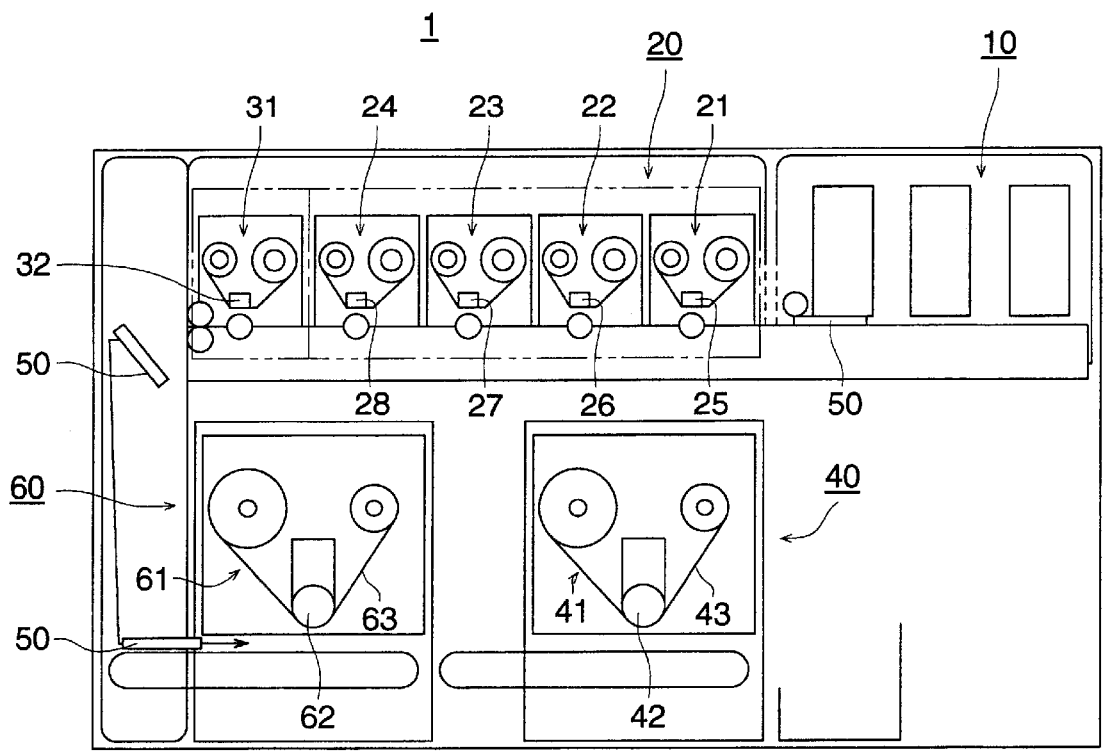
FIG. 15 is a schematic structural view showing an image recording body preparation apparatus of the first embodiment.
Figure 16:
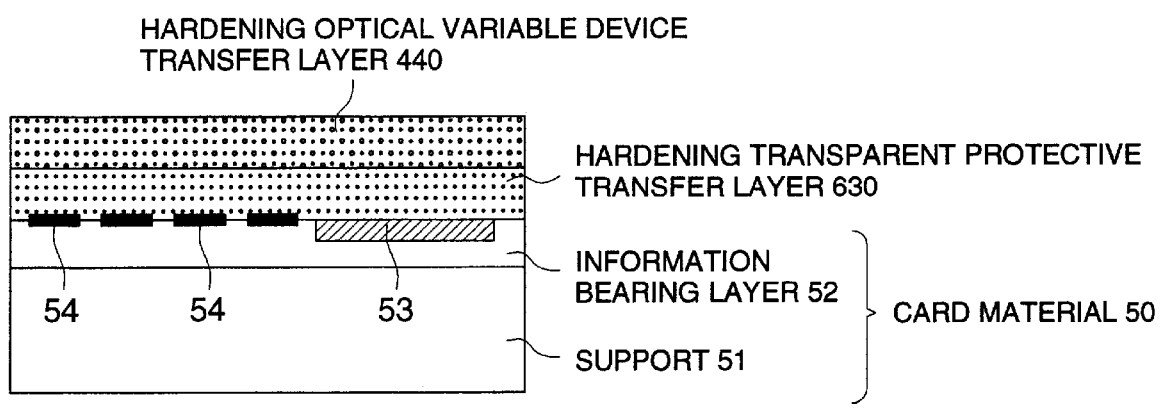
FIG. 16 is a view showing a layer structure of an image recording body.

Next, FIGS. 15 and 16 show an image recording body preparation apparatus of the eighth embodiment. FIG. 15 is a schematic structural view of said image recording body preparation apparatus, and FIG. 16 shows the layer structure of an image recording body.

In image recording body preparation apparatus 1 of this embodiment, card material supplying section 10 as well as information recording section 20 is constituted in the same manner. However, protection providing section 60 is arranged after information recording section 20, and further security providing section 40 is arranged.

In protection providing section 60, the protective layer of hardenable transparent protective transfer layer 630 is provided by thermally transferring hardenable transparent protective foil 63 onto image bearing layer 52. In security providing section 40, hardenable optical variable device transfer foil 44 is transferred onto hardenable transparent protective transfer layer 630, and hardenable optical variable device transfer layer 440 is provided.

Figure 17:
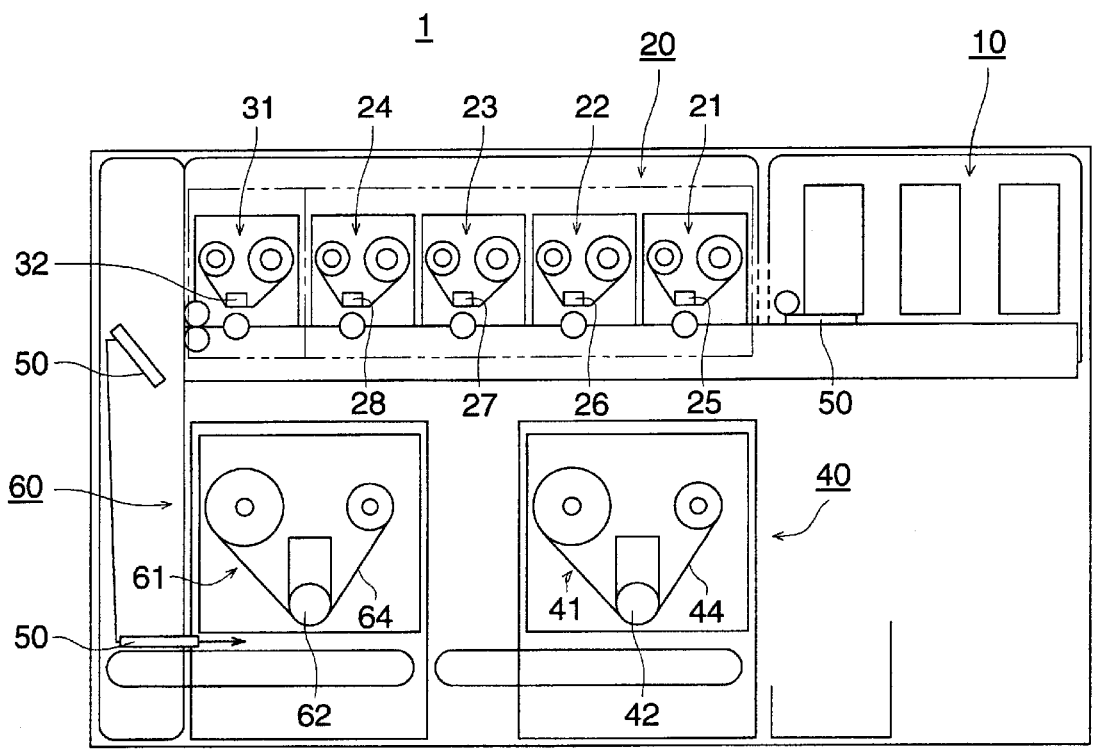
FIG. 17 is a schematic structural view showing an image recording body preparation apparatus of the first embodiment.
Figure 18:
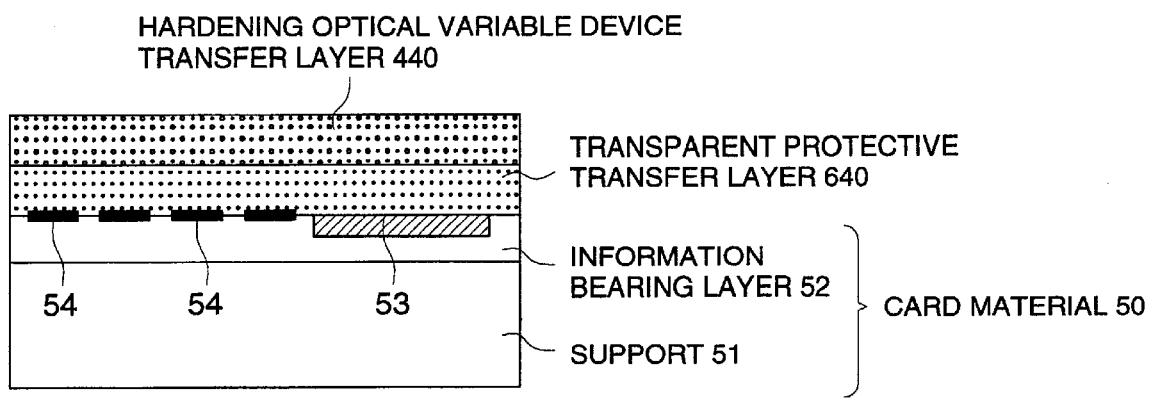
FIG. 18 is a view showing a layer structure of an image recording body.

Next, FIGS. 17 and 18 show an image recording body preparation apparatus of the ninth embodiment. FIG. 17 is a schematic structural view of said image recording body preparation apparatus, and FIG. 18 shows the layer structure of an image recording body.

In image recording body preparation apparatus 1 of this embodiment, card material supplying section 10 as well as information recording section 20 is constituted in the same manner. However, protection providing section 60 is arranged after information recording section 20, and further security providing section 40 is arranged.

In protection providing section 60, the protective layer of transparent protective transfer layer 640 is provided by thermally transferring transparent protective foil 64 onto image bearing layer 52. In security providing section 40, hardenable optical variable device transfer layer 44 is transferred onto transparent protective transfer layer 640, and hardenable optical variable device transfer layer 440 is provided.

Figure 19:
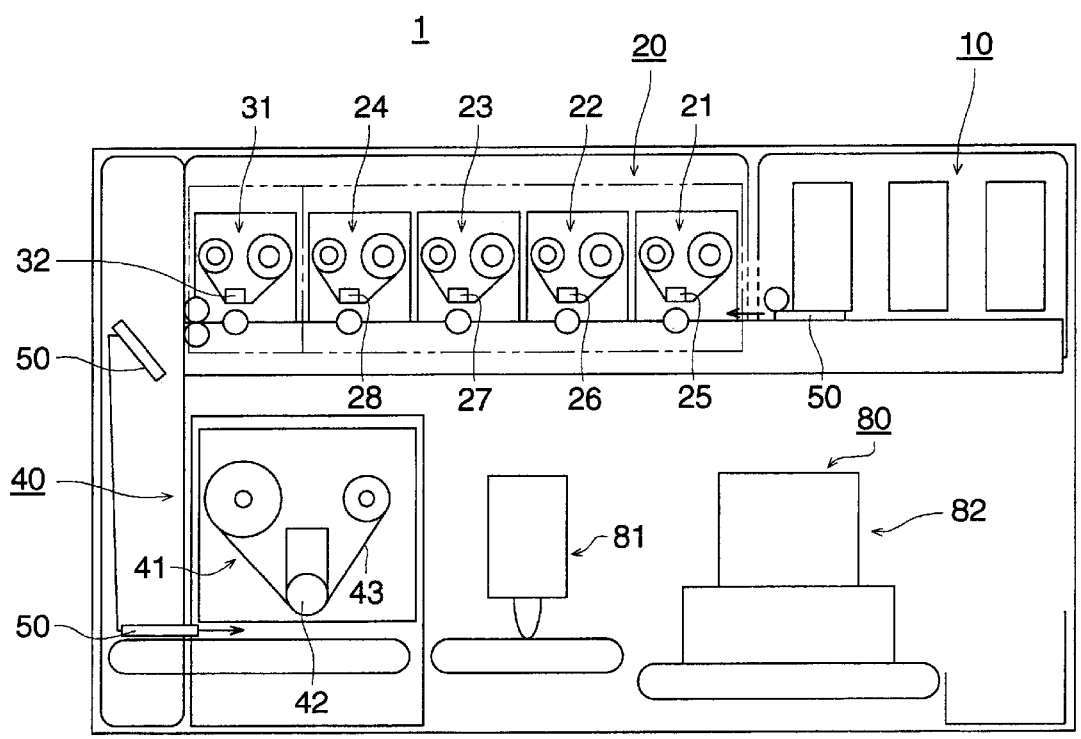
FIG. 19 is a schematic structural view showing an image recording body preparation apparatus.
Figure 20:
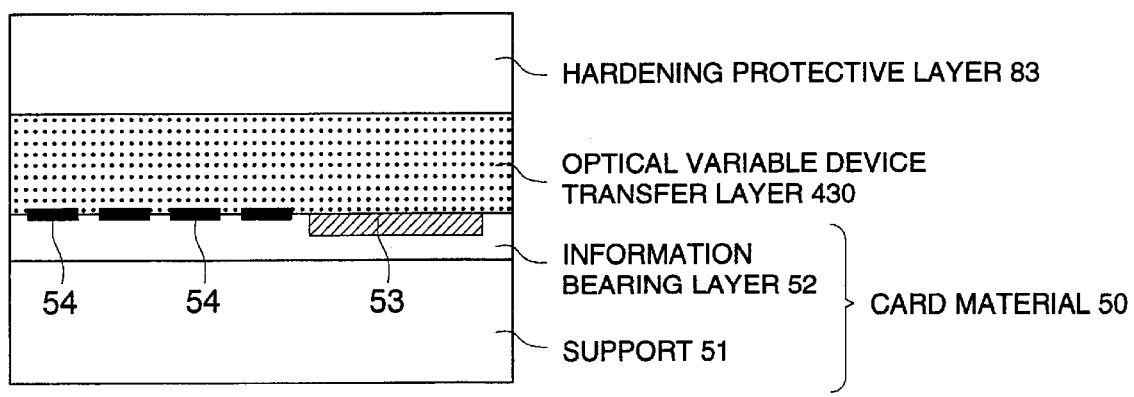
FIG. 20 is a view showing a layer structure of an image recording body.

Next, FIGS. 19 and 20 show an image recording body preparation apparatus of the tenth embodiment. FIG. 19 is a schematic structural view of said image recording body preparation apparatus, and FIG. 20 shows the layer structure of an image recording body.

In image recording body preparation apparatus 1 of this embodiment, security providing section 40 and protection providing section 80 are arranged in said order. In said security providing section 40, optical variable device transfer layer 430 is provided in such a manner that transfer is carried out by overlapping optical variable device transfer layer foil 43 with identification information 53, having gradations such as the portrait of a card user, and the like, as well as bibliographical information such as the name of said card user, the issue date of said, and the like, which are recorded in information bearing layer 52. Protection providing section 80 is arranged which comprises UV composition coating apparatus 81 as well as UV lamp 82. Said UV composition is applied onto optical variable device transfer layer 430 and the resulting coating is subjected to irradiation of ultraviolet radiation and thereby hardened. Thus hardened protective layer 83 is provided which is comprised of UV hardened resin layer.

Figure 21:
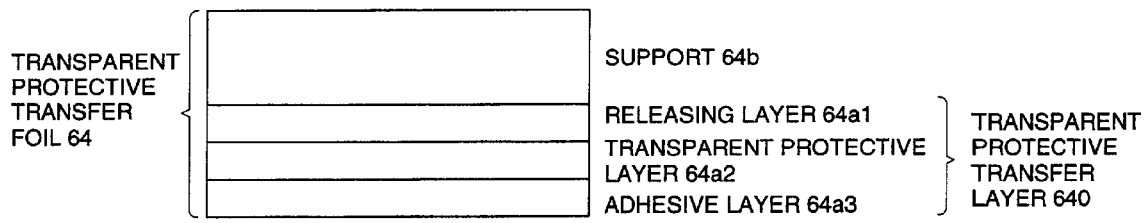
FIGS. 21(a), 21(b), 21(c) and 21(d) are each a view showing an embodiment of a transparent protective transfer foil.
Figure 21:
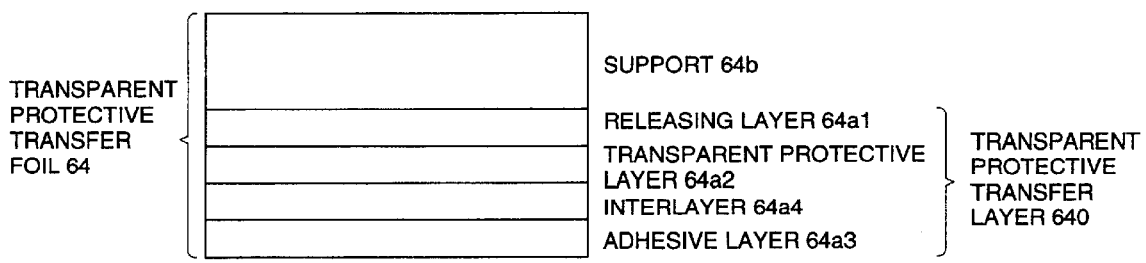
Figure 21:
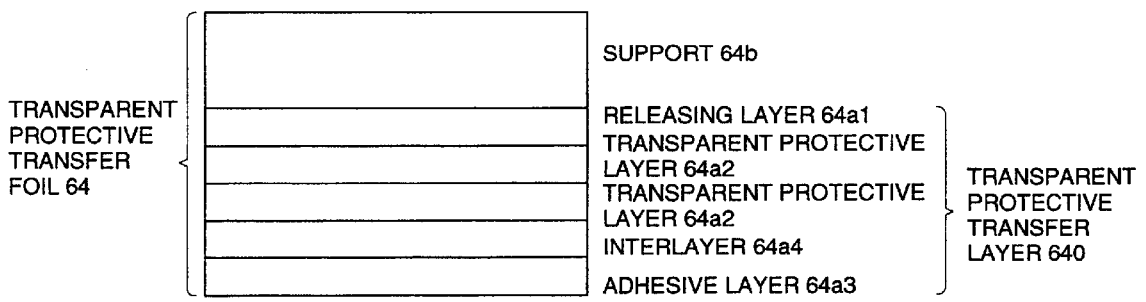
Figure 21:
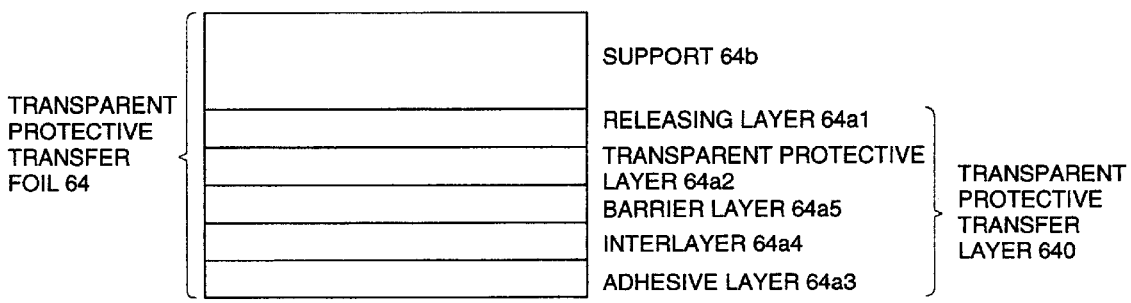

Next, FIG. 21 shows the embodiment of transparent protective transfer foil 64. Transparent protective transfer foil 64 in FIG. 21(a) is comprised of transparent protective transfer layer 640 and support 64b, and transparent protective transfer layer 640 is comprised of transparent protective layer 64a2 and adhesive layer 64a3. Releasing layer 64a1 and adhesive layer 64a3 are provided on either sides of transparent protective layer 64a2, and releasing layer 64a1 is adhered onto support 64b. Transparent protective transfer foil 64 in FIG. 21(b) is constituted in the same manner as the transfer foil of FIG. 21(a). However, interlayer 64a4 is provided between transparent protective layer 64a2 and adhesive layer 64a3. Transparent protective transfer foil 64 is constituted in the same manner as the transfer foil in FIG. 21(b). However, two transparent protective layers 64a2 are provided. Transparent protective transfer foil 64 in FIG. 21(d) is constituted in the same manner as transfer foil of FIG. 21(b). However, barrier layer 64a5 is provided between transparent protective layer 64a2 and interlayer 64a4. Further, said transparent protective layer may be either actinic light-hardened resin layer or a resin layer.

In said transparent protective transfer foil 64, transparent protective transfer layer 640 is peeled from support 64b and transferred.

Figure 22:
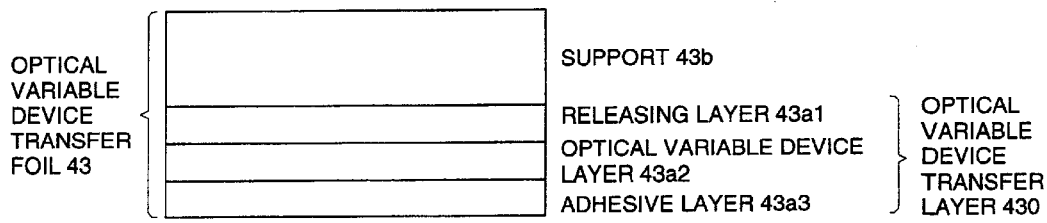
FIGS. 22(a), 22(b), 22(c) and 22(d) are each a view showing an embodiment of an optical variable device transfer foil.
Figure 22:
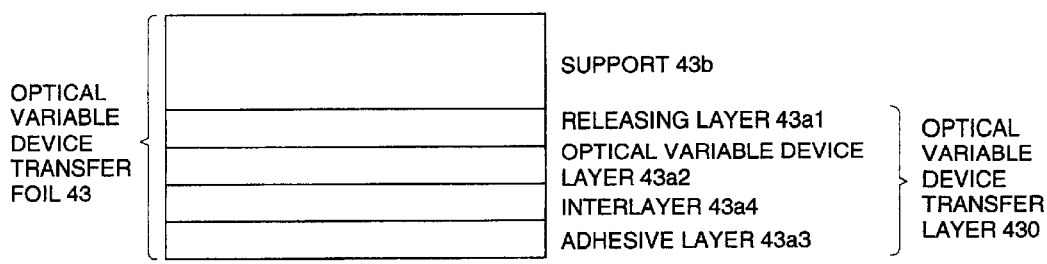
Figure 22:
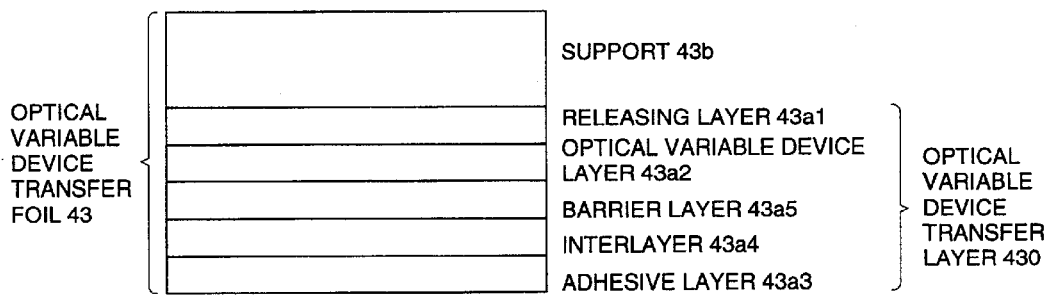
Figure 22:
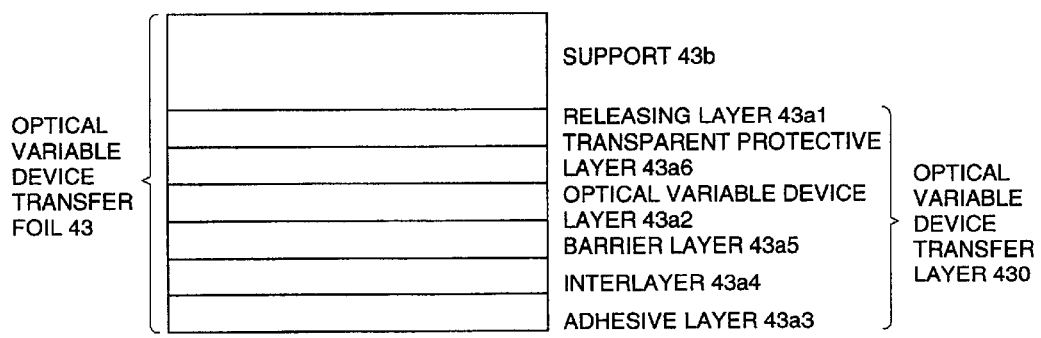

FIG. 22 shows the embodiment of optical variable device transfer foil 43. Optical variable device transfer foil 43 in FIG. 22(a) is comprised of optical variable device transfer layer 430 and support 43b, and optical variable device transfer layer 430 is comprised of releasing layer 43a1, optical variable device layer 43a2, and adhesive layer 43a3. Releasing layer 43a1 and adhesive layer 43a3 are provided on either sides of optical variable device layer 43a2, and releasing layer 43a1 is adhered to support 43b. Optical variable device transfer foil 43 in FIG. 22(b) is constituted in the same manner as transfer foil in FIG. 22(a). However, interlayer 43a4 is provided between adhesive layer 43a3 and optical variable device layer 43a2. Optical variable device transfer foil 43 in FIG. 22(c) is constituted in the same manner as transfer foil in FIG. 22(b). However, barrier layer 43a5 is provided between optical variable device layer 43a2 and interlayer 43a4. The transfer foil in FIG. 22(d) is constituted in the same manner as transfer foil in FIG. 22(c). However, transparent protective layer 43a6 is provided between releasing layer 43a1 and optical variable device layer 43a2. Further, said transparent protective layer may be either actinic light-hardened resin layer or a resin layer.

In said optical variable device transfer foil 43, optical variable device transfer layer 430 is peeled from support 43b and transferred.

Figure 23:
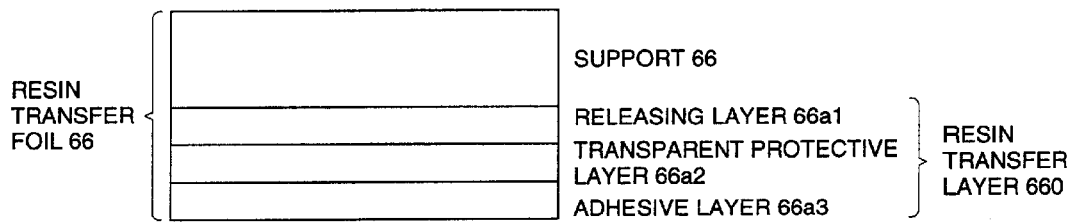
FIGS. 23(a), 23(b), 23(c) and 23(d) are each a view showing an embodiment of a resin transfer foil.
Figure 23:
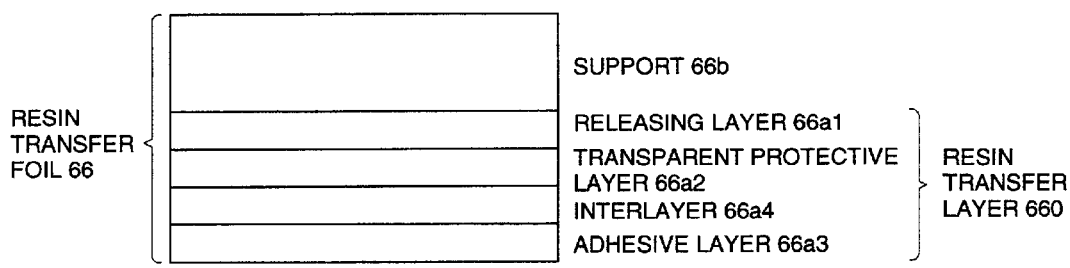
Figure 23:
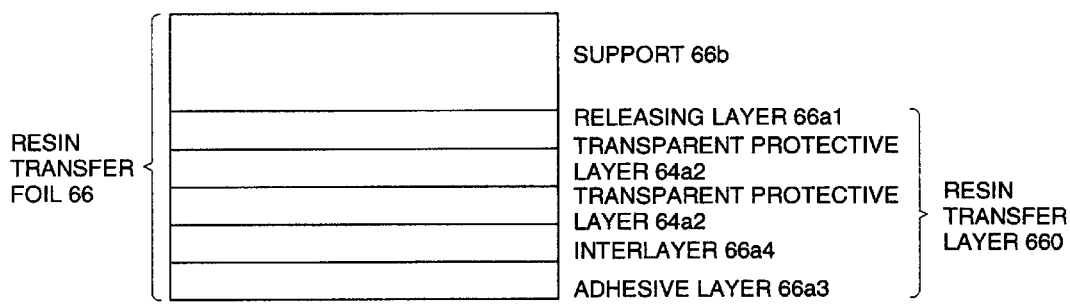
Figure 23:
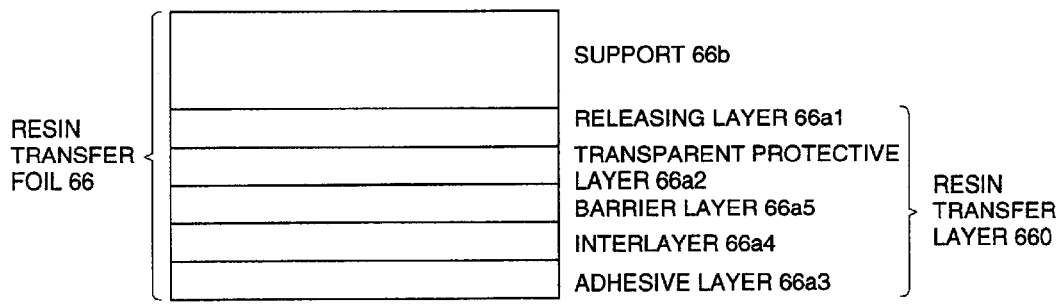

Next, FIG. 23 shows the embodiment of resin transfer foil 66. Resin transfer foil 66 in FIG. 23(a) is comprised of resin transfer layer 660 and support 66b, and resin layer 660 is comprised of releasing layer 66a1, transparent protective layer 66a2, and adhesive layer 66a3. Releasing layer 66a1 and adhesive layer 66a3 are provided on either sides of transparent protective layer 66a2, and releasing layer 66a1 is adhered onto support 66b. Resin transfer foil 66 in FIG. 23(b) is constituted in the same manner as transfer foil in FIG. 23(a). However, interlayer 66a4 is provided between transparent protective layer 66a2 and adhesive layer 66a3. Resin transfer foil 66 in FIG. 23(c) is constituted in the same manner as transfer foil in FIG. 23(b). However, two transparent protective layers 66a2 are provided. Resin transfer foil 66 in FIG. 23(d) is constituted in the same manner as transfer foil in FIG. 23(b). However, barrier layer 66a5 is provided between transparent protective layer 63a2 and interlayer layer 63a4. Further, said transparent protective layer may be either actinic light-hardened resin layer or a resin layer.

In said resin transfer foil 66, resin transfer layer 660 is peeled from support 66b and transferred.

Figure 24:
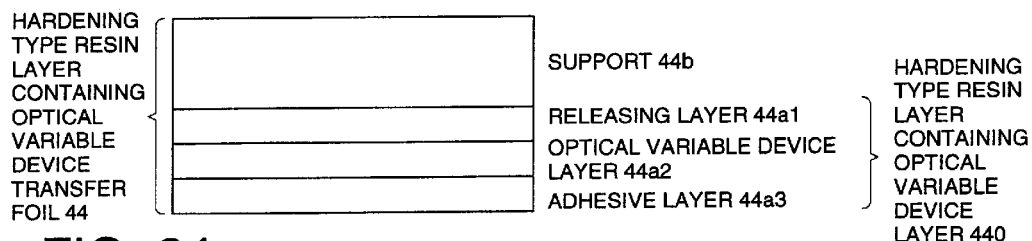
FIGS. 24(a), 24(b), 24(c), 24(d) and 24(e) are each a view showing an embodiment of a hardening type resin layer containing optical variable device transfer foil.
Figure 24:
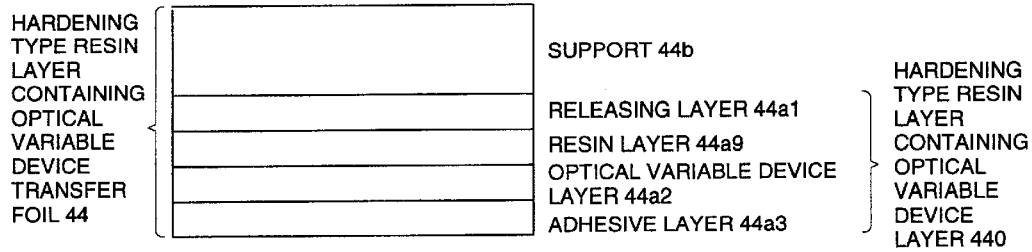
Figure 24:
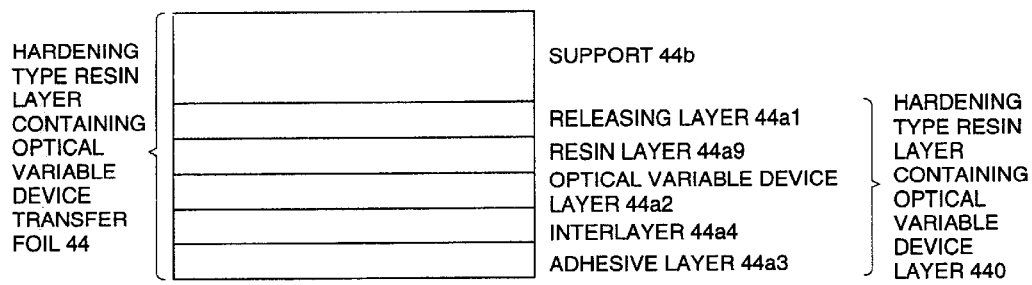
Figure 24:
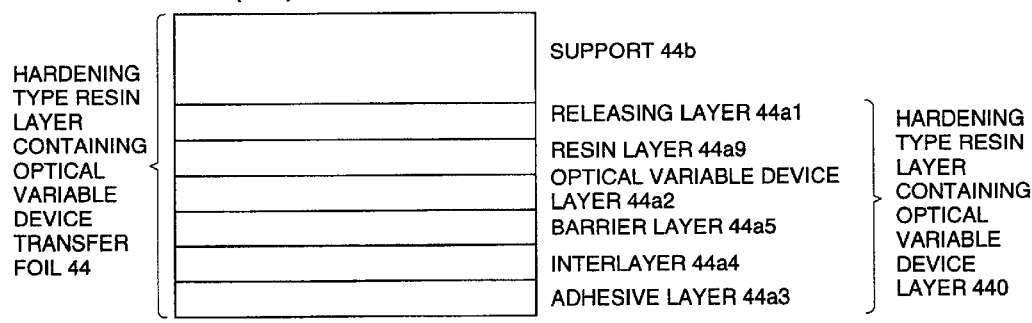
Figure 24:
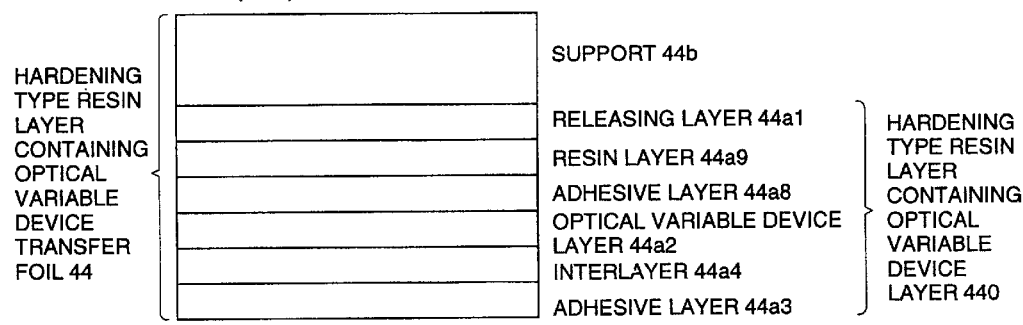

Next, FIG. 24 shows the embodiment of hardenable type resin layer-containing optical variable device transfer foil 44. Hardenable type resin layer-containing optical variable device transfer foil 44 in FIG. 24(a) is comprised of hardenable type resin layer-containing optical variable device transfer layer 440, and support 44b, and hardenable type resin layer-containing optical variable device transfer layer 44 is comprised of releasing layer 44a1, optical variable device layer 44a2, and adhesive layer 44a3. Releasing layer 44a1 and adhesive layer 44a3 are provided on either sides of optical variable device layer 44a2, and releasing layer 44a1 is adhered to support 44b. Hardenable type resin-containing optical variable device transfer foil 44 in FIG. 24(b) is constituted in the same manner as transfer foil in FIG. 24(a). However, resin layer 44a9 is provided between releasing layer 44a1 and optical variable device layer 44a2. Hardenable type resin-containing optical variable device transfer foil 44 in FIG. 24(c) is constituted in the same manner as transfer foil in FIG. 24(b). However, interlayer 44a4 is provided between optical variable device layer 44a2 and adhesive layer 44a3. Hardenable type resin layer-containing optical variable device transfer foil 44 in FIG. 24(d) is constituted in the same manner as transfer foil in FIG. 24(c). However, barrier layer 44a5 is provided between interlayer 44a4 and optical variable device layer 44a2. Transfer foil in FIG. 24(e) is constituted in the same manner as transfer foil in FIG. 24(d). Adhesive layer 44a8 is provided between resin layer 44a9 and optical variable device layer 44a2, and barrier layer 44a5 is deleted. Further, said resin layer may be actinic light-hardened resin layer.

In these hardenable type resin layer-containing optical variable device transfer foils 44, hardenable type resin layer-containing optical variable device transfer layer 440 is peeled from support 44b and transferred.

In the transparent protective transfer foil in this embodiment, the transparent protective transfer layer is peeled from the support and transferred. Said transparent protective transfer foil is constituted in such a manner that at least releasing layer, a transparent protective layer, and an adhesive layer are coated onto a support in said order, at least a releasing layer, a transparent protective layer, an interlayer, and an adhesive layer are coated onto a support in said order, or at least a releasing layer, a transparent protective layer, a barrier layer, an interlayer, and an adhesive layer are coated onto a support in said order. Said transparent protective transfer foil is excellent in surface protective properties as well as surface abrasion resistance.

Further, the optimally variable element transfer foil is constituted in such a manner that at least a releasing layer, an optical variable device layer, and an adhesive layer are coated onto a support in said order, or at least a releasing layer, an optical variable device layer, an interlayer, and an adhesive layer are coated onto a support in said order. Said foil is excellent in surface protective properties as well as surface abrasion resistance.

Still further, the transparent protective transfer foil as well as the optical variable device transfer foil comprises a transparent protective layer between the releasing layer and the optical variable device layer, and said transparent protective layer may be a transparent hardenable protective layer.

Still further, in order to obtain more excellent surface protective properties as well as surface abrasion resistance, the transparent protective layer, which is positioned closer to the surface side of the image recording body than the optical variable device layer, is preferably an ultraviolet radiation-hardenable layer or an electron ray hardenable layer.

Still further, in order to realize the prevention effects for forgery, the optical variable device layer is preferably a hard coat layer or an evaporated layer having a image on an uneven surface.

Further, in order to obtain excellent surface abrasion resistance, at least one transparent protective layer is thermally transferred onto the entire surface of cards.

Still further, antistatic agents are preferably incorporated into either the transparent protective transfer foil or the optical variable device transfer foil. Thus, it is possible to prepare cards or sheets which are resistant to dust adhesion.

Further, the surface formed by the transfer of a layer is preferably subjected to adhesion treatment so that the transfer foil subsequently transferred is readily adhered.

In the transfer foil of the present invention, at least one antistatic layer is preferably provided in a releasing layer, a transparent protective layer, an optical variable device layer, a barrier layer, an interlayer, and an adhesive layer. The antistatic layer in the transfer foil comprises anionic high molecular compounds and/or electrically conductive particles, which exhibit excellent antistatic properties.

Listed as the aforementioned anionic high molecular compounds are polymers comprising a carboxyl group, a sulfonic acid group, and a hydroxyl group, for example, polyacrylic acid, polymethacrylic acid, vinyl chloride, maleic acid mono(2-ethylhexyl) copolymer, polystyrene sulfonic acid, polyvinyl alcohol, cellulose, hydroxyethyl cellulose, and modified compounds thereof. Also listed are those in which the part of the functional group or the entire functional group corresponding to each is modified to alkali metal salts, alkali earth metal salts, transition metal salts, and the like. Of these, preferred are alkali or alkali earth metal salts of polyacrylic acid, polymethacrylic acid, and polystyrene sulfonic acid, and specifically, sodium salts of polystyrene sulfonic acid are preferred from the viewpoint of compatibility with other resins, antistatic properties, and solubility, and viscosity of their solution.

Further, listed as electrically conductive particles are various metals, oxides such as $ZnO$, $TiO_2$, $SnO_2$, $Al_2O_3$, $In_2O_3$, $MgO$, $CoO$, $CuO$, $Cu_2O$, $SrO$, $BaO$, $BaO_2$, $PbO$, $PbO_2$, $MnO_3$, $SiO_2$, $ZrO_2$, $Ag_2O$, $Y_2O_3$, $BiO_3$, $La_2O_3$, $Ti_2O_3$, $Sd_2O_3$, $Sb_3O_5$, $K_2Ti_6O_{13}$, $NaCaP_2O_{18}$, $MgB_2O_5$, and the like, sulfides such as $CuS$, $ZnS$, and the like, carbides such as SiC, TiC, ZrC, VC, NbC, WoC, and the like, nitrides such as $Si_3N_4$, TiN, ZrN, VN, NbN, TaN, $Cr_2N$, and the like, borides such as $TiB_2$, $ZrB_2$, $NbB_2$, $TaB_2$, CrB, MoB, WB, $LaB_6$, and the like, silicides such as $TiSi_2$, $ZrSi_2$, $NSi_2$, $TaSi_2$, $CrSi_2$, $MoSi_2$, $WSi_2$, and the like, metal salts such as $BaCO_3$, CaCO3, $SrCO_3$, $BaSO_4$, $CaSO_4$, and the like, composites such as $Si_3N_4$-SiC, $9Ai_2O_3$-$2B_2O_3$, and the like, materials doped with those, and the like. of these, preferred are ZnO, $TiO_2$, $SnO_2$, $ZrO_2$, $Y_2O_3$, $Sb_2O_5$, CuS, ZnS, TiC, WC, TiN, $TiB_2$, $ZrB_2$, $MoSi_2$, $WSi_2$, $CaCO_3$, $BaSO_4$, and the like. These compounds may be employed individually or in combination of two types or more.

In the present invention, electrically conductive particles are preferably mixtures consisting of at least two types of particles having different particle shapes. Entire electrically conductive particles are preferably comprised of some of particles having an average particle diameter of 0.01 to 0.5 μm and the remaining particles having an average particle diameter of 0.5 to 3 μm, and the preferred ratio is such that the former is 50 to 95 percent by weight and the latter is 5 to 50 percent by weight. When an antistatic layer is formed employing only particles having an average particle diameter of 0.01 to 0.5 μm, the resulting layer is effective for minimizing static charge as well as transparent spots. However, the following problems occasionally occur: a plurality of sheets are fed, stable running is not carried out, and adhesion to the sticky surface of an image layer immediately after preparing an image recording body is not minimized. Further, when said antistatic layer is formed employing only particles having a particle diameter of 0.5 to 3 μm, the following effects were obtained: static charge was minimized, the supply of a plurality of sheets was minimized, stable running was carried out, and adhesion to the sticky surface of an image layer immediately after preparing an image recording body was minimized. However, transparent spots were occasionally formed.

As described above, when two types of electrically conductive particles are employed in said antistatic layer, they are effective not only for minimizing static charge but also for minimizing the feeding of a plurality of sheets, stabilizing running, minimizing transparent spots, and minimizing adhesion to the sticky surface of an image layer immediately after preparing a image recording body.

Further, the content of the aforementioned anionic high polymer compounds and/or electrically conductive particles in antistatic layer forming compositions is preferably between 5 and 80 percent by weight with respect to the entire amount, and is more preferably between 10 and 60 percent by weight.

In the present invention, an antistatic layer is formed by blending said anionic high polymer compounds and/or electrically conductive particles with a resin, or by dispersing them into a resin.

Resins forming said antistatic layer are not particularly limited, and various types of resins such as binder resins, known in the art may be employed. Listed as representative examples of binder resins may be methyl polymethacrylate based acrylic resins, styrene based resins such as polystyrene and the like, vinyl chloride based resins such as polyvinyl chloride and the like, vinylidene chloride based resins such as polyvinylidene chloride, and the like, polyester based resins such as polyethylene terephthalate, and the like, cellulose based resins such as cellulose acetate, and the like, polyvinyl acetal based resins such as polyvinyl butyral, and the like, epoxy based resins, amide based resins, urethane based resins, melamine based resins, alkyd based resins, phenol based resins, fluorine based resins, silicon based resins, polycarbonate, polyvinyl alcohol, casein, gelatin, and the like. Further, resins such as ionizing radiation-hardened resins or thermally hardened resins, which are capable of being hardened by ionizing radiation or heat, may be employed in combination.

An actinic light-hardened resin layer is provided by employing individually, or in combination transparent protective transfer foil 64 in FIG. 21, optical variable device transfer foil 43 in FIG. 22, resin transfer foil 66 in FIG. 23, and hardenable type resin layer containing optical variable device transfer foil 44.

As described above, the transparent protective layer as well as the optical variable device layer are provided onto the image recording layer, and thereon, a resin layer (preferably an actinic light-hardened resin layer), having a breaking elongation in the range of 5 to 90 percent, is provided. Further, an actinic light-hardened resin layer, having a static surface friction coefficient of 0.5 to 1.0, is preferably provided. By providing the actinic light-hardened resin layer specified by said breaking elongation or said static surface friction coefficient, scratch resistant is enhanced, and abrasion as well as wrinkling may be minimized.

Said actinic light-hardened resin layer comprises non-hardenable type resins, or preferably comprises an unsaturated group containing resin having an average molecular weight of 5,000 to 50,000. By such incorporation, it is possible to obtain actinic light hardened resin layer having a breaking elongation in the range of 5 to 90.

Further, the actinic light-hardened resin layer preferably comprises Si and F compounds! which preferably comprise Si and F compounds having an unsaturated group. Further, the actinic light hardened resin layer comprises coupling agents. As a result, obtained is an actinic light-hardened resin layer having a static surface friction coefficient in the range of 0.01 to 0.5.

As described above, a actinic light-hardened resin layer is provided. Thereafter, the resulting layer is subjected to exposure of actinic light. Thus, a hardened layer is formed to produce cards.

Figure 25:
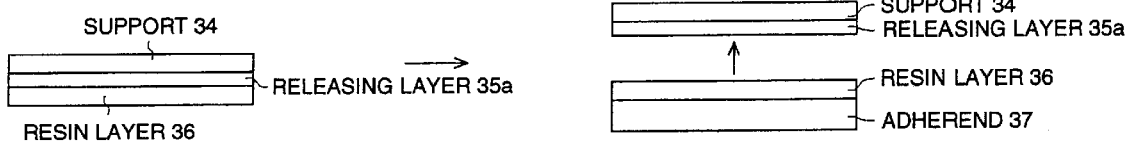
FIGS. 25(a), 25(b), 25(c), 25(d), 25(e) and 25(f) are each a view showing another embodiment of an image recording body.
Figure 25:
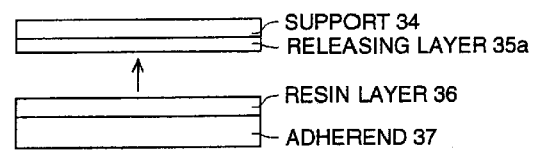
Figure 25:
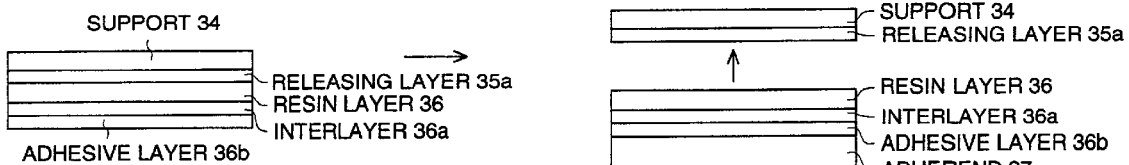
Figure 25:
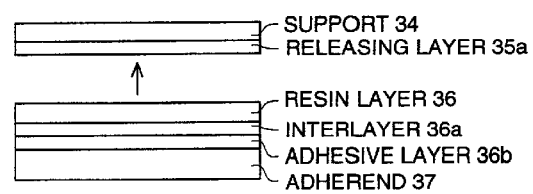
Figure 25:
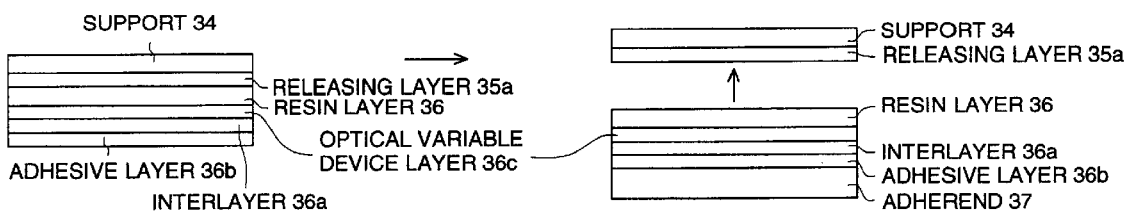
Figure 25:
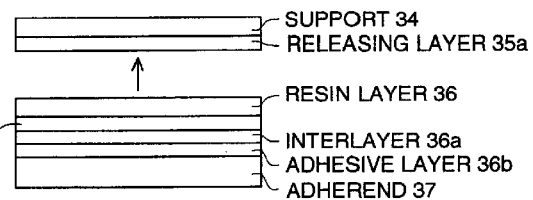
Figure 25:
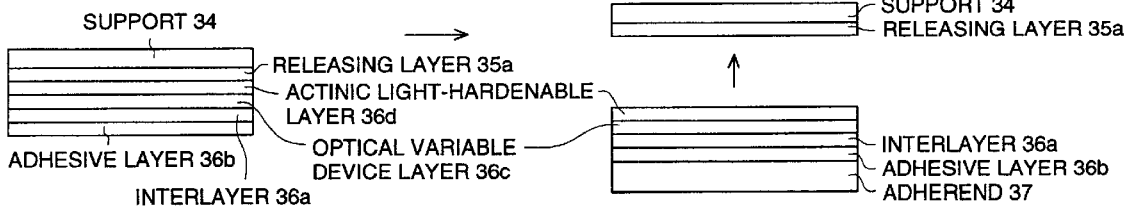
Figure 25:
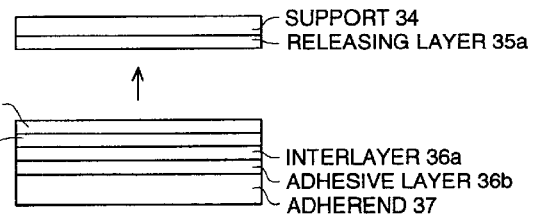
Figure 25:
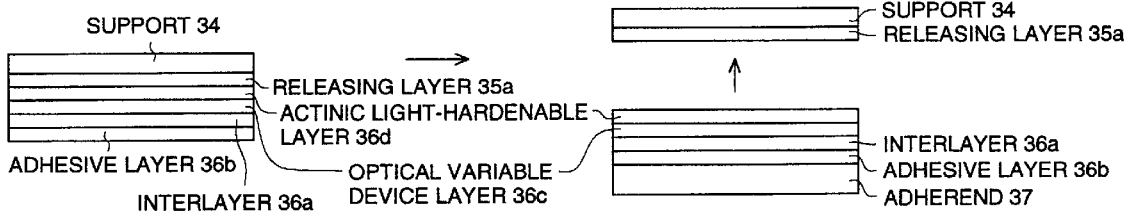
Figure 25:
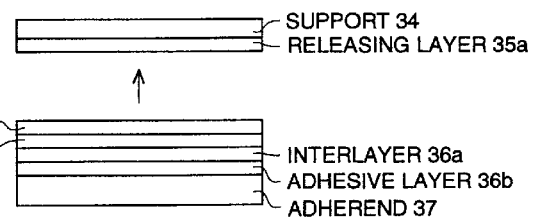
Figure 25:
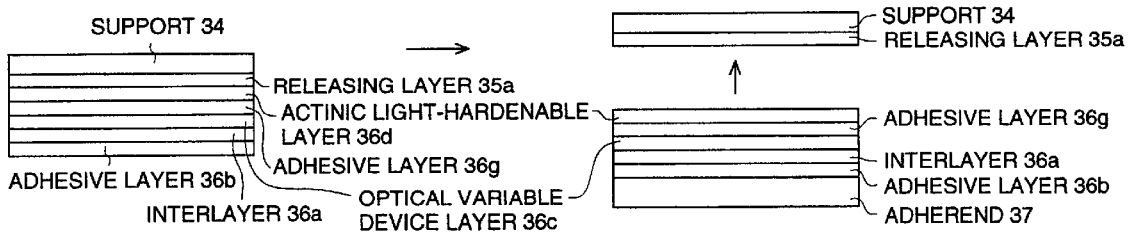

Furthermore, the transfer foil of the present invention, as shown in FIG. 25(*a*), comprises at least a resin layer 36, having a breaking elongation in the range of 5 to 90 percent, on the side having a releasing layer of releasable support 34, and further comprises at least a resin layer 36 having a static surface friction coefficient in the range of 0.01 to 0.5. Still further, said resin layer is comprised of at least one actinic light-hardened resin layer. Still further, said resin layer 36 may comprise non-hardened resins. Furthermore, said resin layer 36 comprises unsaturated group containing resins, having an average molecular weight of 5,000 to 50,000. Further, said resin layer 36 comprises Si and F compounds which are comprised of unsaturated group containing Si and F compounds. Further, said resin layer 36 comprises coupling agents.

Further, after the formation of said resin layer, as shown in FIG. 25(*b*), interlayer 36*a* and adhesive layer 36*b* are successively provided. Alternatively, after the formation of said resin layer, as shown in FIG. 25(*c*), optical variable device layer 36*c,* interlayer 36*a,* and adhesive layer 36*b* are successively provided.

As shown in FIG. 25(*b*) as well as in FIG. 25(*c*), said transfer foil is transferred to adherend 37, to prepare said cards. In this case, said transfer foil may be transferred to adherend 37 which has been subjected to transfer of a transparent protective layer and/or an optical variable device layer on the image recording layer.

Further, as shown in FIG. 25(d), in the production method for the transfer foil of the present invention, after applying actinic light-hardened layer 36d to the side having releasability of releasable support 34, exposure is carried out employing actinic light to form a hardened layer and thereafter, interlayer 36a and adhesive layer 36b are successively provided.

Further, as shown in FIG. 25(e), after applying actinic light-hardened layer 36d, actinic light exposure is carried out to form a hardened layer, and thereafter transfer foil may be produced by successively providing optical variable device layer 36e, interlayer 36a, and adhesive layer 36b.

Further, as shown in FIG. 25(f), after applying actinic light-hardened layer 36d onto the surface having releasability of a releasable support, actinic light exposure is carried out to form a hardened layer, and thereafter adhesive layer 36g, optical variable device layer 36e, interlayer 36a, and adhesive layer 36b are successively provided.

The transfer foil produced employing the transfer foil production method, as described above, is transferred to an adherend to make it possible to form cards. Further, said transfer foil produced employing the transfer foil production method is transferred to an adherent which has been subjected to transfer of an optical variable device layer to make it possible to form cards.

Further, the interlayer comprises at least a polyvinyl butyral resin having a degree of polymerization of at least 1,000, or a themohardening resin comprised of polybutyral, and the adhesive layer comprises at least a urethane modified ethylene ethylacrylate copolymer and a polyacrylic acid ester copolymer.

As described above, security such as the prevention of forgery, altetration, and the like, is enhanced, and at the same time, abrasion as well as wrinkling can be minimized.

Figure 26:
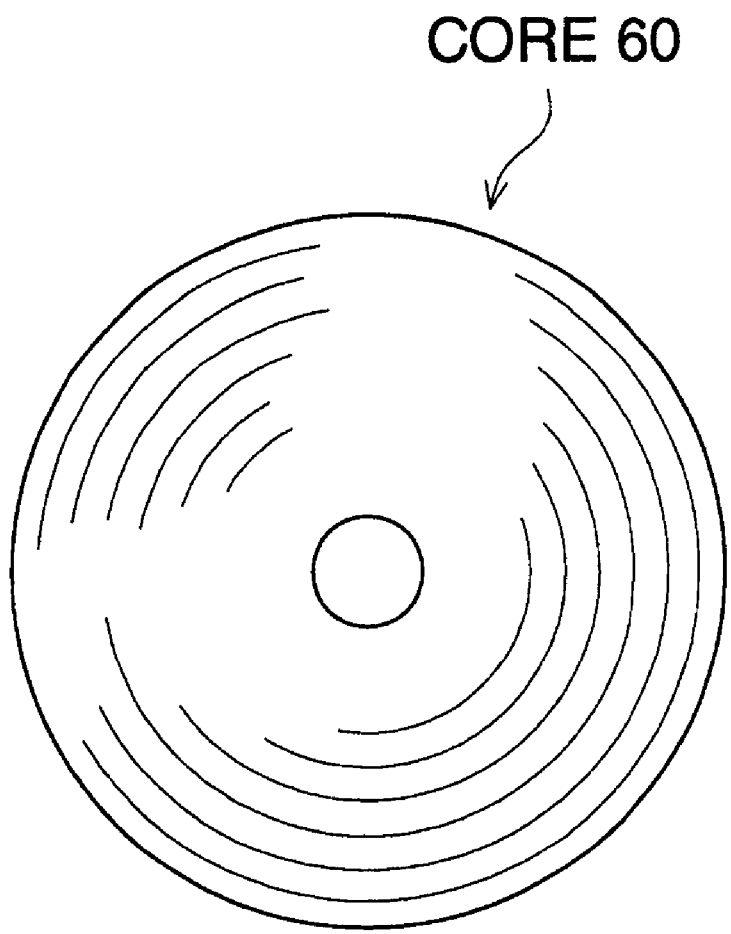
FIG. 26 is a view showing a transfer foil roll.

Further, a support, which has at least one surface having a central line average roughness (Ra) in the range of 0.05 to 0.5 µm, is employed to prepare the transfer foil. In a transfer foil comprising a support having thereon a transfer layer, said support in which the central line average roughness of the surface which has not been subjected to transfer is in the range of 0.05 to 0.5 µm may be employed. By employing said composition, it is possible to improve blocking properties. In addition, said transfer foil is stored as core 60 as shown in FIG. 26. Even when winding tension applied to core 60 is in the range of 0.6 to 7.0 kg, it is possible to prevent adhesion during storage for an extended period of time, that is, it is possible to improve blocking properties. The transfer foil preferably have a length of 50 to 500 m, more preferably, 100 to 400 m in view of improving blocking property.

The card material of the present invention will now be described below.

Listed as supports of the adherend are materials such as paper, polypropylene, and polystyrene as a base body, or synthetic papers prepared by laminating these with paper, plastic films such as transparent or white polyethylene terephthalate base film, polyethylene terenaphthalate base film, vinyl chloride base film, and the like, various types of metal and ceramic films, and the like. IC memory, light memory, magnetic memory and the like may be built into the base body, and either a single layer or a composite film of the aforementioned films may be employed. The thickness of said base body is commonly between about 100 and 1,000 µm, and is preferably between 200 and 700 µm. On the reverse surface, a writing layer may be provided.

Next, the image recording layer will be described.

The image element of the present invention is formed in such a manner that a protective layer is formed employing a thermal transfer sheet on the image surface of an information bearing layer on which at least one selected from an identification image such as a portrait and the like, an attribute information image, and format print is provided or on a print surface.

Listed as methods to form identification images, represented by a portrait, are a silver salt photographic method which is advantageous for formation of multi-level images, a fusion thermal transfer recording method, an ink jet method, and a sublimation type thermal transfer recording method. In recent years, as represented by the driver's license, the latter is commonly employed. The attribute information means names, addresses, birth date, qualifications, and the like, and is recorded as text information, commonly employing a fusion type thermal transfer recording method. The format printing is carried out on a base body or an image receiving layer employed for a sublimation type thermal recording method, employing printing methods such as resin letterpress printing, planographic printing, silk screen printing. Appropriately selected as a pattern layer are printed matter, holograms, bar codes, matted patterns, fine patterns, ground patterns, concave and convex patterns, and the like. Said pattern layer is comprised of visible light absorbing colorants, UV absorbing materials, infrared ray absorbing materials, fluorescent whitening materials, an evaporated metal layer, an evaporated glass layer, and the like. The interlayer exhibits a cushioning function for absorbing the unevenness of a body to which transfer is carried out, and a resin hardening function for the purpose of protecting the pattern layer after transfer, and a light-hardened resin layer and a thermally hardened resin layer are added.

Transfer of the transfer foil to the transfer material is commonly carried out employing means such as a thermal head, a heated roller, a hot stamp machine, and the like which can apply pressure while heating.

The image receiving layer of the present invention, which is a layer possessing identification information or bibliographical information, is preferably structured in such a manner that at least an identification information image can be formed on its surface, employing sublimable dyes and the like. Its structure is not particularly limited as long as it is capable of accepting sublimable dyes which are thermally diffused from the ink layer into the sublimation type thermal transfer ink sheet, and it is basically comprised of a binder and various types of additive silicon or fluorine desired. The thickness of said image receiving layer is commonly between 1 and 50 µm, and is preferably between 2 and 20 µm.

Employed as binders for said image receiving layer may be various types of resins such as vinyl chloride based resins, polyester based resins, polycarbonate based resins, acryl based resins, polyvinyl acetal based resins, and the like. However, from the viewpoint of image retention properties, and the like, preferred are polyvinyl acetal based resins such as polyvinyl acetoacetal resins, polyvinyl butyral resins, polyvinyl formal resins, or vinyl chloride based resins such as polyvinyl chloride resins, vinyl chloride copolymers, and the like. In addition to these, polyester based resins may preferably employed as an image receiving layer for sublimation type thermal transfer.

As additives, releasing agents, antioxidants, UV absorbers, light stabilizers, fillers, and pigments may be incorporated into the image receiving layer. Further, incorporated as sensitizers, may be plasticizers, heat solvents, and the like into the same. Listed as releasing agents are silicone oil (including those called silicone resins); solid waxes such as polyethylene wax, polypropylene wax, amide wax, Teflon powder and the like; fluorine based and phosphoric acid based surface active agents, and the like. Of these, silicone oil is preferred.

Cited as antioxidants may be those described in Japanese Patent Publication Open to Public Inspection Nos. 59-182785, 60-130735, 1-127387, and others, and compounds known in the art, which improve image durability in photographic or other image recording materials.

Cited as UV absorbers as well as light stabilizers may be those described in Japanese Patent Publication Open to Public Inspection Nos. 59-158287, 63-74686, and 63-145089, and other compounds known in the art, which improve image durability in photographic or other image recording materials.

Listed as fillers may be inorganic particles such as silica gel, calcium carbonate, titanium oxide, acid clay, active clay, alumina, and the like, and organic particles such as fluorine resin particles, guanamine resin particles, acrylic resin particles, silicone resin particles and the like.

Listed as representative pigments may be titanium white, calcium carbonate, zinc oxide, barium sulfate, silica, talc, clay, kaolin, active clay acid clay and the like.

In addition, in order to effectively minimize fusion between the image receiving layer and the ink layer of an ink sheet for thermal transfer recording, a releasing layer comprising releasing agents may be applied onto the surface of said image receiving layer. The thickness of said releasing layer is commonly between 0.03 and 2.0 μm. Further, either a cushion layer or a barrier layer may be provided between the support for ID cards and said image receiving layer. Other than these, image recording layers described in Japanese Patent Publication Open to Public Inspection Nos. 07-117367, 08-324117, 08-282196, 09-44065, and others may also be employed. However, the present invention is not limited to these examples.

In the sublimation image forming method, an ink sheet for sublimation type thermal transfer recording is employed. Said sheet for sublimation type thermal transfer recording may be comprised of a support having thereon a sublimable dye containing ink layer.

Said supports are not particularly limited, and those conventionally known in the art may be employed, as long as sufficient dimensional stability as well as heat resistance during recording with a thermal head is exhibited.

The sublimable dye containing ink layer basically comprises sublimable dyes as well as binders. Listed as sublimable dyes may be cyan dyes, magenta dyes, and yellow dyes. Listed as cyan dyes are naphthoquinone based dyes, anthraquinone based dyes, azomethine dyes, and the like, described in Japanese Patent Publication Open to Public Inspection Nos. 59-78896, 59-227948, 60-24966, 60-53563, 60-130735, 60-131292, 60-239289, 61-19396, 61-22993, 61-31292, 61-31467, 61-35994, 61-49893, 61-148269, 62-191191, 63-91288, 63-91287, 63-290793, and others.

Listed as magenta dyes are methine based dyes, azo based dyes, quinophthalone based dyes, and anthraisothiazole based dyes described in Japanese Patent Publication Open to Public Inspection Nos. 59-78896, 60-30392, 60-30394, 60-253595, 61-262190, 63-5992, 63-205288, 64-159, 64-63194, and others.

Further, particularly preferred sublimable dyes include azomethine dyes which are obtained through coupling reaction of compounds having a open chain type or closed chain type active methylene group with oxidized p-phenylenediamine derivatives or oxidized p-aminophenol derivatives, and indoaniline dyes which are obtained through coupling reaction of phenol or naphthol derivatives with oxidized p-phenylenediamine derivatives or oxidized p-aminophenol derivatives.

Further, when metal ion containing compounds are incorporated into the image receiving layer, sublimable dyes, which react with said metal containing compounds to form chelates, are preferably incorporated into an sublimable dye containing ink layer. Listed as such sublimable dyes capable of forming chelates may be cyan dyes, magenta dyes, and yellow dyes capable of forming bidentate chelates, which are described in, for example, Japanese Patent Publication Open to Public Inspection Nos. 59-78893, 59-109349, and Japanese Patent Application Nos. 2-213303, 2-214719, and 2-203742. Preferred sublimable dyes capable of forming a chelate may be represented by the general formula described below:

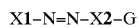

wherein X1 represents an aromatic carbon ring in which one ring is comprised of 5 to 7 atoms, or an atomic group necessary for completing a heterocyclic ring, and at least one in the position adjacent to a carbon atom bonded to an azo bond is a nitrogen atom or a carbon atom substituted with a chelating group. X2 represents an aromatic heterocyclic ring or an aromatic carbon ring in which at least one ring is formed employing 5 to 7 atoms. G represents a chelating group.

Sublimable dyes incorporated into the aforementioned sublimable dye containing ink layer, when an image to be prepared is monochromatic, may be any of yellow dyes, magenta dyes, and cyan dyes. Depending on the color of the image to be prepared, at least any two among said three dyes or other sublimable dyes may be incorporated. The employed amount of sublimable dyes is commonly between 0.1 and 20 g per $m^2$ of the support, and is preferably between 0.2 and 5 g. Binders in the ink layer are not particularly limited, and those, which have heretofore been known in the art, may be employed. Further, into said ink layer, suitably incorporated may be various types of additives which have heretofore been known in the art. Ink sheets for sublimation type thermal transfer recording are produced in such a manner that a coating composition used to form the ink layer is prepared by dispersing or dissolving the aforementioned various components in a solvent, and the resulting coating composition is applied onto the surface of a support and subsequently dried. The thickness of the ink layer prepared as described above is commonly between 0.2 and 10 μm, and is preferably between 0.3 and 3 μm.

Next, the transfer foil of the present invention will be described.

Employed as supports for said transfer foil are heat resistant plastic films comprised of polyester, polyethylene terephthalate, polyethylene naphthol, ABS resin, and the like. A releasing layer is provided on one surface as a bottom layer and an adhesive layer is provided as a top layer. If desired, a pattern layer, an interlayer, and the like, are provided between said releasing layer and said adhesive layer. The thickness of plastic film supports is commonly between 3 and 50 μm, and is preferably between 10 and 30 μm.

The releasing layer of the transfer foil may be comprised of resins such as acrylic resins, having a high glass transition temperature, polyvinyl acetal, polyvinyl butyral, and the like, waxes, various types of silicone oil, fluorine compounds, water-soluble polyvinylpyrrolidone, polyvinyl alcohols, Si-modified polyvinyl alcohols, methyl cellulose, hydroxy cellulose, silicone resins, paraffin waxes, acryl-modified silicone, polyethylene waxes, resins such as ethylene vinyl acetate, and in addition, polydimethylsiloxane and modified products thereof, for example, oil and resins such as polyester-modified silicone, acryl-modified silicone, urethane-modified silicone, alkyd-modified silicone, amino-modified silicone, epoxy-modified silicone, polyether-modified silicone, and hardened products thereof, and the like. Cited as other fluorine-based compounds are fluorinated olefins, perfluorophosphoric acid ester based compounds. Listed as preferred olefin based compounds are dispersions of polyethylene, polypropylene and the like and long chain alkyl based compounds such as polyethyleneimoneoctadecyl, and the like. Some releasing agents, which exhibit low solubility, may be dispersed and employed.

Further, it is possible to carry out addition to other polymers in the same manner as silicone compounds. Other than these, fine particles (having a diameter in the order of micron or submicron), and the like, are effective. The thickness is preferably between 0.2 and 2 $\mu$m.

Listed as compounds forming the adhesive layer of said transfer foil are thermally adhesive resins such as ethylene vinyl acetate resins, ethylene ethylacrylate resins, ethylene acrylic acid resins, ionomer resins, polybutadine resins, acrylic resins, polystyrene resins, polyester resins, olefin resins, urethane resins, adhesion providing agents (for instance, phenol resins, rosin resins, terpene resins, petroleum resins, and the like), and the like. Copolymers as well as mixtures thereof may be employed. The thickness is preferably between 0.1 and 10 $\mu$m.

Specifically, urethane-modified ethylene ethyl acrylate copolymers are commercially available such as Hitech S-6254, S-6254B, S-3129, and the like, manufactured by Toho Kagaku Kogyo Co., Ltd., and polyacrylic acid ester copolymers are commercially available as Jurimar AT-210, AT-510, and AT-613, manufactured by Nihon Junyaku Co., Ltd.; Plussize L-201, SR-102, SR-103, J-4, and others, manufactured by Ogo Kagaku Kogyo Co. The weight ratio of urethane-modified ethylene ethyl acrylate copolymers to polyacrylic acid ester copolymers is preferably between 9:1 and 2:8. The thickness of the adhesive layer is preferably between 0.1 and 1.0 $\mu$m.

The interlayer in the transfer foil is preferably comprised of at least two layers. When required, a primer layer as well as a barrier layer may be provided as the interlayer, and adhesion between layers may be further enhanced. Preferred as specific compounds are thermoplastic resins comprised of block polymers of polystyrene with polyolefin. Polyvinyl butyral resins having a degree of polymerization of at least 1,000, in the interlayer of the present invention, are commercially available such as Esurekku BH-3, BX-1, BX-2, BX-5, BX-55, and BH-S, manufactured by Sekisui Kagaku Kogyo Co., Ltd., and Denka Butyral #4000-2, #5000-A, #6000-EP, manufactured by Denki Kagaku Kogyo Co., Ltd., and the like. The degree of polymerization before themohardening of polybutyral thermohardening resins in the interlayer is not particularly limited, and resins may be employed which have a lower degree of polymerization. Isocyanate hardeners, epoxy hardeners, and the like, may be employed for thermohardening, and thermohardening conditions are preferably between 50 and 90° C. over 1 to 24 hours. The thickness of the interlayer is preferably between 0.1 and 1.0 $\mu$m.

The optical variable device, as described in the present invention, means (1) a two-dimensional CG image of diffraction grating such as a kinegram, which is characterized in that an image composed of line drawing freely moves, rotates, expands, shrinks and the like; (2) one characterized in that an image such as a pixelgram is converted into a positive as well as a negative; (3) one such OSD (Optical Security Device) in which the color varies from gold to green; (4) one such LEAD (Long Lasting Economical Anticopy Device) in which an image looks to be variable; (5) a stripe type OVD; (6) a metal foil. Security may be maintained employing sheet materials, special printing techniques, special inks, and the like, described in Nihon Insatsu Gakkai Shi (Journal of Japan Printing Society), Volume 35, No. 6, pages 482 to 496. In the present invention, a hologram is particularly preferred.

Optimally accepted as holograms employed in the present invention may be laser reproduction holograms such as a relief hologram, a Fresnells hologram, a Fraunhofer hologram, a lensless Fourier-transform hologram, an image hologram, and the like; whiteness reproduction holograms such as a Lippmann hologram, a rainbow hologram, and the like; a color hologram, a computer hologram, a hologram display, a multiflex hologram, a hologram flex stereogram, a holographic diffraction grating, and the like.

The optical variable device layer may be formed, for example, by adhering the hologram sheet onto the image receiving layer. Employed as hologram sheets may be a relief type hologram sheet. Said relief type hologram sheet comprises a support film having thereon a hologram forming layer and a hologram effect layer, in said order. It is possible to select various resins for said hologram forming layer as long as they do not adversely affect the present invention. Resins include, for example, acrylic urethane resins, epoxy modified acrylic resins, acrylamide resins, polystyrene resins, unsaturated polyester resins, and the like. These resins may be employed individually or in combination. Said hologram forming layer may be formed in such a manner that an ultraviolet radiation hardening agent is added, and a resin hardened by ultraviolet radiation or an electron ray-hardening resin is employed and the layer is hardened by electron ray and formed. By appropriately selecting the aforementioned various materials, a refractive index as well as a thermal expansion coefficient of the present invention may be obtained. Specifically, the hologram sheet may be prepared as follows. A resin layer which is solid at normal temperature and has thermal shape forming properties, for example, an electron ray-hardening thermoplastic resin layer (a hologram forming layer), which is solid at normal temperature, is formed on a support film such as polyethylene terephthalate film. The resulting surface is pressed with an original plate of a hologram, in which a hologram diffraction pattern is formed with concave and convex areas, and said concave and convex shape is transferred to the resin surface, and the resulting surface is then hardened. Further, formed on the convex and concave surface of a hologram effect layer, which is provided with sufficient transparency as well as large reflectivity at a certain angle and is comprised of material (for example, an evaporated film of $TiO_2$, $SiO_2$, and ZnS) having a different refractive index from those in the hologram forming layer. The hologram reproduces images employing white light such as daylight, illuminating light and the like. Accordingly, in a normal state, a hologram image is observed and thus excellent decorative properties are exhibited. On the other hand, those in which images are reproduced by laser beam are advantageous for detecting alteration.

The optical variable device layer is a layer having different reflective or transmitting characteristics from that of normal layer. Examples of the optical variable device layer include the hologram layer and a beads containing layer. The beads containing layer synthesizes a part of the incident light to which phase difference is given with the incident light, by which light component of specific wavelength is emphasized by interference and light having different tone from the incident light is returned in a direction of incident light. The beads containing layer comprises a reflective base and well-order arranged transparent beads provided on the base. A resin layer may be provided on the base. Preferable diameter of the beads is 5 to 80 μm. Example of the beads material is glass.

Another example of material employed in the optical variable device layer is pigment having high iris reflection such as fine particles of metal oxide. One of the example is pearl pigment which is mica coated with transparent metal chalcogenide having high refractive index. Metal chalcogenide such as Pbo, ZnS, $Fe_2O_3$, $Sb_2S_3$, ZnSe, CdS, $Bi_2O_3$, $TiO_3$, SiO, ZnO, $Sb_2O_3$, $Nd_2O_3$, $Ta_2O_5$ is coated as a single coated layer or multi coated layer. For example, the pearl pigment mixed with a resin is employed to prepare the optical variable device layer or an ink by which characters are provided or lamination is provided on the hologram sheet.

Other embodiments can be employed for the optical variable device layer.

In the present invention, an actinic light-hardened resin layer having a breaking elongation of 5 to 90 percent is provided, and an actinic light-hardened layer having a static surface friction coefficient of 0.01 to 0.5 is also provided. As a result, scratch resistance is enhanced and excellent surface protection is exhibited.

[Measurement Method of Breaking Elongation]

The breaking elongation (in percent) in the present invention was measured as follows. A resin layer was left untouched at ambient conditions of 23° C. and 55% RH for at least one hour. Thereafter, the resulting layer was measured employing a Tensiron Multipurpose Tester RTA-100 of Orienteku Co., Ltd., while carrying out data processing, employing Tensiron Multifunctional Type Data Process Type MP-100/200S Ver. 44. The resin was fixed employing an air-chuck method. It is possible to select each of ranges as follows: 5 to 100 mm/minute for the cross head speed, 5 to 100 percent for the RANGE, and 0.1 to 500 kg for the load. In the present invention, evaluation was carried out at a cross head speed of 30 mm/minute, a RANGE of 20 percent, and a load of 100 kg.

Further, when the breaking elongation of resins or actinic light-hardened resins is measured, it is difficult to prepare a single resin film comprised of only the actinic light-hardened resin layer. Therefore, a 5 μm thick resin layer is formed on a 12 μm thick PET. The actinic light-hardened resin layer was conveyed two times at a 5 m of CS under a mercury lamp having exposure energy of 160 W/cm and thereby the layer was hardened. Measurements were carried out in such a manner that a 1 cm wide sample was fixed employing an air chuck and pulling tests were carried out.

The breaking elongation was obtained based on the breaking elongation point at which during pulling resins or actinic light-hardened resins, breaking or cracking occurred.

[Measurement Method of Static Friction Coefficient]

The static friction coefficient (μs) can be obtained based on the principle which is employed in Friction Coefficient Test Method, described in JIS K7125. After a resin is left untouched at conditions of 25° C. and 60% RH for at least one hour, a constant load (contact force Fp, for example, of 50 to 200 g) is applied to a steel ball (for instance, having a diameter of 0.5 to 5 mm), which is allowed to slide on the surface of the resin layer at a constant speed (for example, 2 to 100 cm/minute) During sliding, the first maximum load (a static friction force)(Fs) is measured and the static friction coefficient is obtained employing the numeral 1 described below.

$\mu s = Fs/Fp$ wherein μs represents the static friction coefficient, Fs represents the static friction force in kgf, and Fp represents the contact force N in kgf.

In the present invention, measurements were carried out employing a Surface Properties Measurement Instrument Heidon (Type 14DR) manufactured by Shinto Kagaku Co., Ltd., at the conditions of a 100 g load, as well as a speed of 600 mm/minute. Further, measurements were carried out employing a load converter 100 of and a ball pressure element (a 5 mm chrome ball) as the measurement devices.

Further, the transfer foil of the present invention employs a support having a central line average roughness (Ra) of 0.05 to 0.5 μm on at least one surface. Further, in the transfer foil in which a transfer layer is provided on a support, employed may be a support having a central line average roughness (Ra) of 0.05 to 0.5 μm on the surface onto which transfer is not yet carried out.

[Measurement Method of Central Line Roughness (Hereinafter Referred to as Ra) (Measurement Method of Surface Roughness of Support)]

The 3-dimensinal surface roughness of supports was measured employing a Non-contact 3-Dimensional Minute Surface Measurement Apparatus RST PLUS manufactured by WYKO Co.

Measurements were carried out at conditions of an objective lens having a magnification factor of 40, a magnification factor selector of 0.5 time, a spatial sampling distance of 0.42×0.48 μm, while employing the "Vertical Scan Method".

First, an area of approximately 115×150 μm was measured. When discontinuous data existed, data were corrected (so as to be continuous) by employing the ancillary software provided with said apparatus. Thereafter, the area was selected, and data were processed to those of 100×100 μm (number of data points was 238×209). Measured data were expressed in the form of a histogram, and the height of the surface roughness was calculated based on the resulting data.

<Ra Making Means and Preferable Form>

It is preferable to use a matting agent to obtain Ra. A matting agent may be both of an organic material or an inorganic material. Examples of the inorganic material include silica described in Switzerland Patent No. 330,158 etc., glass powder described in French Patent No. 1,296,995 etc., carbonate of alkaline earth metal, cadmium, zinc etc., described in United Kingdom Patent No. 1,173,181 etc., as a matting agent. Examples of the organic material include starch described in U.S. Pat. No. 2,322,037 etc., starch derivative described in Belgium Patent No. 625,451 and United Kingdom Patent No. 981,198 etc., polyvinyl alcohol described in JP-B-No. 44-3643 etc., polystyrene or polymethacrylate described in Switzerland Patent No. 330,158 etc., polyacrylonitrile described in U.S. Pat. No. 3,079,257 etc., polycarbonate described in U.S. Pat. No. 3,022,169 etc.

As preferable fine particles, examples include amorphous silica, boron nitride, aluminum nitride, spherical silica, titanium dioxide, magnesium oxide, aluminum oxide, calcium carbonate, hydroxy apatite, magnesium carbonate, barium sulphate, strontium sulfate, polymethyl methacrylate, poly methylacrylate, polystyrene, polyacrylonitrile, cellulose acetate, cellulose propionate, silicone, Teflon, etc. The matting agent may be uniform or non-uniform in its shape.

The matting agent may be contained in an arbitrary component layer. It is preferable that Ra at non-transfer side is 0.05–0.5 μm and is more preferable in a range of 0.15–0.5 from the viewpoint of preserve property of transfer foil, and is preferable furthermore in a range of 0.2–0.45, in the transfer foil having provided with a transfer layer in order to achieve a purpose of this invention.

The matting agent may be adhered by a method of coating a composition in which the matting agent has been dispersed preliminarily, or a method that the matting agent is sprayed before completion of drying after coating of a coating composition. And when plural kinds of matting agent are added, both methods may be employed jointly.

Polymerization velocity can be improved by intercepting air with nitrogen substitution, a method by reduced pressure etc. by a case.

<Actinic Ray>

As an Actinic ray, anything generating an actinic electromagnetic wave for polymerization initiator can be employed. For example, laser, light emitting diode, xenon flash lamp, halogen lamp, carbon arc lamp, metal halide lamp, tungsten lamp, mercury lamp, electrodeless lamp etc. can be given. As an example of preferable light source, xenon lamp, halogen lamp, carbon arc lamp, metal halide lamp, tungsten lamp, mercury lamp etc. are given. The energy added in this instance can be employed optionally by so selecting as adjusting exposure distance, time and strength in accordance with a kind of polymerization initiator. The actinic ray can increase polymerization rate by intercepting air by a method of nitrogen substitution, reduced pressure, etc. depending on cases.

When a laser is employed as a light source, it is easy to narrow down exposure spot to minute size, and therefore high-resolution image forming is available.

As the laser light source, any of Ar laser, He-Ne gas laser, YAG laser, semiconductor laser etc. are employed suitably.

When a photo-curing is done using an actinic ray, reduced pressure and means to stabilize a photo-curing in nitrogen gas stream etc. may be employed.

Thermal energy can be added other than an actinic ray, and, oven, heat-roll, hot stamp, thermal head, the laser light, infrared rays flash, thermal pen are selected optionally, etc. may be employed for the means thereof.

<Coupling Agent>

Coupling agent represents silicone series, aluminum system, coupling agent of titanium system etc., and those described in Japanese Patent Publication Open to Public Inspection No. 2-4258, Japanese Patent Publication Open to Public Inspection No. 4-161957 can be given.

Coupling agent preferably used in the invention is silane or titanium coupling agent. Various silane coupling agents are exemplified.

N-3-(acryloxy-2-hydroxypropyl)-3-aminopropyl triethoxysilane, (3-acryloxy propyl)dimethylmethoxy silane, (3-acryloxypropyl)methyl dimethoxy silane, (3-acryloxy propyl)trimethoxy silane, 3-(N-arylamino) propyltrimethoxy silane, allyldimethoxy silane, allyltriethoxysilane, allyl trimethoxysilane, 3-butenyltriethoxy silane, 2-(chloromethyl)allyltrimethoxy silane, methacrylamidopropyltriethoxy silane, N-(3-methacryloxy-2-hydroxypropyl)-3-aminopropyl triethoxy silane, (methacryloxymethyl)dimethylethoxy silane, methacryloxymethyltriethoxy silane, methacryloxymethyl trimethoxy silane, methacryloxypropyldimethylethoxy silane, methacryloxypropylmethyldiethoxy silane, methacryloxypropyl methyldimethoxy silane, methacryloxypropylmethyltriethoxy silane, methacryloxypropylmethyltrimethoxysilane, methacryloxypropyltris(methoxyethoxy) silane, methoxydimethylvinyl silane, 1-methoxy-3-(trimethylsiloxy) butadiene, styrylethyltrimethoxy silane, 3-(N-styrylmethyl-2-aminoethylamino)-propyltrimethoxy silane hydrochloride, vinyldimethylethoxy silane, vinyldiphenylethoxy silane, vinylmethyldiethoxy silane, vinylmethyldimethoxy silane, O-(vinyloxyethyl)-N-(triethoxysilylpropyl)urethane, vinyltriethoxysilane, vinyltrimethoxysilane, vinyltri-t-butoxy silane, vinyltriisopropoxy silane, vinyltriphenoxy silane, vinyltris(2-methoxyethoxy) silane, diallylaminopropylmethoxy silane.

Various titanate coupling agents are exemplified.

A-1 (tetra-i-propoxy titanium), B-1 (tetra-n-butoxy titanium), TOT (tetrakis(2-ethylhexyloxy)titanium, TST (tetra stearyloxy titanium), TAA (di-i-propoxybis (acetylacetonate)titanium, TAT (di-n-butoxybis (triethanolaminate)titanium, TLA (dihydroxy)bis(lactate) titanium, TOG (titanium-i-propoxy octyleneglycolate), TTS (titanium stearate), those mentioned above are manufactured by Nippon Soda Co. Ltd., EL-105 (alkyl titanate series, manufactured by Orient Morton), KRTTS (isopropyltriisostearoyl titanate), KR38S (an isopropyl), KR44 (isopropyltri(N-aminoethyl-aminoethyl)titanate), KR46B (tetraoctyl bis(di tridecylphosphite)titanate), KR55 (tetra(2,2-diallyloxy methyl-1-butylbis(ditridecyl)phosphite titanate), KR138S (bis(dioctylpyrophosphate) hydroxyacetate titanate), KR238S (bis (dioctylpyrophosphate)ethylenetitanate), KR2S (isopropyltrioctanoyl titanate), KR7 (isopropyldimthacryliso stearoyl titanate), KR9S (isopropyltridodecylbenzenesulfonyl titanate), KR11 (isopropylisostearoyldiacrylic titanate), KR12 (isopropyltridioctylphosphate titanate), KR34S (isopropyltricumylphenyl titanate), KR41B (tetraisopropyl-bisdioctylphosphite titanate, those mentioned above are manufactured by Ajinomoto Co. Inc. A-1 and B-1 are preferably employed in particular, <Resins having Preferable Breaking Elongation>

Any resins having breaking elongation of 5 to 90% may be employed. Practically natural polymer, synthetic resin, polymer, copolymer and medium forming film are included. The examples are gelatin, gum arabic, poly(vinylalcohol), hydroxyethyl cellulose, cellulose acetate, cellulose acetate butylate, poly(vinylpyrrolidone), casein, starch, poly (acrylic acid), poly(methylmethacrylic acid), poly (chloroethylene), poly (methacrylic acid), copoly(styrene maleic anhydride), copoly (styrene-acrylonitrile), copoly (styrene-butadiene), polyvinyl acetals such as polyvinylformal and polyvinylbutyral, polyesters, polyurethanes, phenoxy resin, polyvinylidene chloride, polyepoxides, polycarbonates, polyvinyl acetate, cellulose esters, polyamides. The resins may be hydrophobic or hydrophilic. It is preferred to employ transparent binder in the invention. It is preferred to employ a resin which form a hardened layer by actinic ray to give good final quality.

<Resin Giving Preferable Static Frictional Coefficient>

Any resins may be employed as far as they have static frictional coefficient of 0.01 to 0.5. The examples of the resin include silicone resins, fluorinated resins, polyethylene wax, amide wax. It is preferred to employ a resin which form a hardened layer by actinic ray in view of manufacturing process, manufacturing cost and good final quality.

<Layer Hardened by Actinic Ray>

Layer hardened by actinic ray of the invention is composed of materials capable of addition polymerization or open chain polymerization. The addition polymerization compound includes a radical polymerizable compound such as photohardenable material employing photo(or thermo) polymerizable compounds described in, for example, Japanese Patent Open to Public Publication No. 7-159983, Japanese Patent Publication No. 7-31399, Japanese Patent Open to Public Publication Nos. 8-224982, and 10-863, Japanese Patent Application No. 7-231444 and Japanese Patent Application No. 7-231444. The photohardenable material of cationic polymerization is known as the addition polymerization compound, and a photohardenable material of photo-cation polymerization sensitized in the longer range than visible ray recently published, for example, in Japanese Patent Open to Public Publication Nos. 6-43633 and 8-324137. Both may be employed in the invention. One or more layers hardened by actinic ray are provided in the layer arrangement, and at least one of the layer satisfies the breaking elongation or static frictional coefficient as stipulated in the invention. It is preferable that the outermost layer in a card satisfies the frictional coefficient stipulated in the invention.

The actinic-hardened layer of the invention has a breaking elongation of 5 to 90%, preferably 10 to 80%, particularly 10 to 50% is preferable. The actinic-hardened layer preferably comprises a compound composed of a monomer or an oligomer having ethylenic unsaturated group. The actinic-hardened layer preferably comprises a compound composed of a monomer or an oligomer each of which has a breaking elongation of 5 to 90% by itself.

<Initiator for Actinic Ray Hardening>

A radical polymerization initiator is given for another compound generating radical or acid which may be employed with radical polymerizable composition containing specified compound in the invention. The specific compound in the innovation generates radical such as Cl by light or heat, and the radical withdraws proton in the layer to generate acid such as HCl whereby polymerization is conducted. At this stage, the polymerization initiator mentioned below, which may be employed in combination, generates radical or acid whereby the polymerization is conducted.

The radical polymerizable compound and radical polymerization initiator are preferably used in combination. The radical polymerization initiator includes triazine derivatives as described in Japanese Patent Publication Nos. 59-1281 and 61-9621, and Japanese Patent O.P.I. Publication No. 60-60104; organic peroxides as described in Japanese Patent O.P.I. Publication Nos. 59-1504 and 61-243807; diazonium compounds as described in Japanese Patent Publication Nos. 43-23684, 44-6413, and 47-1604, and U.S. Pat. No. 3,567, 453; organic azides as described in U.S. Pat. Nos. 2,848,328, 2,852,379, and 2,940,853; o-quinonediazides as described in Japanese Patent Publication Nos. 36-22062, 37-13109, 38-18015 and 45-9610; onium compounds as described in Japanese Patent Publication No. 55-39162, Japanese Patent O.P.I. Publication No. 59-14023, and "Macromolecules", Vol. 10, 1307 (1977); azo compounds as described in Japanese Patent Publication No. 59-142205; metal arene complexes as described in Japanese Patent O.P.I. Publication No. 1-54440, European Patent Nos. 109,851 and 126,712, and "Journal of Imaging Science", Vol. 30, 174 (1986); (oxo)sulfonium organic boron complexes as described in Japanese Patent O.P.I. Publication Nos. 5-213861 and 5-255347; titanocenes as described in Japanese Patent O.P.I. Publication No. 61-151195; transition metal complexes containing a transition metal such as ruthenium as described in Japanese Patent O.P.I. Publication No. 2-182701 and "Coordination Chemistry Review", Vol. 84, 85–277 (1988); 2,4, 5-triaryl imidazoles as described in Japanese Patent O.P.I. Publication No. 3-209477; carbon tetrabromide; and organic halogenated compounds as described in Japanese Patent O.P.I. Publication No. 59-107344. The radical polymerization initiator is used in an amount of preferably 0.01 to 10 weight parts based on 100 weight parts of the radical polymerizable compound used.

The imaging layer containing the radical polymerizable compound can contain a thermal polymerization initiator, which is generally used in a conventional polymerization process, in order to initiate thermal polymerization of the radical polymerizable compound. The thermal polymerization initiator herein referred to is a compound capable of generating a radical when heat is applied.

The thermal polymerization initiator includes azobisnitriles such as 2,2'-azobisisobutyronitrile or 2,2'-azobispropionitrile; organic peroxides such as benzoyl peroxide, lauroyl peroxide, acetyl peroxide, t-butyl perbenzoate, α-cumylhydro peroxide, di-t-butyl peroxide, diisopropylperoxy dicarbonate, t-butylperoxyisopropyl carbonate, peracids, alkyl peroxycarbamates, and nitrosoarylacyl amines; inorganic peroxides such as potassium persulfate, ammonium persulfate, and potassium perchlorate; azo or diazo compounds such as diazoamino benzene, p-nitrobenzene diazonium compounds, azobisalkyls, diazothioethers; arylazosulfones; nitrosophenyl urea; tetramethylthiuram disulfide; diaryl disulfides; dibenzoyl disulfide; tetraalkyl thiuram disulfides; dialkylxanthic acid disulfides; aryl sulfinic acids; arylalkyl sulfonic acids; and 1-alkane sulfinic acids. Of these, the especially preferable is an initiator, which has excellent stability at ordinary temperature and high decomposition speed on heating, and when decomposed, turns colorless, including benzoyl peroxide and 2,2'-azobisisobutyronitrile. These initiators can be used singly or in combination of two or more kinds. The initiator content of the imaging layer is preferably 0.1 to 30 weight %, and more preferably 0.5 to 20 weight %.

Of these, the especially preferable is an initiator, which has excellent stability at ordinary temperature and high decomposition speed on heating, and when decomposed, turns colorless, including benzoyl peroxide and 2,2'-azobisisobutyronitrile. These initiators can be used singly or in combination of two or more kinds. The initiator content of the imaging layer is preferably 0.1 to 30 weight %, and more preferably 0.5 to 20 weight %.

1) Cationic Polymerization Photohardened Resin Cationic Polymerizable Compound

Example of an epoxy type UV ray hardenable prepolymer or monomer polymerized by cation polymerization includes prepolymer containing two or more epoxy groups in a molecule. Examples of the prepolymer are alicyclic epoxides, polyglycidyl ethers of polyalcohol, polyglycidyl ethers of aromatic polyols, hydrogen adduct compounds of polyglycidyl ethers of aromatic polyols, urethanpolyepoxy compounds and epoxy modified polybutadiens. These prepolymers may be employed solely or by mixing two or more compounds in combination.

Content of the prepolymer containing two or more epoxy group in the coating composition for forming UV ray hardening protective layer is preferably 70 weight % or more. Cationic polymerizable compound comprised of cationic polymerizable composition includes (1) styrene derivative, (2) vinylnaphthalene derivative, (3) vinylether and (4) N-vinyl compound. Examples are shown.

(1) styrene derivative

Styrene, p-methylstyrene, p-methoxystyrene, β-methylstyrene, p-methoxystyrene, β-methylstyrene, p-methyl-β-methylstyrene, α-methylstyrene, p-methoxy-β-methylstyrene.

(2) vinylnaphthalene derivative 1-vinylnaphthalene, α-methyl-1-vinylnaphthalene, β-methyl-1-vinylnaphthalene, 4-methyl-1-vinylnaphthalene, 4-methoxy-1-vinylnaphthalene.

(3) vinylether

Isobutylvinyl ether, ethylvinyl ether, phenylvinyl ether, p-methylphenylvinyl ether, p-methoxyphenylvinyl ether, α-methylphenylvinyl ether, β-methylisobutylvinyl ether, β-chloroisobutylvinyl ether (4) N-vinyl compound N-vinyl carbazole, N-vinylpyrrolidone, N-vinylindole, N-vinylpyrrole, N-vinyl phenothiazine, N-vinyl acetanilide, N-vinyl ethyl acetamide, N-vinyl succinimide, N-vinyl phthalimide, N-vinyl caprolactam, N-vinyl imidazole Content of cation polymerizable compound in the cationic polymerizable composition is preferably 1 to 97 weight %, and more preferably 30 to 95 weight %.

<Cationic Polymerization Initiator>

The cation polymerization initiator is preferably aromatic onium salts, and includes a salt of an element of Va group in the periodic table, for example, phosphonium salt such as hexafluorophosphoric acid triphenylphenacyl phosphonium, a salt of an element of VIa group in the periodic table, for example, sulfonium salt such as tetrafluoroboric acid triphenylsulfonium, hexafluorophosphoric acid triphenyl sulfonium, hexafluorophosphoric acid tris(4-methoxyphenyl) sulfonium, or hexafluoroantimonic acid triphenyl sulfonium, and a salt of an element of VIIa group in the periodic table, for example, iodonium salt such as chlorophenyl iodonium salt.

The use of the aromatic onium salt as a cationic polymerization initiator in polymerization of an epoxy compound is described in U.S. Pat. Nos. 4,058,401, 4,069,055, 4,101,513 and 4,161,478.

The preferable cation polymerization initiator are sulfonium salts of an element of VIa group in the periodic table. Hexafluoroantimonic acid triaryl sulfonium is especially preferable in view of UV hardenability or storage stability. Further photopolymerization initiator described at pages 39–56 in "Photopolymer Handbook", Edited Photopolymer Konnwakai, issued by Kogyo Chosakai, and compounds described in Japanese Patent O.P.I. Publication Nos. 64-13142 and 2-4804 may be employed arbitrary.

2) Radical Polymerization Photohardened Resin Radical Polymerizable Compound

It is preferred to employ radical polymerization photohardened resin as for the protect layer (resin layer) of the invention. Radical polymerizable compound to be contained in Radical polymerizable composition includes usual photopolymerizable compound and thermopolymerizable compound. The radical polymerizable compound is a compound having ethylenic unsaturated bond capable of radically polymerization, and any compound having at least one of ethylenic unsaturated bond capable of radically polymerization in a molecule. It includes those having chemical form of monomer, oligomer polymer etc. The radical polymerizable compound may be employed solely or two or more in arbitrary ratio for improving targeted characteristics.

As an example of a compound having the ethylenic unsaturated bond capable of radical polymerization, unsaturated carboxylic acid of acrylic acid, methacrylic acid, itaconic acid, crotonic acid, isocrotonic acid, maleic acid etc. and salt thereof, ester, urethane, amide, anhydride, acrylonitrile, styrene, various kinds of unsaturated polyester, unsaturated polyether, unsaturated polyamide, unsaturated urethane etc. are mentioned.

To be concrete acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxy polyethoxyphenyl)propane, neopentylglycol diacrylate, 1,6-hexanediol diacrylate, ethyleneglycol diacrylate, diethyleneglycol diacrylate, triethyleneglycol diacrylate, tetraethylene glycol diacrylate, polyethylene glycol diacrylate, polypropyleneglycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, epoxy acrylate etc.;

methacrylic acid derivatives such as methyl methacrylate, n-butylmethacrylate, 2-ethylhexyl methacrylate, lauryl methacrylate, allyl methacrylate, glycidyl methacrylate, benzyl methacrylate, dimethylaminomethyl methacrylate, 1,6-hexane diol dimethacrylate, ethyleneglycol dimethacrylate, triethyleneglycol dimethacrylate, polyethylene glycol dimethacrylate, polypropylene glycol dimethacrylate, trimethylol ethane trimethacrylate, trimethylolpropane trimethacrylate, 2,2-bis(4-methacryloxy poly ethoxyphenyl) propane etc.; a derivative of allyl compound such as allyl glycidyl ether, diallyphthalate, tri allyl trimellitate etc. are exemplified. Further, radically polymerizable or crosslinkable compounds, oligomer and polymer on market may be employed, which is described in "Crosslinking Agent Handbook (Edited by Shinzo Yamashita, published by Taiseisha in 1981), "UV/EB Hardening Handbook" (Material Edition) (Edited by Seishi Kato, published by Polymer Publishing Society in 1985); "UV/EB hardening technical application and market", 79 pages (Edited by Radtech Kenkyuukai,CMC); "Polyester resin handbook" (Edited by in Eiichiro Takiyama, NikkanKogyou Shinbunnsha, 1988).

Content of the radical polymerizable compound in the radical polymerizable composition is preferably 1 to 97 wt %, and more preferably 30 to 95 wt %.

3) Acid Crosslinking Photopolymerizable Resin

The crosslinking agent employed in the acid crosslinking composition a compound generating crosslinking reaction by acid generated from specific compound of the invention through radiation of actinic ray or radioactive ray. The crosslinking agent preferably employed in the invention is a compound having two or more hydroxymethyl, alkoxymethyl, epoxy or vinylether group in the molecule. Preferable example is a compound in which these crosslinking functional group directly bond to aromatic ring. Practically, methylolmelamine, resol, epoxy modified novolak resin, urea resin are mentioned. Compounds described in "Crosslinking Agent Handbook" (Edited by Shinzo Yamashita, published by Taiseisha in 1981) is preferable in addition thereto. Particularly phenol derivatives having two or more hydroxymethyl or alkoxy methyl group is preferable because strength of image portion when the image is formed is acceptable. The example of the resin is resol.

However these crosslinking agent is unstable for heat, and storage ability after forming image recording material is not so favorite. Contrary to this phenol derivatives having two or more hydroxymethyl or alkoxy methyl group bonding to benzene ring in a molecule and molecular weight of not more than 1,200 are acceptable in stability during storage, and are employed in the invention suitably. Alkoxymethyl having carbon atoms of 6 or less is preferable. Particularly, Methoxymethyl group, ethoxymethyl group, n-propoxymethyl group, isopropoxymethyl group, n-butoxymethyl group, isobutoxymethyl group, sec-butoxymethyl group and t-butoxymethyl group are preferable. Further, alkoxy substituted alkoxymethyl group such as 2-methoxyethoxymethyl group and 2-methoxy-1-propoxymethyl group, is preferable. In concrete, compounds described in Japanese Patent Publication Open to Public Inspection No. 6-282067, Japanese Patent Publication Open to Public Inspection No. 7-64285, EP632, 003 A 1 etc. are mentioned.

Other crosslinking agent employed suitably in the invention can be aldehyde or ketone compound. Preferable is a compound containing two or more aldehyde or ketone in the molecule.

The crosslinking agent is employed in an amount of 5 to 70 wt %, preferably 10 to 65 wt % in the solid component of whole image forming material in the invention. In case the amount is not more than 5 wt % layer strength of the image portion after forming image recording deteriorates, and it is not preferable in view point of stability during storage in case of 70 wt % or more. These crosslinking agents are employed solely or in combining two or more.

<Additives to Actinic Ray Hardened Resin>

Sensitizer

The photosensitive composition can be made to an polymerizable composition having extremely high sensitivity by forming a composition in combination with various sensitizer to enhance activity to light from ultraviolet to near ultraviolet region. As for the concrete example of the sensitizer in the invention, unsaturated ketones represented by chalcones and dibenzoylacetone etc., 1,2-diketone derivative represented by benzyl and camphor quinone, polymethine dye such as benzoin derivative, fluorene derivative, naphthoquinone derivative, anthraquinone derivative, xanthene derivative, thioxanthene derivative, xanthone derivative, thioxanthone derivative, coumarin derivative, keto coumarin derivative, cyanine derivative, styryl derivative, merocyanine derivative, oxonol derivative, acridine derivative, azine derivative, thiazine derivative, oxazine derivative, indoline derivative, azulene derivative, azulenium derivative, squarilium derivative, porphyrin derivative, tetraphenylporphyrin derivative, triaryl methanes, tetrabenzporphin derivative, tetra pyrazino porphyrazine derivative, phthalocyanine derivative, tetraaza porphyrazine derivative, tetra quinoquisariro porphyrazine derivative, naphthalocyanine derivative, subphthalocyanine derivative, pyrylium derivative, thiopyrylium derivative, tetraphylline derivative, annulene derivative, spiropyran derivative, spiro oxazine derivative, thio spiropyran derivative, metal arene complex, organic ruthenium complex are mentioned. In addition thereto, dyes and sensitizer described in "Dye Handbok" edited by Makoto Okawahara et al. (Kodansha, 1981), "Kinousei sikisono Kagaku (Chemistry of Functional Dyes)" edited by Makoto Okawahara et al. (CMC, 1981), "Tokushu Kinou Zairyo (Special Functional Material)" edited by Chuzaburo Ikemori (CMC, 1986), Japanese Patent Application No. 7-108045. Further it includes dyes and sensitizer having absorption of light from ultraviolet to near infrared. Two or more of these may be employed in arbitrary ratio. Polymerization promoter, chain transfer agent, etc.

Polymerization promoter and chain transfer agent may be added to the photosensitive composition. Concrete example thereof is mentioned to amines such as N-phenylglycine, triethanolamine and N,N-diethylaniline, thiols described in U.S. Pat. No. 4,414,312, and Japanese Patent Publication Open to Public Inspection No. 64-13144, disulfides described in Japanese Patent Publication Open to Public Inspection No. 2-291561, thiones described in U.S. Pat. No. 3,558,322 and Japanese Patent Publication Open to Public Inspection No. 64-17048, o-acylthio hydroxamate and N-alkoxypyridine thione described in Japanese Patent Publication Open to Public Inspection No. 2-291560.

Photosensitive composition of the invention may employ a dye, an organic and inorganic pigment, oxygen scavenger and such as phosphine, phosphonate, phosphite, reducing agent, fog inhibitor, fading inhibitor, halation inhibitor, fluorescent whitening agent, a surface active agent, a coloring agent, extending agent, a plasticizer, fire retardant, oxidation inhibitor, ultraviolet absorption agent, foaming agent, an anti-mold agent, anti-static agent, magnetic material, or other additives to give various characteristics or diluting solvent according to a purpose in admixture.

Polymerization Inhibitor

Polymerization inhibitor may be added to the radical polymerization composition containing radical polymerizable compound for the purpose of inhibiting polymerization during reservation of the liquid in the photohardened resin. Concrete examples of the thermopolymerization inhibitor which is capable of addition to the radical polymerization composition include p-methoxyphenol, hydroquinone, alkyl substituted hydroquinone, catechol, tert-butylcatechol and phenothiazine. These thermopolymerization inhibitors is preferably added 0.001 to 5 weight parts of 100 weight parts of compound having radically polymerizable ethylenic unsaturated bond.

<Additive to the Resin Layer>

According to non-hardening type resin need, polyvinylbutyral resin, polyurethane resin, polyamide resin, polyester resin, epoxy resin, novolak resin, styrene, paramethylstyrene, methacrylate, vinyl monomer and cellulose of acrylate, thermoplasticity polyester, natural resin may use other arbitrary high molecular weight polymer jointly. And organic high molecular polymers, such as disclosed in "New Practical Technology of Photopolymer" edited by Kiyosi Akamatsu (CMC, 1987) and 657–767 pages of "10188 Chemical Product", (Kagaku Kogyo Nipposha, 1988) may be employed in combination. Content of the organic high molecular polymers in the photosensitive composition is preferably 1 to 70 wt %, more preferably 5 to 50 wt %.

Antistatic Agent

As for the antistatic agent, compounds described at pages 875–876 of "11290 Chemical Product", (Kagaku Kogyo Nipposha) are mentioned in addition to cation surfactant, anion surfactant, nonion surfactant, polymer antistatic agent, and conductive fine particles.

Surface Active Agent

And, a surface active agent can be added as auxiliary agent in order to make the coefficient of friction of the photohardenable layer in a range stipulated in this invention in the image forming layer of image forming materials of this invention. Nonionic surface active agents disclosed in Japanese Patent Publication Open to Public Inspection Nos. 62-251740 and 3-208514, and ampholytic surface active agents described in Japanese Patent Publication Open to Public Inspection Nos. 59-121044 and 4-13149 can be added.

Sorbitan tristearate, sorbitan monopalmitate, sorbitan trioleate, monoglyceride stearate, polyoxyethylene nonylphenyl ethers are nominated for a concrete example of nonionic surface active agent. And for example, as a concrete example of ampholytic surface active agent, alkyldi(aminoethyl)glycin, alkyl polyaminoethylglycin hydrochloride, 2-alkyl-N-carboxyethyl-N-hydroxyethyl imidazolinium betaine, N-tetradecyl-N, N-betaine type, for example, trade name Amogen K (product of Daiichi Kogyo Co., Ltd.) are given.

Fluorine Surface Active Agent

Fluorine surface active agent represented by the following structure may be added to reduce friction coefficient stipulated in the invention. The fluorine surface active agent employed in the invention is a polymer of one, two or more monomers represented by formula (1), (2) or (3), or copolymer of the monomer and a monomer capable of polymerization with this monomer.

$$CH_2=C(R_1)COOARf \quad \text{Formula (1)}$$

wherein $R_1$: —H, —X (halogen group), alkyl group or alkyl halide group,

A: bivalent bonding group such as carbonyl group, alkylene group, (poly)oxy alkylene group, urethane group or peptide group, and Rf: a hydrocarbon group at least one hydrogen of which is substituted fluorine having carbon atoms of 1 to 30.

$$CH_2=C(R_1)COO(A)N(R_2)SO_2Rf \quad \text{Formula (2)}$$

wherein $R_1$: —H, —X (halogen group), alkyl group or alkyl halide group, $R_2$: —H, —X (halogen group), alkyl group or alkyl halide group, A: bivalent bonding group such as carbonyl group, alkylene group, (poly)oxy alkylene group, urethane group or peptide group, and Rf: a hydrocarbon group at least one hydrogen of which is substituted fluorine having carbon atoms of 1 to 30.

$$CH_2=C(R_1)Ar(R_2)l[(A)_mRf]_n \quad \text{Formula (3)}$$

wherein $R_1$: —H, —X (halogen group), alkyl group or alkyl halide group,

Ar: —$C_6H_{5-1-n}$, $R_2$: —H, —X (halogen group), or a group capable of substituting benzene group such as alkyl group or alkyl halide group, A: bivalent bonding group such as carbonyl group, alkylene group, (poly)oxy alkylene group, urethane group, peptide group, and Rf: a hydrocarbon group at least one hydrogen of which is substituted fluorine having carbon atoms of 1 to 30. l is 0 to 4, m is 0 or 1, and n is 1 to 5.

Examples of compounds represented by the above formulas are given.

$$CH_2=C(CH_3)COOCH_2CF_2CHF_2 \quad (1)$$

$$CH_2=C(CH_3)COOCCH_2CF_2CF_2CF_2CHF_2 \quad (2)$$

$$CH_2=C(CH_3)COOC(CH_3)_2CF_2CHF_2 \quad (3)$$

$$CH_2=C(CH_3)COOC(CH_3)_2CF_2CF_2CF_2CHF_2 \quad (4)$$

$$CH_2=CClCOOCH_2CF_2CHF_2 \quad (5)$$

$$CH_2=C(CH_3)COOCH_2CF_2CHFCF_3 \quad (6)$$

$$CH_2=C(CH_3)COOCH(CH_3)CF_2CHFCF_3 \quad (7)$$

$$CH_2=C(CH_3)COOCH(C_2H_5)CF_2CHFCF_3 \quad (8)$$

$$CH_2=C(CH_3)COOCH(C_3H_7)CF_2CHFCF_3 \quad (9)$$

$$CH_2=C(CH_3)COOC(CH_3)_2CF_2CHFCF_3 \quad (10)$$

$$CH_2=C(CH_3)COOC(CH_3)(C_2H_5)CF_2CHFCF_3 \quad (11)$$

$$CH_2=C(CH_3)COOCH(CH_3)CH_2CF_2CHFCF_3 \quad (12)$$

$$CH_2=C(CH_3)COOCH_2CH_2C_3F_7 \quad (13)$$

$$CH_2=C(CH_3)COOCH_2CH_2C_5F_{11} \quad (14)$$

$$CH_2=CHCOOCH_2CH_2NHSO_2C_8F_{17} \quad (15)$$

$$CH_2=CHCOOCH_2CH_2N(CH_3)SO_2C_8F_{17} \quad (16)$$

$$CH_2=CCHCOOCH_2CH_2N(C_2H_5)SO_2C_8F_{17} \quad (17)$$

$$CH_2=CCHCOOCH_2CH_2N(C_3H_7)SO_2C_8F_{17} \quad (18)$$

$$CH_2=CHCOOCH_2CH_2N(C_4H_9)SO_2C_8F_{17} \quad (19)$$

$$CH_2=C(CH_3)COOCH_2CH_2NHSO_2C_8F_{17} \quad (20)$$

$$CH_2=C(CH_3)COOCH_2CH_2N(CH_3)SO_2C_8F_{17} \quad (21)$$

$$CH_2=C(CH_3)COOCH_2CH_2N(C_2H_5)SO_2C_8F_{17} \quad (22)$$

$$CH_2=C(CH_3)COOCH_2CH_2N(C_3H_7)SO_2C_8F_{17} \quad (23)$$

$$CH_2=C(CH_3)COOCH_2CH_2N(C_4H_9)SO_2C_8F_{17} \quad (24)$$

$$CH_2=C(CH_3)(CH_2)_4NNHSO_2C_8F_{17} \quad (25)$$

$$CH_2=CHCOO(CH_2)_4N(CH_3)SO_2C_8F_{17} \quad (26)$$

$$CH_2=CHCOO(CH_2)_4N(CH_2H_5)SO_2C_8F_{17} \quad (27)$$

$$CH_2=CHCOO(CH_2)_4N(CH_3H_7)SO_2C_8F_{17} \quad (28)$$

$$CH_2=CHCOO(CH_2)_4N(CH_4H_9)SO_2C_8F_{17} \quad (29)$$

$$CH_2=CHCOO(CH_2)_{11}N_2C_8F_{17} \quad (30)$$

$$CH_2=CHCOO(CH_2)_{11}N(CH_3)SO_2C_8F_{17} \quad (31)$$

$$CH_2=CHCOO(CH_2)_{11}N(CH_2H_5)SO_2C_8F_{17} \quad (32)$$

$$CH_2=CHCOO(CH_2)_{11}N(CH_3H_7)SO_2C_8F_{17} \quad (33)$$

$$CH_2=CHCOO(CH_2)_{11}N(CH_4H_9)SO_2C_8F_{17} \quad (34)$$

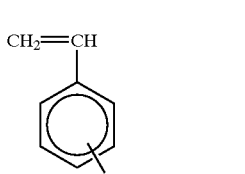

(35)

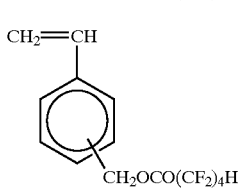

(36)

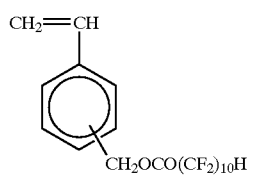 (37)
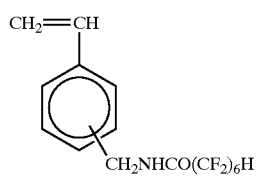 (38)
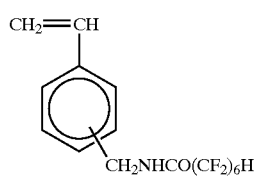 (39)
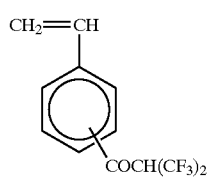 (40)
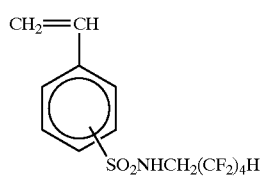 (41)
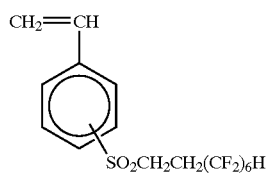 (42)
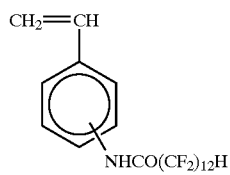 (43)
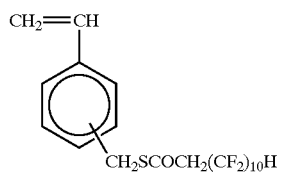 (44)
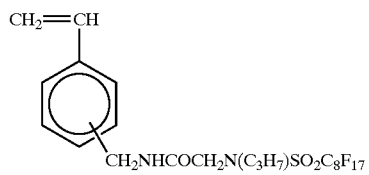 (45)
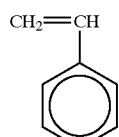 (46)
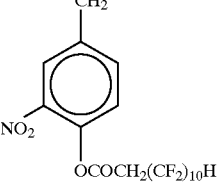 (47)
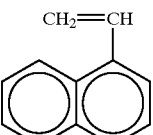 (48)
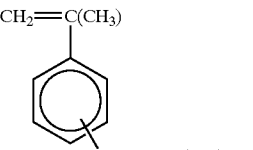 (49)
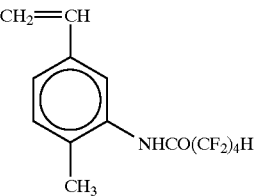 (50)
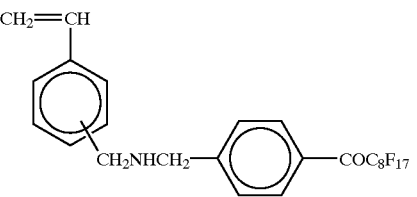 (51)
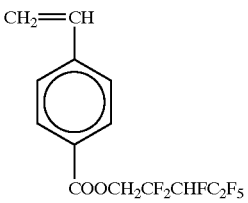 (52)
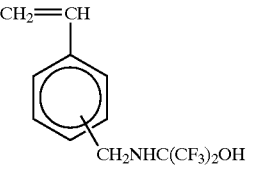

-continued

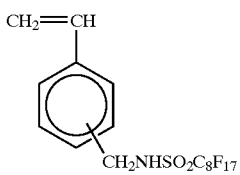
(53)

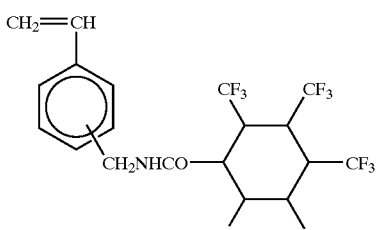
(54)

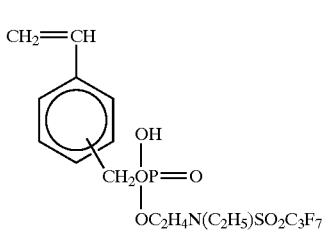
(55)

These monomers may be employed to form homopolymer or copolymer with a monomer capable of polymerization for preparation of surface active agent. The monomers which can form copolymer with the above mentioned monomer are any monomer capable of polymerization, and examples thereof are listed below.

(1) Carboxylic acid vinyl esters such as vinyl acetate, vinyl propionate and vinyl butylate.
(2) Polyoxyalkylene(meta)acrylates such as polyoxyethylene methylether (meta)acrylate and poly oxypropylene methylether (meta)acrylate.
(3) Ethylenic unsaturated olefins such as ethylene, propylene, isobutylene, butadiene and isoprene.
(4) Styrenes such as styrene, α-methylstyrene, p-methylstyrene and p-chlorostyrene.
(5) Unsaturated carboxylic acids such as acrylic acid, methacrylic acid, crotonic acid and isocrotonic acid.
(6) Unsaturated aliphatic dicarboxylic acids such as itaconic acid, maleic acid and maleic anhydride.
(7) Diesters of unsaturated dicarboxylic acid such as diethyl maleate, dibutyl maleate, di-2-ethylhexyl maleate, dibutyl fumarate and di-2-etylhexyl fumarate.
(8) α-methylene aliphatic monocarboxylic acid esters such as methyl acrylate, ethyl acrylate, n-butyl acrylate, isobutyl acrylate, dodecyl acrylate, 2-chloroethyl acrylate, phenylacrylate, α-methyl chloroacrylate methyl methacrylate and ethyl methacrylate.
(9) Nitriles such as acrylonitrile and methacrylonitrile.
(10) Amide of acrylamide.
(11) Anilides such as acrylic anilide, p-chloro acrylic anilide, m-nitro acrylic anilide and m-methoxy acrylic anilide.
(12) Vinyl ethers such as methyl vinyl ether, ethyl vinyl ether, isobutyl vinyl ether and β-chloroethyl vinyl ether.
(13) Vinyl derivatives such as chloroethylene, vinylidene chloride and vinylidene cyanide.
(14) Ethylenes such as 1-methyl-1-methoxy ethylene, 1,1-dimethoxyethylene, 1,2-dimethoxyethylene, 1,1-dimethoxycarbonyl ethylene and 1-methyl-1-nitroethylene.
(15) Vinyl monomers of N-vinyl compound such as N-vinylpyrrole, N-vinyl carbazole, N-vinylindole, N-vinyl pyrolidene and N-vinylpyrrolidone.
(16) Glycidyl acrylates such as glycidyl methylacrylate and glycidyl methyl methacrylate.
(17) α-cyanoacrylates such as a-cyanomethyl acrylate, α-cyanoethyl acrylate and α-cyanomethyl methacrylate.

Preferable example for the fluoride surface active agent employed in the invention is a copolymer of one, two or more monomers represented by formula of (1), (2) or (3), and one, two or more monomers of polyoxyalkylene(metha)acrylates, unsaturated carboxylic acids, glycidyl acrylates, α-cyano acrylates or amides among polymers prepared by these above mentioned monomers.

For example, Surflon S-381, S-382, SC-101, SC-102, SC-103, SC-104 (manufactured by Asahi Glass Co., Ltd.), Florard FC-430, FC-431, FC-173 (manufactured by fluorochemical-Sumitomo 3M Co., Ltd. both), F top EF352, EF301, EF303 (manufactured by Shin Akitakasei Co., Ltd. both), Syubegaufurour 8035, 8036 (manufactured by Syubegman Co., Ltd. both), BM1000, BM1100 (made by BM Chimi Co., Ltd. both), Megafac F-171, F-177 (manufactured by DAINIPPON INK $ CHEMICALS, INC. Co., Ltd.) can be mentioned.

Content of the nonionic surface active agent, ampholytic surface active agent or fluoride series surface active agent in the above image forming layer is preferably 0.05–15% by weight, and more 0.1–5% by weight. A plasticizer is added in the image forming layer furthermore in order to give the coat layer flexibility, if necessary. For example, a polyethyleneglycol, tributyl citrate, diethyl phthalate, dibutyl phthalate, dibutyl phthalate, dioctyl phthalate, tricresyl phosphate, tributyl phosphate, trioctyl phosphate, tetrahydrofurfuryl oleate etc. are employed.

Silicone Additives

Surface active agent such as silicone oil, silicone-alkyleneoxided copolymer such as L-5410 marketed from Union Carbide Company, silicone surface active agent manufactured by Nihon ユニカ, aliphatic epoxide containing silicone oil, monoepoxide containing silicon etc. are mentioned in order to adjust the coefficient of surface friction according to the invention. Silicone additives described in "New silicone and its application" (Toshiba Silicone, 1994), "Special Silicone Reagent Catalogue" (Azumax Co., 1996) can be employed. Adding amount is preferably 0.01 to 1 wt %.

Coating Method

Coating method to coat the photosensitive composition on a support is, for example, spin coating, wire bar coating, dip coating, air knife coating, spray coating, air spray coating, electrostatic air spray coating, roll coating, blade coating and curtain coating are employed. A mount of coating varies depending on use, and for example, 0.05–5.0 g/m$^2$ is preferable as solid content. When coating amount becomes reduced, apparent sensitivity becomes higher but film characteristics of the image forming layer deteriorates.

It is preferable to dry the above photosensitivity composition coated on support with drying temperature of 30° C. or higher for more than 5 sec, and in particular drying temperature of 50° C. or higher and 10 sec or more. It is also preferable to process so that remaining solvent of the image forming layer surface of image forming materials obtained by said drying condition become 20mg/m$^2$ or less. preferable.

Coating Solvent

Solvent employed for coating in the invention are exemplified below.

n-propanol, isopropanol, n-butanol, sec-butanol, isobutanol, 2-methyl-1-butanol, 3-methyl-1-butanol, 2-methyl-2-butanol, 2-ethyl-1-butanol, 1-pentanol, 2-pentanol, 3-pentanol, n-hexanol, 2-hexanol, cyclohexanol, methylcyclohexanol, 1-heptanol, 2-heptanol, 3-heptanol, 1-octanol, 4-methyl-2-pentanol, 2-hexyl alcohol, benzyl alcohol, ethyleneglycol, diethylene glycol, a triethyleneglycol, tetraethylene glycol, 1,3-propanediol, 1,5-pentane glycol, dimethyl triglycol, furylalchol, hexylene glycol, hexyl ether, 3-methoxy-1-butanol, 3-methoxy-3-methyl butanol, butylphenyl ether, ethylenglycol monoacetate, propylene glycol monomethyl ether, .propylene glycol mono ethyl ether, propylene glycol mono propyl ether, propylene glycol monobutyl ether, propyleneglycol phenylether, dipropyleneglycol monomethyl ether, dipropyleneglycol monoethyl ether, dipropyleneglycol monopropyl ether, dipropyleneglycol monobutyl ether, tri propylene glycol monomethyl ether, methyl carbitol, ethyl carbitol, ethyl carbitol acetate, butyl carbitol, triethyleneglycol monomethyl ether, triethyleneglycol mono ethyl ether, tetraethylene glycol dimethylether, diacetone alcohol, acetophenone, cyclohexanone, methylcyclohexanone, acetonylacetone, isophorone, methyl lactate, ethyl lactate, butyl lactate, propylene carbonate, phenyl acetate, acetic acid-sec-butyl, acetic acid cyclohexyl, diethyl oxalate, methyl benzoate, ethyl benzoate, γ-butyl lactone, 3-methoxy-1-butanol, 4-methoxy-1-butanol, 3-ethoxy-1-butanol, 3-methoxy-3-methyl-1-butanol, 3-methoxy-3-ethyl -1-pentanol, 4-ethoxy-1-pentanol, 5-methoxy-1-hexanol, 3-hydroxy-2-butanone, 4-hydroxy-2-butanone, 4-hydroxy-2-pentanone, 5-hydroxy-2-pentanone, 4-hydroxy-3-pentanone, 6-hydroxy-2-pentanone, 4-hydroxy-3-pentanone, 6-hydroxy-2-hexanone, 3-methyl-3-hydroxy-2-pentanone, MC, EC, allyl alcohol, isopropyl ether, butyl ether, anisole, propylene glycol monomethyl ether acetate, diethyl carbitol, tetrahydrofuran, dioxane, dioxolane, acetone, methyl propyl ketone, butanone, mety amyl keton, diethyl ketone, ethyl butyl ketone, dipropyl ketone, diisobutyl ketone, 3-hydroxy-2-butanone, 4-hydroxy-2-butanone, 2-methoxyethyl butyrate, 2-ethoxyethyl acetate, methoxybutyl acetate, methyl propionate, ethyl propionate, propyl propionate, methyl butyrate, ethyl butyrate, butyl butyrate, N-methyl-2-pyrrolidone, DMF, DMAc, acetonitrile, n-pentane, 2-methylpentane, 3-ethyl pentane, methyl cyclopentane, N-hexane, isohexane, cyclohexane, methylcyclohexane, n-heptane, cycloheptane, n-octane, isooctane, nonane, decane, benzene, toluene, o-xylene, m-xylene, p-xylene, ethyl benzene, o-diethylbenzene, m-diethylbenzene, p-diethylbenzene, cumene, n-amyl benzene, DMDG and ethanol.

Other Additives

In this hardenable layer, dye, pigment, thickener, plasticizer, stabilizer, leveling agent, tackifier, photobleaching inhibitor as an inactive ingredient, and UV ray absorbers as a photofading inhibitor may be contained. Ultraviolet ray hardenable protective layer mentioned above can form the irregularities of the fixed pattern at the surface. It is preferable to form patterns such as unevenness of special pattern, a kind of mark, for example, a minute pattern or a background pattern at the surface of ultraviolet ray hardenable layer, as it becomes possible for identification with counterfeit, forgery materials.

The surface of the ultraviolet ray hardenable protective layer is made to have irregularities by a method of coating the ultraviolet ray hardenable layer by a gravure having special pattern, a method of embossing the ultraviolet ray hardened resin when it is semi hardedned, etc.

<Resin Containing Unsaturated Group>

The resin containing unsaturated group denotes as characterized by containing a group capable of polymerization by radical or acid. The unsaturated group denotes glycidyl, (metha)acryloyl and vinyl group. The resins containing the following structure are mentioned.

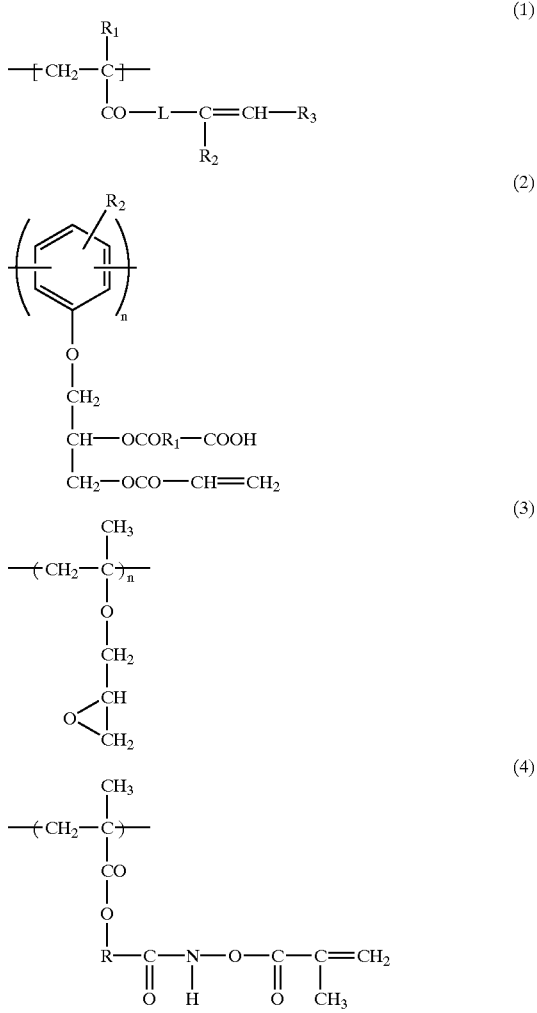

The reactive resin employed in the invention is preferably those represented by above formula (1). $R_1$ and $R_2$ each represents a hydrogen atom or a methyl group. $R_1$ and $R_2$ in the formula (2), is an alkyl, aryl group or hydrogen atom. R is a substituted or non-substituted aryl group, a substituted or non-substituted phenyl group or alkyl group, an alkyl group represented by $R_3$ is preferably an alkyl group having carbon toms less than 7 such as methyl group, ethyl group, etc., an aryl group represented by $R_3$ is preferably an aryl group having carbon atoms less than 10 such as phenyl group, naphthyl group, etc.

As a divalent bonding group represented by L, —$CH_2$—CH(OH)—$CH_2$—O—, —$OCH_2CH(OH)CH_2OCO$—, —$OC_2CH_2OCONH$—$R_4$—$NHCOOCH_2$— ($R_4$ is p-phenylene group), —$OCH_2C_2OCOCH_2CH_2COOCH_2$—, —$OCH_2CH_2OCO$—RS—$COOCH_2$— ($R_5$ is o-phenylene group) are cited.

L is preferably —$CH_2$—CH(OH)—$CH_2$—O— in the invention. The vinyl high molecular polymer employed in the invention preferably contains a unit represented by the above mentioned formula (1) at 0.001 to 20 wt %, more preferably 0.001 to 10 wt %. In case that the content of unit represented by the above mentioned formula (1) is not more than 0.001 wt %, the hardenable layer easily deteriorates in stability against chemicals and scratch strength due to reduction of polymerization degree, and in case that it is more than 20 wt %, there is such practical drawback as low yield because it causes gellation during synthesis. Or, it has reactive groups in excess, and therefore, the problems such as lowering of breaking elongation due to loss of flexibility of resin itself because crosslinking density becomes extremely high are induced.

And content of carboxyl group is preferably 3–300, more preferably 10–200 in terms of acid value. In case that content of carboxyl group is lower than 3 in terms of acid value, adhesive property of the hardening layer to the resin layer deteriorates.

The method can be employed to introduce the carboxy group into the vinyl high molecular polymer of the invention that monomer containing the carboxyl group such as α, β-unsaturated carboxylic acid, for example, acrylic acid, methacrylic acid, maleic acid, maleic anhydride, itaconic acid, itaconic acid anhydride or these derivatives to as copolymerizable ingredient at the time of synthesizing the polymer preliminarily. In case that the derivatives mentioned above are employed once copolymerizing with anhydride such as maleic acid anhydride, after that the anhydride is subjected to hydrolysis by methanol, ethanol, propanol, butanol etc., to add longer alkyl chain on a part of one side of carboxylic acid. Or, a method is employed to make an active site of high molecular polymer, for example, hydroxyl group, amino group high molecular reacted with dicarboxylic acid or acid anhydride.

The polymer containing the polymer unit represented by the formula (1) mentioned above and α, β-unsaturated carboxylic acid can be synthesized by synthesizing vinyl polymer containing α, β-unsaturated carboxylic acid by known method at the first step, then, adding unsaturated ethylene compound containing glycidyl group (epoxy group) at the second step. As the unsaturated ethylene compound containing glycidyl group (epoxy group), it is a compound containing unsaturated ethylene compound containing glycidyl group (epoxy group), such as glycidyl methacrylate and glycidyl acrylate are cited for a representative example.

As monomers composed of the vinyl high molecular weight polymer of the invention other than polymer unit represented by formula (1), monomers of (1) to (17) shown below are cited.

(1) Monomer having aromatic hydroxy group such as o-hydroxystyrene, p-hydroxystyrene, m-hydroxystyrene, o-hydroxyphenyl acrylate, p-hydroxyphenyl acrylate and m-hydroxyphenyl acrylate.
(2) Monomer having aliphatic hydroxy group such as 2-hydroxyethyl acrylate, 2-hydroxyethyl methacrylate, N-methylol acrylamide, N-methylol methacryl amide, 4-hydroxybutyl acrylate, 4-hydroxybutyl methacrylate, 5-hydroxypentyl acrylate, 5-hydroxypentyl methacrylate, 6-hydroxyhexyl acrylate, 6-hydroxyhexyl methacrylate, N-(2-hydroxyethyl) acrylamide, N-(2-hydroxyethyl) methacrylamide and hydroxyethyl vinylether.
(3) Monomer having aminosulfonyl group such as m-aminosulfonylphenyl methacrylate, p-aminosulfonylphenyl methacrylate, m-aminosulfonylphenyl acrylate, p-aminosulfonylphenyl acrylate, N-(p-aminosulfonylphenyl) methacrylamide, N-(p-aminosulfonylphenyl) acrylamide.
(4) Monomer having sulfonamide group such as N-(p-toluenesulfonyl)acrylamide, N-(p-toluenesulfonyl) methacrylamide.
(5) α, β-unsaturated carboxylic acid such as acrylic acid, methacrylic acid, maleic acid, maleic anhydride, itaconic acid, itaconic anhydride.
(6) Alkyl acrylate which may be substituted or non-substituted such as methyl acrylate, ethyl acrylate, propyl acrylate, butyl acrylate, amyl acrylate, hexyl acrylate, heptyl acrylate, octyl acrylate, nonyl acrylate, decyl acrylate, undecyl acrylate, dodecyl acrylate, benzyl acrylate, cyclohexyl acrylate, 2-chloroethyl acrylate, N, N-dimethylaminoethyl acrylate and glycidyl acrylate.
(7) Alkyl methacrylate which may be substituted or non-substituted such as methyl methacrylate, ethyl methacrylate, propyl methacrylate, butyl methacrylate, amyl methacrylate, hexyl methacrylate, heptyl methacrylate, octyl methacrylate, nonyl methacrylate, decyl methacrylate, undecyl methacrylate, dodecyl methacrylate, benzyl methacrylate, cyclohexyl methacrylate, 2-chloroethyl methacrylate, N,N-dimethylaminoethyl methacrylate and glycidyl methacrylate.
(8) Acrylamide or methacryl amide such as acrylamide, methacryl amide, N-ethyl acrylamide, N-hexyl acrylamide, N-cyclohexyl acrylamide, N-phenyl acrylamide, N-nitrophenyl acrylamide, N-ethyl-N-phenyl acrylamide, N-(4-hydroxyphenyl) acrylamide and N-(4-hydroxyphenyl)-methacrylamide.
(9) Monomer containing alkyl fluoride group such as trifluoroethyl acrylate, trifluoroethyl methacrylate, tetrafluoropropyl acrylate, tetrafluoropropyl methacrylate, hexafluoropropyl methacrylate, octafluoropropyl acrylate, octafluoropropyl methacrylate, heptadecafluorodecyl acrylate, heptadecafluorodecyl methacrylate and N-butyl-N-(2-acryloxyethyl)heptadecafluorooctyl sulfonamide.
(10) Vinyl ether such as ethyl vinyl ether, 2-chloroethylvinyl ether, propylvinyl ether, butylvinyl ether, octylvinyl ether and phenylvinyl ether.
(11) Vinyl ester such as vinyl acetate, vinyl chloro acetate, vinyl butylate and vinyl benzoate.
(12) Styrene such as styrene, methylstyrene, chloromethyl styrene.
(13) Vinyl ketone such as methyl vinyl ketone, ethyl vinyl ketone, propyl vinyl ketone and phenyl vinyl ketone.
(14) Olefin such as ethylene, propylene, isobutylene, butadiene and isoprene.
(15) N-vinylpyrrolidone, N-vinyl carbazole, 4-vinylpyridine and so on.
(16) Monomer having cyano group such as acrylonitrile, methacrylonitrile, 2-pentenenitrile, 2-methyl-3-butenenitrile, 2-cyanoethyl acrylate, o-cyano styrene, m-cyano styrene and p-cyano styrene.
(17) Monomer having amino group such as N,N-diethylaminoethyl methacrylate, N,N-dimethylaminoethyl acrylate, N,N-dimethylaminoethyl methacrylate, polybutadieneurethane acrylate, N,N-dimethylaminopropyl acrylamide, N,N-dimethylacrylamide, acryloyl morpholine, N-isopropyl acrylamide and N,N-diethyl acrylamide.

Molecular weight of the high molecular weight vinyl polymer of the invention is preferably 5,000–50,000, and more preferably 7,000–50,000. In case that the molecular weight is less than 5,000, film forming function falls down and chemical resistance deteriorates. In case that the molecular weight is more than 50,000 solubility of resin in a coating solvent becomes problematic.

For example, the followings are nominated for a concrete example of high molecular weight vinyl polymer of the invention.

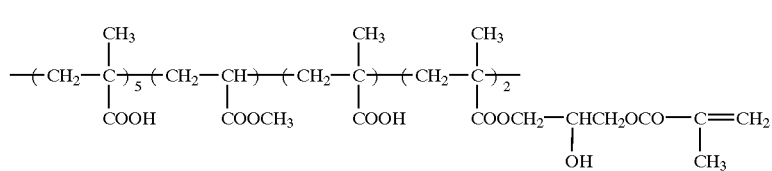
(1)
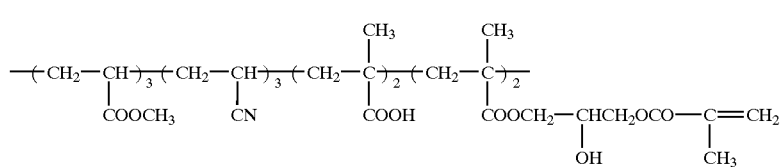
(2)
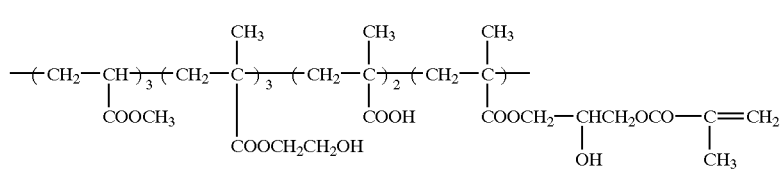
(3)
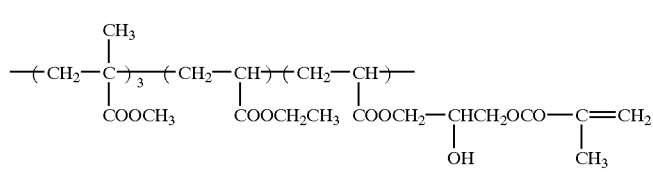
(4)
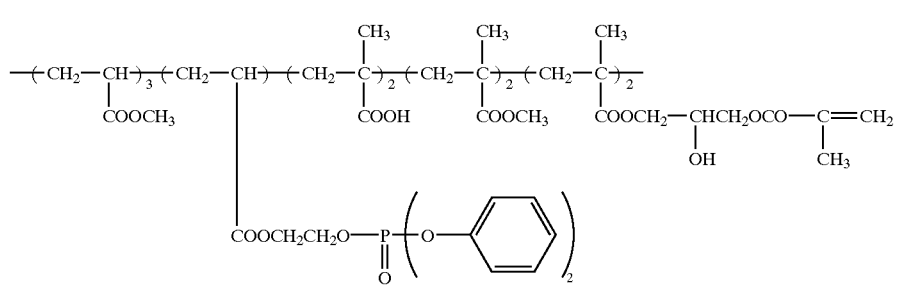
(5)
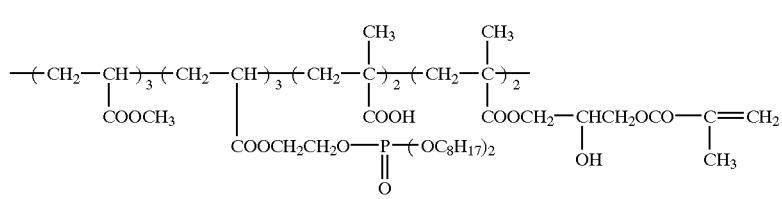
(6)
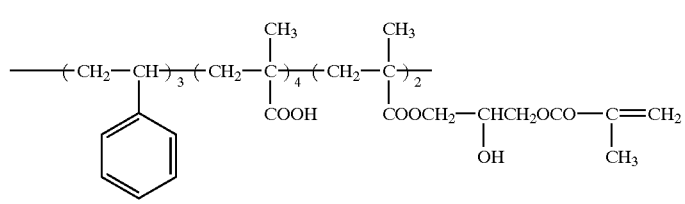
(7)
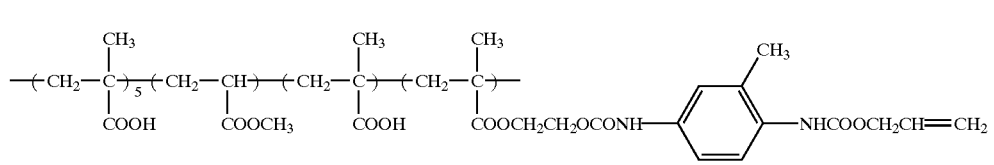
(8)
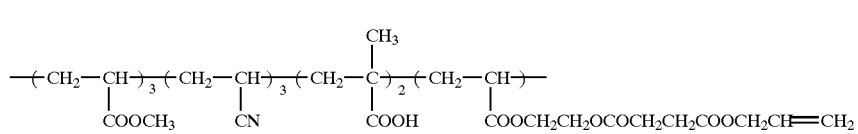
(9)

-continued

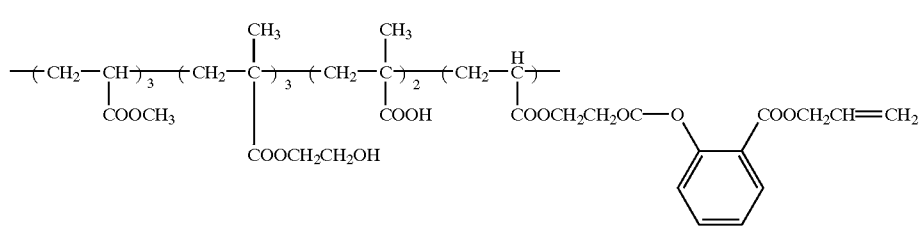

(10)

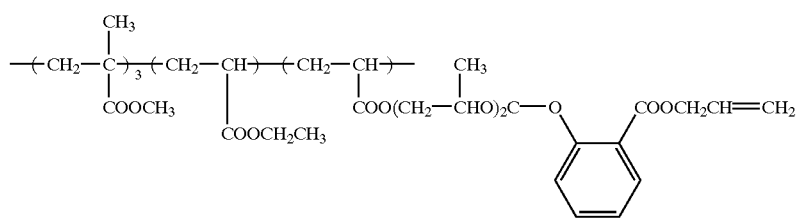

(11)

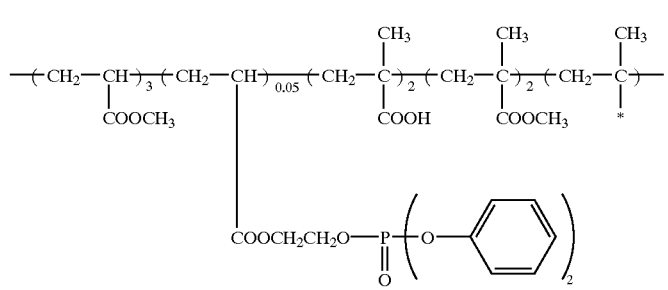

(12)

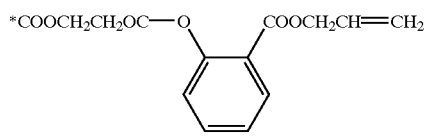

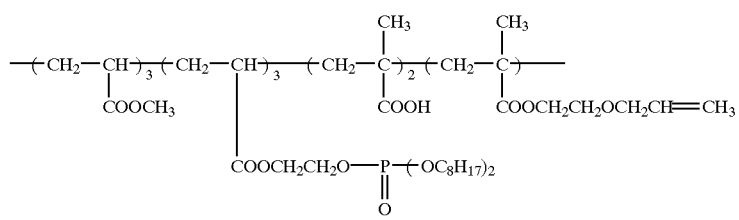

(13)

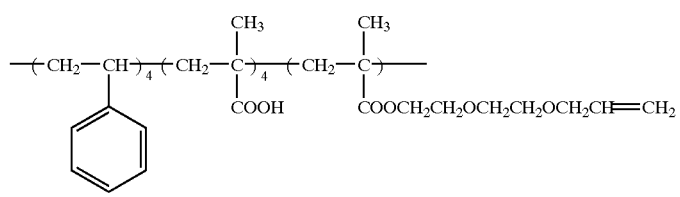

(14)

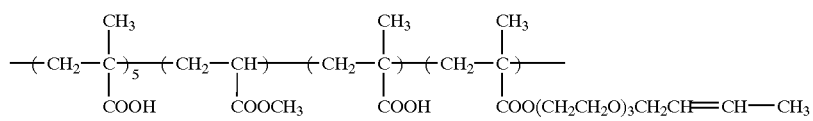

(15)

The monomer or oligomer having at least one polymerizable double bond in a molecule includes any monomer, oligomer or prepolymer having at least one ethylenic unsaturated bond capable of radical polymerization in a molecule. Any kind of these can be employed in the invention. Concrete examples are listed.

Mono functional acrylates such as 2-ethylhexyl acrylate, 2-hydroxypropyl acrylate, glycerol acrylate, tetrahydrofurfuryl acrylate, phenoxy ethylacrylate, nonylphenoxy ethylacrylate, tetrahydrofurfuryloxy ethylacrylate, tetrahydrofurfuryloxyhexanolide acrylate, acrylate of ε-caprolactone adduct of 1,3-dioxane alcohol and 1,3-dioxolane acrylate; and corresponding methacrylate, itaconate, crotonate and maleate, wherein the acrylate of the above mentioned acrylic ester is replaced by these.

Two functional acrylate of diacrylate such as ethylenglycol diacrylate, triethylene glycol diacrylate, pentaerythritol diacrylate, hydroquinone diacrylate, resorcin diacrylate, hexanediol diacrylate, neopentyl glycol diacrylate, tri propylene glycol diacrylate, diacrylate of hydroxy pivalic acid neopentyl glycol, diacrylate of neopentyl glycol adipate, diacrylate of ε-caprolactone adduct of hydroxy pivalic acid neopentyl glycol, 2-(2-hydroxy-1,1-dimethylethyl)-5-hydroxymethyl-5-ethyl-1,3-dioxane diacrylate, tricyclodecane dimethylol acrylate, ε-caprolactone adduct of tricyclodecane dimethylol acrylate, and diglycidyl ether of 1,6-hexanediol; and corresponding methacrylate, itaconate, crotonate and maleate, wherein the acrylate of the above mentioned acrylic ester is replaced by these.

Polyfunctional acrylic acid ester such as trimethylolpropane triacrylate, ditrimethylolpropane tetraacrylate, trimethylolethane triacrylate, pentaerythritol triacrylate, pentaerythritol tetraacrylate, dipentaerythrytol tetraacrylate, dipentaerythrytol pentaacrylate, dipentaerythrytol hexaacrylate, ε-caprolactone adduct of dipentaerythrytol hexaacrylate, pyrogallol triacrylate, propionic acid.dipentaerythrytol triacrylate propionic acid.dipentaerythrytol tetraacrylate, hydroxypivalyl aldehyde modified di methylol propane triacrylate; and corresponding methacrylate, itaconate, crotonate and maleate, wherein the acrylate of the above mentioned acrylic ester is replaced by these.

Phosphazene monomer, triethylene glycol, isocyanuric acid EO modified diacrylate, isocyanuric acid EO modification triacrylate, di methylol tricyclo decane diacrylate, trimethylolpropane acrylic acid benzoate, alkylene glycol type acrylic acid modification and urethane modification acrylate.

In particular acrylate and methacrylate compounds are employed suitably among these. One or mixture of two kinds or more are employed in combination selecting from these compounds.

In addition thereto, so called prepolymer, which is prepared by that acryl acid or methacrylic acid is introduced to an oligomer having suitable molecular weight and is provided with photopolymerizable property, is also employed suitable for a compound capable of addition polymerization or crosslinking. A kind or mixture of two or more kinds of prepolymers may be employed, or the prepolymer may be employed along with the monomer mentioned above.

Examples of the prepolymer are polyester acrylates which are prepared by introducing (metha)acrylic acid to polyester obtained by bonding polybasic acid such as adipic acid, tri merit acid, maleic acid, phthalic acid, terephthalic acid, himic acid, malonic acid, succinic acid, glutaric acid, itaconic acid, pyromellitic acid, fumaric acid, pimelic acid, sebacic acid, dodecanoic acid and tetrahydro phthalic acid with polyvalent alcohol such as ethylenglycol, propylene glycol, diethylene glycol, propylene oxide, 1,4-butanediol, triethylene glycol, tetraethylene glycol, polyethylene glycol, glycerin, trimethylolpropane, pentaerythritol, sorbitol, 1,6-hexanediol and 1,2,6-hexanetriol;

Epoxy acrylates which is prepared by introducing (meta) acrylic acid into epoxide resin, such as bisphenol A.epichlorohydrin.(meta)acrylic acid, phenol novolak epichlorohydrin.(meta)acrylic acid;

Urethane acrylates which is prepared by introducing (meta)acrylic acid into urethane resin, such as ethylenglycol adipic acid.tolylene diisocyanate.2-hydroxyethyl acrylate, polyethyleneglycol.tolylene diisocyanate.2-hydroxyethyl acrylate, hydroxyethylphthalyl methacrylate.xylene diisocyanate, 1,2-polybutadiene glycol.tolylene diisocyanate.2-hydroxyethyl acrylate, trimethylolpropane.propylene glycol.tolylene diisocyanate.2-hydroxyethyl acrylate;

Silicone resin acrylates such as poly siloxane acrylate, poly siloxane diisocyanate.2-hydroxyethyl acrylate; and Alkyd modified acrylate, which is prepared by introducing (meta)acryloyl group into oil modified alkyd resin and spiran resin acrylate.

Polymerizable or hardenable compound composed with content of 5 weight % or more, preferably 20 weight % or more and less than 97 weight %, preferably 95 weight % of whole photosensitive layer composition.

<Silicon or Fluorine Compounds Containing an Unsaturated Group (Lubricant without Reducing Polymerization Degree)>

Silicon compounds containing an unsaturated group are cited as end vinyl poly dimethylsiloxane, vinyl end diphenyl siloxane-dimethylsiloxane copolymer, vinyl methylsiloxane-dimethylsiloxane copolymer, trimethyl siloxane end group, vinyl gum, vinyl methylsiloxane homopolymer, vinyl T structure polymer, vinyl methoxy siloxane homopolymer, H silicone, epoxy silicone, methacrylate silicone, mercapto silicone, allyl group modification silicone and (meta)acryloyl group silicone, other than coupling agent described in this specification. A preferable amount to be added is 0.01–50%, more preferably 0.05–30% by weight. Concrete example includes MAC-2101, MAC-2301 manufactured by Japan Unikar etc. Silicone additives described in "New Silicone and its application" (Vinyl Toshiba Silicone Co., Ltd., 1994) and "Special Silicone Reagent Catalogue" (Azumax Corporation, 1996) can be employed.

Fluorine Compounds Containing an Unsaturated Group

As for fluorine compounds containing an unsaturated group, Lightester M-3F of mutual prosperity company chemistry Co., Ltd., Lightester M-4F, Lightester M-6F, Lightester FM-108,and Lightacrylate FA-108, all manufactured by Kyoei Kagaku Co., Ltd., or unsaturated fluorine compounds mentioned above can be added solely. A preferable amount of the silicon or fluorine compounds containing an unsaturated group to be added is 0.01–20%, more preferably 0.01–10% by weight.

<Formation of Protective Layer>

The protective layer is formed by transfer from the transfer foil of the invention. The surface having above mentioned image or optical variable device of the card is superposed to the transfer surface of the transfer sheet, then they are pressed from transfer sheet side by means of press simultaneously heating such as thermal head, heat roller, hot stamp machine etc., after that the support of the transfer sheet is removed, whereby the protect layer is formed.

The protect layer or its forming method described Japanese Patent Publication Open to Public Inspection Nos. 08-324137, 04-247486, 04-286696, 04-320898, 05-139093, 06-072018, etc.

<Layer Arrangement of Resin Layer>

The resin layer or actinic ray hardenable layer is composed of one or more layers, as far as it contains a resin satisfying breaking elongation and friction coefficient stipulated in the invention. In particular, the resin layer within the invention is included in friction coefficient at the surface of outermost layer of the image recording material. Thickness of the resin layer is preferably 3 to 20 μm, and more preferably 3 to 5 μm. As for breaking prolongation of resin of the invention, result measured for thickness of actually employed resin is shown.

Figure 27:
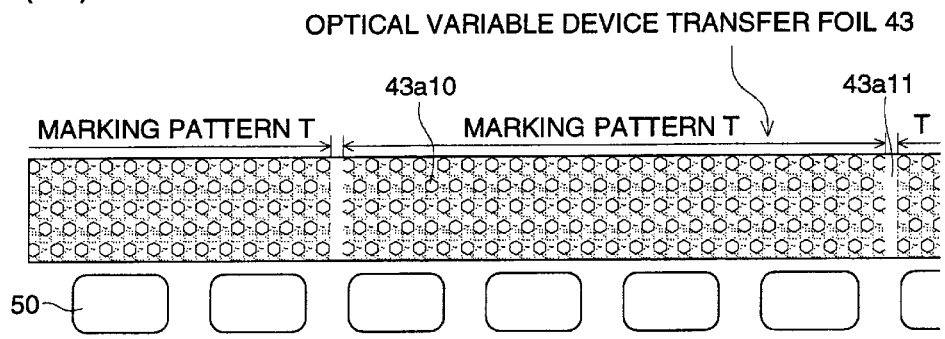
FIGS. 27(a), 27(b), 27(c), 27(d) and 27(e) are each a view showing frequency and/or depth of markings.
Figure 27:
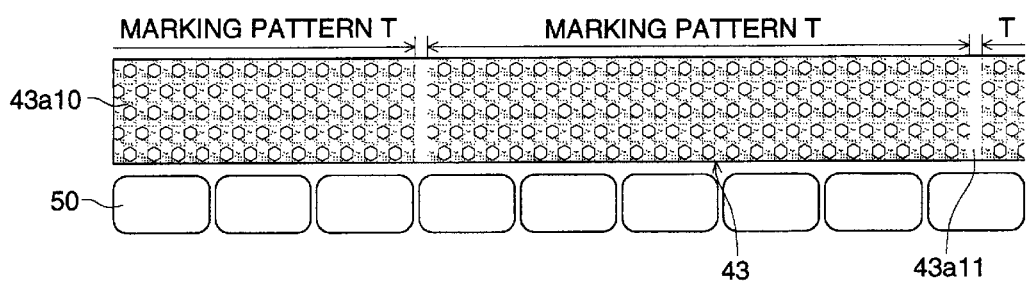
Figure 27:
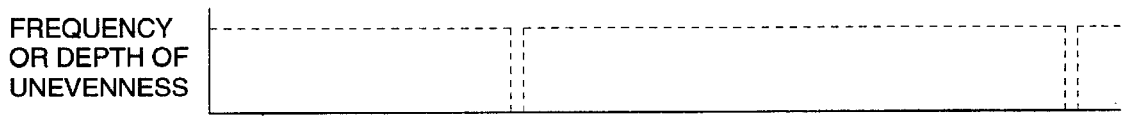
Figure 27:
Figure 27:

As shown in FIG. 27,optical variable device transfer foil 43 has a part in which the frequency and/or the depth of marking 43a10 of the optical variable device layer varies continuously.

Namely, as shown in FIG. 27(a), when card material 50 is supplied so as to avoid connection part 43a11 of the cycle of marking pattern T and transfer is subsequently carried out, production efficiency decreases. However, as shown in FIG. 27(b), when said card material 50 is supplied without position registration, said card material may be positioned on the connection part of the cycle of marking pattern T. Then, streaked lines occur and multi-level images, identification information, and the like, are not clearly seen. Accordingly, as shown in FIG. 27(a), it is required to supply card material 50 while avoiding the connection part of the cycle of marking pattern T.

Due to that, as shown in FIGS. 27(c) through (e), the frequency and/or the depth of marking 43a10 of the optical variable device layer is allowed to be continuous at the connection 43a11 of the cycle of marking pattern T. Namely, as shown in FIG. 27(c), at the connection 43a11 of the cycle of marking pattern T, the frequency and/the depth of marking 43a10 varies stepwise. However, as shown in FIG. 27(d), said frequency and/or depth is allowed to vary continually, and as shown in FIG. 27(e), the continuously varying part is expanded and variation distance is decreased so as to be positively streak-like. As a result, it is possible that the resulting streaks are not differentiated from those formed by said connection 43a11.

Further, when the marking on the optical variable device layer is observed at a specified angle, it is possible to make the cycle of reflecting wavelengths continuous. Thus, it is possible that the resulting variation cannot be differentiated from streaks formed by connection 43a11.

By so doing, as shown in FIG. 27(b), it is possible to supply card material 50 randomly without registration. Even when card material 50 positions at connection 43a11 of the cycle of marking pattern T, the streak becomes not so distinct due to connection 43a11. Thus the resulting cards as well as sheets possess excellent function for preventing forgery as well as altetration, and in addition, exhibit excellent design properties as well as identification properties. Further, it is possible to supply card material 50 randomly, and thus the production efficiency is enhanced.

Figure 28:
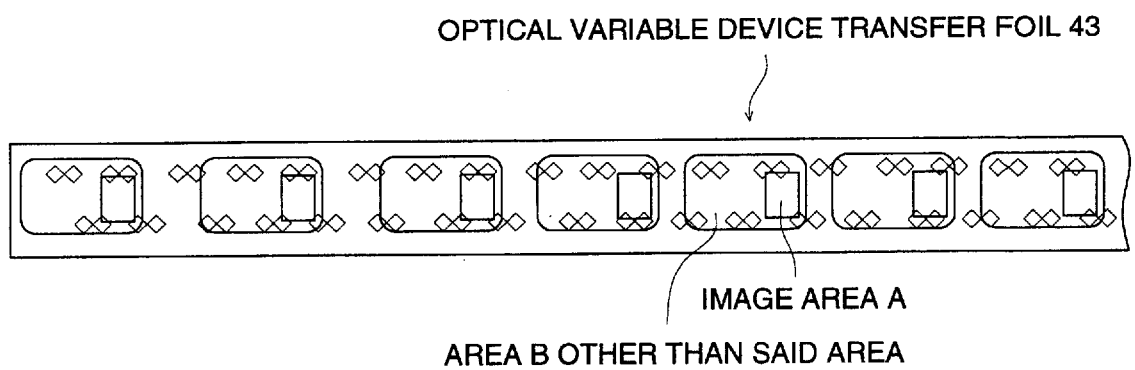
FIGS. 28 and 29 are each a view showing an embodiment to provide a portion having optical variable effect in the optical variable device.

Further, the optical variable device transfer foil 43 is structured as shown in FIG. 28. Namely, in the optical variable device layer, the optical variation effect on the upper part of a portrait (preferably the entire upper part of the portrait) in image area A is adjusted to be smaller than that on area B, other than area A. By so doing, even when card material 50 is randomly supplied without registration, it is possible to minimize difficulty in perceiving the portrait image in image area A due to optical variable effects.

Figure 29:
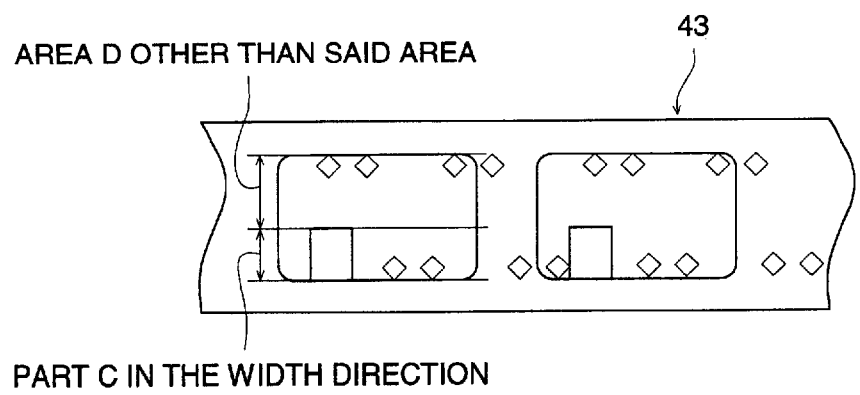

Still further, optical variable device transfer foil 43 is wound on a roll, and as shown in FIG. 29, the optical variable effects in some part C in the width direction is smaller than those in area D, other than area A. The area, which exhibits less optical variable effects, may be overlapped onto the image area after transfer.

Figure 30:
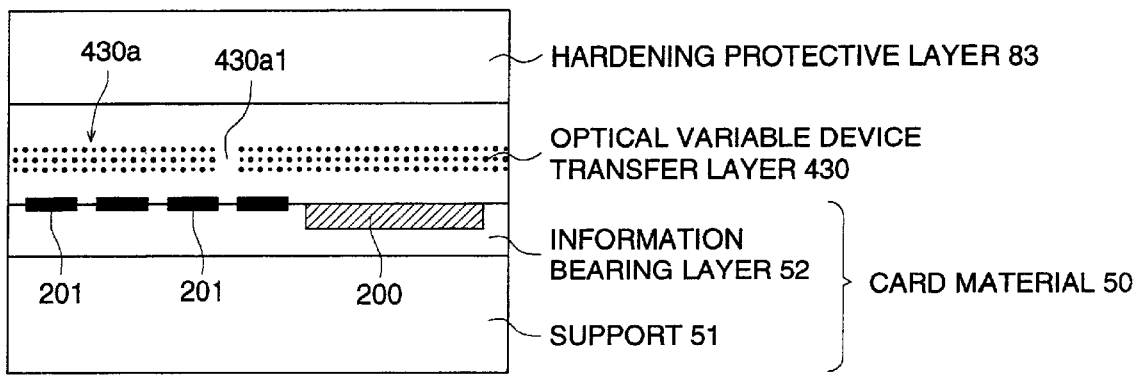
FIGS. 30(a), 30(b) and 30(c) are each a view showing an embodiment to provide a layer having uneven thickness or uneven transparency.
Figure 30:
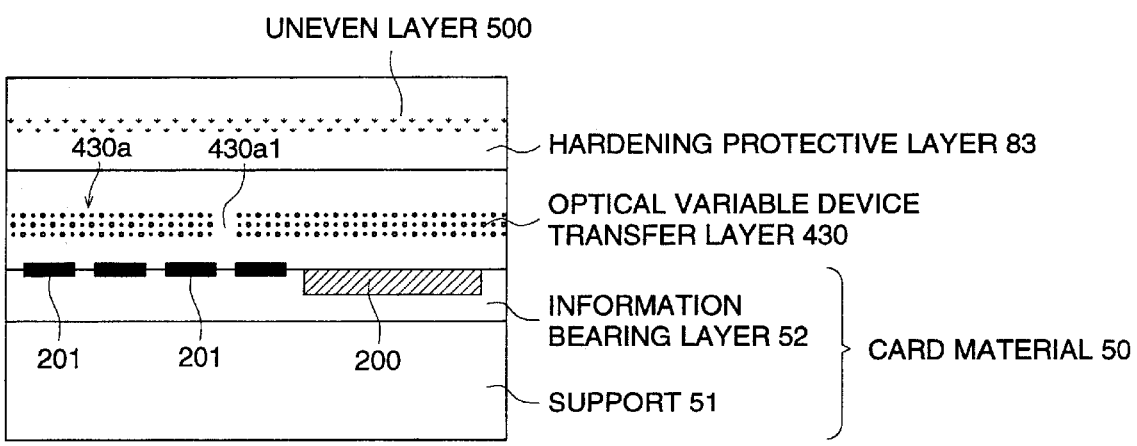
Figure 30:
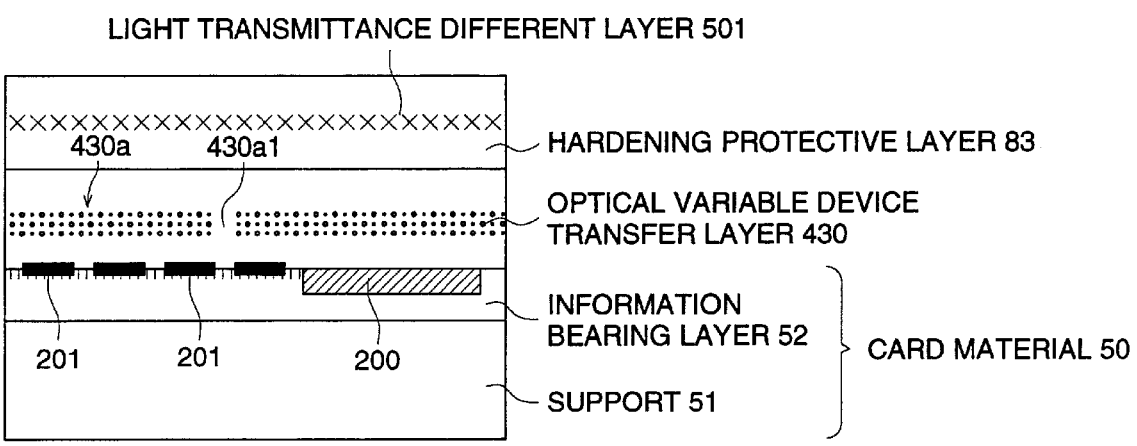

FIG. 16 shows another embodiment of the present invention. As shown in FIG. 30(a), when connection 430 of the cycle of marking pattern 430a is present on the optical variable device transfer layer 430 of the image recording body, streaked lines result, and it becomes difficult to see multi-level images, identification information, and the like.

Due to that, as shown in FIG. 30(b), uneven layer 500 is provided over the entire surface of hardenable protective layer 83 on the surface of an image recording body. However, as shown in FIG. 30(b), layer 301 having different light transmittance may be provided. By providing said uneven layer 500 or said layer 501 having different light transmittance, it is possible to decrease the difference of the connection of the cycle of marking pattern 430a from other parts.

Figure 31:
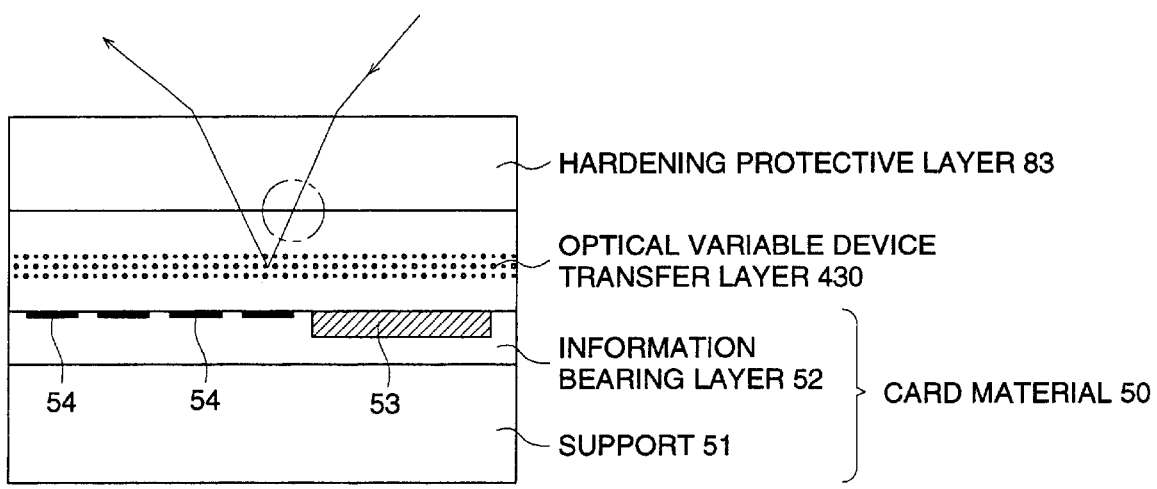
FIG. 31 is a view showing an embodiment to set ratio of indices of refraction optical variation device transfer layer to hardened protective layer.

Other embodiments of the present invention are shown in FIGS. 14 and 31. In image recording bodies of these embodiments, the ratio of the refractive index of optical variable device transfer layer 430 to hardenable protective layer 83 as well as hardenable transparent protective transfer layer 630 is between 0.8 and 1.2. By setting the ratio of the refractive index of the optical variable device layer to the protective layer at such a range, forgery is prevented and in addition, identification information 53 as well as bibliographical information 54 is more clearly seen.

Herein, the refractive index of the hardenable transparent protective transfer layer refers to the refractive index of transparent protective layer 64a2 shown in FIG. 12, which is a substantial protective layer, or the refractive index of adhesive layer 64a3 which is adjacent to optical variable device layer 430.

Further, in the image recording body of said embodiment, the ratio of the linear thermal expansion coefficient of optical variable device transfer layer 430 to hardenable protective layer 83, as well as hardenable transparent protective transfer layer 630, is between 0.5 and 2.0. By setting the ratio of the linear thermal expansion coefficient of the optical variable device layer to the protective layer in such a range, it is possible to prevent forgery, and it also is possible to enhance heat resistance.

Herein, the linear thermal expansion coefficient refers to the linear thermal expansion coefficient of transparent protective layer 64a2 shown in FIG. 20, which is a substantial protective layer, or of adhesive layer 64a3 which is adjacent to optical variable device layer 430.

Further, FIG. 31 shows another embodiment of the present invention. In the image recoding body of said embodiment, the ratio of refractive index of optical variable device layer 430 to hardenable protective layer 83 is between 0.8 and 1.2, and by setting the ratio of refractive index of said optical variable device layer to said protective layer in such a range, forgery as well as altetration can be prevented, and identification information 53 as well as bibliographical information is more clearly seen.

Further, in the image recording body of said embodiment, the ratio of linear expansion coefficient of optical variable device layer 430 to hardenable protective layer 83 is between 0.5 and 2.0, and by setting the ratio of linear expansion coefficient of said optical variable device layer to said protective layer in such a range, forgery as well as altetration can be prevented, and heat resistance is enhanced.

In the preparation method of the image recording body of the present invention, identification information as well as bibliographical information is recorded onto the surface of the image recording body which comprises a support having thereon the image receiving layer, employing thermal transfer or ink jet, and subsequently, the optical variable device transfer layer having an optical variable device layer is transferred and further, the transparent protective transfer foil having a transparent protective layer is transferred thereon to prepare said image recording body. By transferring the foil twice, it is possible to obtain cards which exhibit enhanced scratch resistance and have no fin.

Further, identification information as well as bibliographical information is recorded on the surface of the image recording body comprised of a support having thereon an image receiving layer, employing thermal transfer or ink jet, and subsequently, the transparent protective transfer foil having a transparent protective layer is thermally transferred to protect said identification information as well as said bibliographical information. Further, the optical variable device transfer foil having an optical variable device layer is transferred thereon to prepare an image recording body in which the optical variable device layer is installed.

Still further, identification information as well as bibliographical information is recorded on the surface of the image recording body comprised of a support having thereon an image receiving layer, employing thermal transfer or ink jet, and subsequently, the transparent protective transfer foil having a transparent protective layer is thermally transferred to protect said identification information as well as said bibliographical information. Further, an actinic light-hardened resin layer is formed thereon and after hardening said layer with irradiation of actinic light, the optical variable device transfer foil having an optical variable device layer is transferred onto said actinic light-hardened resin layer to prepare an image recording body in which the optical variable device layer is installed.

Still further, identification information as well as bibliographical information is recorded on the surface of the image recording body, comprised of a support having thereon an image receiving layer, employing thermal transfer or ink jet, and subsequently, the transparent protective transfer foil having a transparent protective layer is thermally transferred to protect said identification information as well as said bibliographical information. Further, after transferring the optical variable device transfer foil having an optical variable device layer thereon, an actinic light-hardened resin layer is formed on the entire surface of said image recording body, which is subjected to irradiation of actinic light to prepare an image recording body in which the protected optical variable device layer is installed.

Before and after transferring said transparent protective transfer foil or said optical variable device transfer foil, the surface of the image recording body is preferably subjected to charge elimination treatment. Thus, obtained can be cards or sheets as the image recording body which does not results in problems such as dust adhesion.

EXAMPLES

Table A shows examples of resin layers (protective layer providing agents), and Tables B, C, D and E show the evaluation results.

Synthesis Example 1
(Preparation of a Resin Having an Unsaturated Group)

Placed in a three-neck flask were 73 parts of methyl methacrylate, 15 parts of styrene, 12 parts of methacrylic acid, 500 parts of ethanol, and 3 parts of α,α'-azobisisobutylonitrile under nitrogen flow, and the resulting mixture was allowed to react under a flow of nitrogen in an oil bath at 80° C. for 6 hours. Thereafter, 3 parts of triethylammonium chloride and 0.6 part of glycidyl methacrylate were added, and the resulting mixture was allowed to react for three hours to obtain targeted Synthetic Binder 1, comprised of an acryl based copolymer. The molecular weight was 17,000 and the acid value was 67.8.

Synthesis Example 2
(Preparation of a Resin Having an Unsaturated Group)

Placed in a three-neck flask were 73 parts of methyl methacrylate, 15 parts of benzyl methacrylate, 6 parts of methacrylic acid, 500 parts of ethanol, and 3 parts of α,α'-azobisisobutylonitrile under nitrogen flow, and the resulting mixture was allowed to react under nitrogen flow in an oil bath at 80° C. for 6 hours. Thereafter, 3 parts of triethylammonium chloride and 1.0 part of glycidyl methacrylate were added, and the resulting mixture was allowed to react for three hours to obtain targeted Synthetic Binder 1, comprised of an acryl based copolymer.

The molecular weight was 2,100 and the acid value was 31.2.

Support Preparation 1

A 20 μm thick polyethylene terephthalate film was measured employing a WYKO, with a result of $0.02\mu$ Ra.

Support Preparation 2

After applying a releasing layer onto one surface (the reverse surface of the surface of a 20 μm thick polyethylene terephthalate film, onto which said releasing layer is applied), an aqueous solution of a matting agent (which was monodispersed silica having a monodisperse degree of 10 percent and an average particle diameter of 1 μm), being adjusted to one percent of a solid portion, was applied onto said surface, employing an electrostatic air type spray, and subsequently dried at 50° C. The resulting film was measured employing a WYKO, and an Ra of $0.3\mu$ of was obtained.

The present invention will now be described with reference to examples. However, the embodiments of the present invention are not limited to these examples. Further, the "parts" described below is "weight parts".

Preparation of Cards in which a Portrait Image, Attribute Information and Format Printing are Provided
(Preparation of Support)

White polypropylene resin (Noburen FL350, manufactured by Mitsubishi Yuka Co., Ltd.) was applied onto both surfaces of a 350 μm thick polyethylene terephthalate (Tetron HS350 manufactured by Teijin Ltd.), employing an extrusion laminate method to obtain a thickness of 50 μm. One surface of an obtained composite resin sheet was subjected to corona discharge treatment at 25 W/m²·minute, and the resulting sheet was employed as a support.
(Preparation of Image Receiving Layer for Sublimation Type Thermal Transfer Recording)

A first image receiving layer forming coating composition, a second image receiving layer forming coating composition, and a third image receiving layer forming coating composition, having the compositions described below, were successively applied in said order onto a surface subjected to the corona discharge treatment of the aforementioned support, and subsequently dried so as to obtain a thickness of 0.2 μm, 2.5 μm, and 0.5 μm, respectively, and thus an image receiving layer was formed.

<First Image Receiving Layer Forming Coating Composition>

| | |
|---|---|
| Polyvinyl butyral resin (Esurekku BL-1, manufactured by Sekisui Kagaku Kogyo Co., Ltd) | 9 parts |
| Isocyanate (Coronate HX, manufactured by Nihon Urethane Kogyo Co., Ltd.) | 1 part |
| Methyl ethyl ketone | 80 parts |
| Butyl acetate | 10 parts |

<Second Image Receiving Layer Forming Coating Composition>

| | |
|---|---|
| Polyvinyl butyral resin (Esurekku BX-1, manufactured by Sekisui Kagaku Kogyo Co., Ltd) | 6 parts |

<Third Image Receiving Layer Forming Coating Composition>

| | |
|---|---|
| Metal ion containing compound (MS compound) | 4 parts |
| Methyl ethyl ketone | 80 parts |
| Butyl acetate | 10 parts |

<Third Image Receiving Layer Forming Coating Composition>

| | |
|---|---|
| Polyethylene wax (Hitech E1000, manufactured by Toho Kagaku Kogyo Co., Ltd.) | 2 parts |
| Urethane-modified ethylene acrylic acid copolymer (Hitech S6254, Toho Kagaku Kogyo Co., Ltd.) | 8 parts |
| Methyl cellulose (SM15, manufactured by Shin-Etsu Kagaku Kogyo Co., Ltd.) | 0.1 part |
| Water | 90 parts |

(Writing Layer)

Yupo DFG-65 sheet, manufactured by Oji Yuka Co., Ltd., is adhered onto the reverse surface of the image receiving layer of a support, and a first writing layer forming coating composition, a second writing layer forming coating composition, and a third writing layer forming coating composition, are successively applied in said order onto the resulting support, and subsequently dried so as to obtain a thickness of 5 μm, 15 μm, and 0.2 μm, respectively to form an image receiving layer.

<First Writing Layer Forming Coating Composition>

| | |
|---|---|
| Polyester resin (Byron 200, manufactured by Toyo Boseki Co., Ltd.) | 8 parts |
| Isocyanate (Coronate HX, manufactured by Nihon Polyurethane Kogyo Co., Ltd.) | 1 part |
| Carbon black | trace amount |
| Titanium dioxide particles (CR80, manufactured by Ishihara Sangyo Co., Ltd.) | 1 part |
| Methyl ethyl ketone | 80 parts |
| Butyl acetate | 10 parts |

<Second Writing Layer Forming Coating Composition>

| | |
|---|---|
| Polyester resin (Bironal MD-1200, manufactured by Toyo Boseki Co., Ltd.) | 4 parts |
| Silica | 5 parts |
| Titanium dioxide particles (CR80, manufactured by Ishihara Sangyo Co., Ltd.) | 1 part |
| Water | 90 parts |
| Titanium dioxide particles (CR80, manufactured by Ishihara Sangyo Co., Ltd.) | 1 part |

<Third Writing Layer Forming Coating Composition>

| | |
|---|---|
| Polyamide resin (Sanmide 55, manufactured by Mitsuwa Kagaku Kogyo Co., Ltd.) | 5 parts |
| Methanol | 95 parts |

The central line average roughness of an obtained writing layer was 1.34 μm.

(Format Printing)

A logo as well as OP nisu was successively printed employing a resin letterpress printing method.

(Preparation of Ink Sheets for Sublimation Type Thermal Transfer Recording)

A yellow ink layer forming coating composition, a magenta ink layer forming coating composition, and a cyan ink layer forming coating composition, having the compositions described below were applied onto a 6 μm thick polyethylene terephthalate, which had been subjected to fusion resistant treatment on the reverse surface, to obtain a 1 μm thickness of each layer, and three color ink sheets of yellow, magenta, and cyan were obtained.

<Yellow Ink Layer Forming Coating Composition>

| | |
|---|---|
| Yellow dye (Compound Y-1) | 3 parts |
| Polyvinyl acetal (Edenka Butyral KY-24, manufactured by Denki Kagaku Kogyo Co., Ltd.) | 5.5 parts |
| Polymethylmethacrylate-modified polystyrene (Rededa GP-200, manufactured by Toa Gosei Kagaku Kogyo Co., Ltd.) | 1 part |
| Urethane-modified silicone oil (Daiaroma SP-2105, manufactured by Dainichiseika Kogyo Co., Ltd.) | 0.5 part |
| Methyl ethyl ketone | 70 parts |
| Toluene | 20 parts |

<Magenta Ink Layer Forming Coating Composition>

| | |
|---|---|
| Magenta dye (Compound M-1) | 2 parts |
| Polyvinyl acetal Denka Butyral KY-24, manufactured by Denka Kagaku Kogyo Co., Ltd.) | 5.5 parts |
| Polymethyl methacrylate-modified polystyrene (Rededa GP-2105, manufactured by Toa Gosei Kagaku Kogyo Co., Ltd.) | 2 parts |
| Urethane-modified silicone oil (Diaroma SP-2105, manufactured by Dainichiseika Kogyo Co., Ltd.) | 0.5 part |
| Methyl ethyl ketone | 70 parts |
| Toluene | 20 parts |

<Cyan Ink Layer Forming Coating Composition>

| | |
|---|---|
| Cyan dye (Compound C-1) | 1.5 parts |
| Cyan dye (Compound C-2) | 1.5 parts |
| Polyvinyl acetal (Denka Butyral KY-24, manufactured by Denki Kagaku Kogyo Co., Ltd.) | 5.6 parts |
| Polymethyl methacrylate-modified polystyrene (Rededa GP-200, manufactured by Toa Gosei Kagaku Kogyo Co., Ltd.) | 1 part |
| Urethane-modified silicone oil (Diaroma SP-2105, manufactured by Dainichiseika Kogyo Co., Ltd.) | 0.5 part |

| Methyl ethyl ketone | 70 parts |
| Toluene | 20 parts |

(Preparation of Ink Sheet for Fusion Type Thermal Transfer Recording)

Said ink sheet was obtained by applying an ink layer forming coating composition having the composition described below onto a 6 μm thick polyethylene terephthalate sheet of which reverse surface had been subjected to fusion resistant treatment to obtain a thickness of 2 μm and by subsequently drying the resulting coating.

<Ink Layer Forming Coating Composition>

| Carnauba wax | 1 part |
| Ethylene vinyl acetate copolymer (EV40Y, manufactured by Mitsui Dupont Chemical Co.) | 1 part |
| Carbon black | 3 parts |
| Phenol resin (Tamanoru 521, manufactured by Arakawa Kagaku Kogyo Co., Ltd.) | 5 parts |
| Methyl ethyl ketone | 90 parts |

(Formation of Portrait Image)

An image receiving layer was brought into contact with the ink surface of an ink sheet for sublimation type thermal transfer recording, and heating was carried out from the ink sheet side under conditions of an output of 0.23 W/dot, a pulse width of 0.3 to 4.5 m/second, and a dot density of 16 dots/mm, employing a thermal head, and a portrait image with gradations was formed on said image receiving layer. In the resulting image, the aforementioned dyes are allowed to react with nickel to form a complex.

(Formation of Text Information)

An OP nisu section was brought into contact with the ink surface of an ink sheet for fusion type thermal transfer recording, and heating was carried out from the ink sheet side under conditions of an output of 0.5 W/dot, a pulse width of 1.0 m/second, and a dot density of 16 dots/mm, employing a thermal head, and text information was formed on said OP nisu.

As described above, cards, which are provided with the portrait image, attribute information, and format printing, were formed.

Preparation of Transfer Foil 1

A releasing layer, an interlayer, and an adhesive layer, having the formulas described below were applied onto one surface of polyethylene terephthalate (S-25) manufactured by Diafoil Hoechst Co., Ltd., employing wire bar coating and subsequently dried to obtain Transparent Protective Layer Transfer Foil 1.

(Releasing Layer) Layer Thickness 0.5 μm

| Acryl based resin (Dianal BR-87, manufactured by Mitsubishi Rayon Co., Ltd.) | 5 parts |
| Polyvinyl acetoacetal (having an SP value of 9.4) (KS-1, manufactured by Sekisui Kagaku Co., Ltd.) | 5 parts |
| Methyl ethyl ketone | 40 parts |
| Toluene | 50 parts |

(Interlayer) Layer Thickness 2 μm

| Styrene based resin (Septon 2006, manufactured by Kuraray Co., Ltd.) | 5 parts |
| Polyvinyl butyral resin (BL-S, manufactured by Sekisui Kagaku Co., Ltd.) | 5 parts |
| Toluene | 90 parts |

(Adhesive Layer) Layer Thickness 2 μm

| Styrene based resin (Toughtech M-1953, manufactured by Asahi Kasei Co., Ltd.) | 6 parts |
| Alicyclic saturated hydrocarbon resin (Arukon P100, manufactured by Arakawa Kagaku Co., Ltd.) | 3.5 parts |
| Calcium carbonate (Tamapearl TP-123, manufactured by Okutama Kogyo Co., Ltd.) | 0.5 part |
| Toluene | 90 parts |

Transfer Foil 1 comprised of the releasing layer, the interlayer, and the adhesive layer, having the compositions described above, was prepared.

Further, each example having the transparent protective layer composed as described above, as well as the transfer foil described in the comparative example was brought into contact with the aforementioned image receiving body on which an image as well as a text had been recorded, and the surface was heated to 200° C. Thermal transfer was then carried out at a pressure of 150 kg/cm$^2$, employing a 5 cm diameter heated roller having a rubber hardness of 85 for 1.2 seconds.

Example 1

The aforementioned ultraviolet radiation-hardened resin containing coating composition was applied onto said image receiving body, onto which said Transfer Foil 1 had been transferred, to obtain a coating weight of 20 g/m$^2{}_1$ employing a gravure roll coater having a specified pattern, and said ultraviolet radiation-hardened resin containing coating composition (Binder Resin Layers 1, 2, and 3 shown in Table A) was hardened at the hardening conditions described below to form an ultraviolet radiation-hardened protective layer.

Hardening Conditions

Radiation emitting source: high pressure mercury lamp with 60 w/cm$^2$

Irradiation distance: 10 cm

Irradiation mode: radiation scanning at 3 cm/second

Evaluation Method

Scratch resistance of each sample prepared as described above was evaluated.

Preparation of Transfer Foil 2

A releasing layer, an interlayer, and an adhesive layer, having the formulas described below were applied onto one surface of polyethylene terephthalate (S-25) manufactured by Diafoil Hoechst Co., Ltd., employing wire bar coating and subsequently dried to obtain Transparent Protective Layer Transfer Foil 2.

(Releasing Layer) Layer Thickness 0.5 μm

| Acryl based resin (Dianal BR-87, manufactured by Mitsubishi Rayon Co., Ltd.) | 5 parts |

-continued

| | |
|---|---|
| Polyvinyl acetoacetal<br>(having an SP value of 9.4)<br>(KS-1, manufactured by Sekisui Kagaku Co., Ltd.) | 5 parts |
| Methyl ethyl ketone | 40 parts |
| Toluene | 50 parts |

(Optical Variable Device Layer) Thickness 2 μm Hologram Image
(Adhesive Layer) Thickness 2 μm

| | |
|---|---|
| Styrene based resin<br>(Toughtech M-1953, manufactured by Asahi Kasei Co., Ltd.) | 6 parts |
| Alicyclic saturated hydrocarbon resin<br>(Arukon P100, manufactured by Arakawa Kagaku Co., Ltd.) | 3.5 parts |
| Calcium carbonate<br>(Tamapearl TP-123,<br>manufactured by Okutama Kogyo Co., Ltd.) | 0.5 part |
| Toluene | 90 parts |

Transfer Foil 2 comprised of the releasing layer, the hologram image layer, and the adhesive layer, having the compositions described above, was prepared.

Further, each example having the transparent protective layer composed as described above, as well as the transfer foil described in the comparative example was brought into contact with the aforementioned image receiving body on which an image as well as a text had been recorded, and the surface was heated to 200° C. Thermal transfer was then carried out at a pressure of 150 kg/cm², employing a 5 cm diameter heated roller having a rubber hardness of 85 for 1.2 seconds.

Example 2

The aforementioned ultraviolet radiation-hardened resin containing coating composition was applied onto said image receiving body, onto which said Transfer Foil 2 had been transferred, to obtain a coating weight of 20 g/m², employing a gravure roll coater having a specified pattern, and said ultraviolet radiation-hardened resin containing coating composition (Binder Resin Layers 1, 2, and 3 shown in FIG. 17) was hardened at the hardening conditions described below to form an ultraviolet radiation-hardened protective layer.
Hardening Conditions
    Radiation emitting source: high pressure mercury lamp with 60 w/cm²
    Irradiation distance: 10 cm
    Irradiation mode: radiation scanning at 3 cm/second
Evaluation Method
    Scratch resistance of each sample prepared as described above was evaluated.

Example 3
Preparation of Protection Providing Transfer Foil
    An actinic light-hardened layer forming coating composition, an interlayer forming coating composition, and an adhesive layer forming coating composition were multilayered in said order onto the releasing layer on a 20 μm thick polyethylene terephthalate film 2, provided with said releasing layer comprised of a 0.1 μm thick fluorine resin layer, and subsequently dried to prepare a thermal transfer foil.
<Actinic Light-hardened Layer Forming Coating Composition>
    Binder Resin Layers 1 through 17, shown in the Table A, were employed.

Hardening after coating was carried out in such a manner that a high pressure mercury lamp of 160 W/cm² was employed at an irradiation distance of 18 cm and an irradiation scanning at a CS of 5 m.

The coating thickness was 5.0 μm.

<Interlayer Forming Coating Composition>Layer Thickness 1.0 μm

| | |
|---|---|
| Polyvinyl butyral resin described in Table 1<br>(Esurekku B Series, manufactured by Sekisui Kagaku Co., Ltd.) | 10 parts |
| Methyl ethyl ketone | 90 parts |
| Toughtech M-1953 (Asahi Kasei) | 1 part |
| Hardening during addition of the hardening agent<br>was carried out at 50° C. for 24 hours. | |

<Adhesive Layer Forming Coating Composition>Layer Thickness 0.5 μm

| | |
|---|---|
| Urethane-modified ethylene ethyl acrylate copolymer<br>(Hitech S5254B,<br>manufactured by Toho Kagaku Kogyo Co., Ltd.) | 8 parts |
| Polyacrylic acid ester copolymer<br>(Jurimar AT510, manufactured by Nippon Junyaku Co., Ltd.) | 2 parts |
| Water | 45 parts |
| Ethanol | 45 parts |

Formation of Protective Layer onto Card

The recording surface of a card, which had been c prepared in Table 1, was faced with the surface of a transfer layer, and transfer was carried out in such a manner that the surface of a heated roller comprised of a metal roller with an outer diameter of 3 cm, which was provided with silicone rubber (having a rubber hardness of 80) on its circumferential surface, was heated to 190° C., and pressure was applied from the thermal transfer sheet side under conditions of a transfer speed of 23 mm/second and a linear pressure of 10 kg/cm. Thus, a protective layer was formed on said card by peeling the thermal transfer sheet.

Example 4

Preparation of Protection Providing Transfer Foil

An actinic light-hardened layer forming coating composition, a hologram layer, an interlayer forming coating composition, and an adhesive layer forming coating composition were multilayered in said order onto the releasing layer on a 20 μm thick polyethylene terephthalate film 2, provided with said releasing layer comprised of a 0.1 μm thick fluorine resin layer, and subsequently dried to prepare a thermal transfer foil.

<Actinic Light-hardened Layer Forming Coating Composition>

Binder resin layers 4 through 17, shown in the Table A, were employed.

Hardening after coating was carried out in such a manner that a high pressure mercury lamp of 160 W/cm² was employed at an irradiation distance of 18 cm and a light scanning at a CS of 5 m. The coating thickness was 5.0 μm.

(Optical Variable Device Layer) Layer Thickness 2 μm
Hologram Image
<Interlayer Forming Coating Composition>Layer Thickness 1.0 μm

| | |
|---|---|
| Polyvinyl butyral resin described in Table 1 (Esurekku B Series, manufactured by Sekisui Kagaku Co., Ltd.) | 10 parts |
| Methyl ethyl ketone | 90 parts |
| Toughtech M-1953 (Asahi Kasei) | 1 part |
| Hardening during addition of the hardening agent was carried out at 50° C. for 24 hours. | |

<Adhesive Layer Forming Coating Composition>Layer Thickness 0.5 μm

| | |
|---|---|
| Urethane-modified ethylene ethyl acrylate copolymer (Hitech S5254B, manufactured by Toho Kagaku Kogyo Co., Ltd.) | 8 parts |
| Polyacrylic acid ester copolymer (Jurimar AT510, manufactured by Nippon Junyaku Co., Ltd.) | 2 parts |
| Water | 45 parts |
| Ethanol | 45 parts |

Formation of Protective Layer onto Card

The recording surface of a card, having portrait image, identification information and format printing, was faced with the surface of a transfer layer, and transfer was carried out in such a manner that the surface of a heated roller comprised of a metal roller with an outer diameter of 3 cm, which was provided with silicone rubber (having a rubber hardness of 80) on its circumferential surface, was heated to 190° C., and pressure was applied from the thermal transfer sheet side under conditions of a transfer speed of 23 mm/second and a linear pressure of 10 kg/cm. Thus, a protective layer was formed on said card by peeling the thermal transfer sheet.

Example 5
Preparation of Protection Providing Transfer Foil

An actinic light-hardened layer forming coating composition, a hologram layer, and an adhesive layer forming coating composition were multilayered in said order onto the releasing layer on a 20 μm thick polyethylene terephthalate film 2, provided with said releasing layer comprised of a 0.1 μm thick fluorine resin layer, and subsequently dried to prepare a thermal transfer foil.
<Actinic Light-hardened Layer Forming Coating Composition>

Binder resin layers 4 through 17, shown in the Table A, were employed.

Hardening after coating was carried out in such a manner that a high pressure mercury lamp of 160 W/cm² was employed at an irradiation distance of 18 cm and a light scanning at a CS of 5 m. The coating thickness was 5.0 μm.
(Optical Variable Device Layer) Layer Thickness 2 μm
Hologram Image
<Adhesive Layer Forming Coating Composition> Layer Thickness 0.5 μm

| | |
|---|---|
| Urethane-modified ethylene ethyl acrylate copolymer (Hitech S5254B, manufactured by Toho Kagaku Kogyo Co., Ltd.) | 8 parts |
| Polyacrylic acid ester copolymer (Jurimar AT510, manufactured by Nippon Junyaku Co., Ltd.) | 2 parts |
| Water | 45 parts |
| Ethanol | 45 parts |

Formation of Protective Layer onto Card

The recording surface of a card similar to Example 4 was faced with the surface of a transfer layer, and transfer was carried out in such a manner that the surface of a heated roller comprised of a metal roller with an outer diameter of 3 cm, which was provided with silicone rubber (having a rubber hardness of 80) on its circumferential surface, was heated to 190° C., and pressure was applied from the thermal transfer sheet side under conditions of a transfer speed of 23 mm/second and a linear pressure of 10 kg/cm. Thus, a protective layer was formed on said card by peeling the thermal transfer sheet.

Example 6
Preparation of Protection Providing Transfer Foil

An actinic light-hardened layer forming coating composition, a hologram layer, a barrier layer, and an adhesive layer forming coating composition were multilayered in said order onto the releasing layer on a 20 μm thick polyethylene terephthalate film 2, provided with said releasing layer comprised of a 0.1 μm thick fluorine resin layer, and subsequently dried to prepare a thermal transfer foil.
<Actinic Light-hardened Layer Forming Coating Composition>

Binder resin layers 4 through 17, shown in the Table A, were employed.

Hardening after coating was carried out in such a manner that a high pressure mercury lamp of 160 W/cm² was employed at an irradiation distance of 18 cm and a light scanning at a CS of 5 m. The coating thickness was 5.0 μm.
(Optical Variable Device Layer) Layer thickness 2 μm
Hologram Image
(Barrier Layer) Layer Thickness 1.0 μm

| | |
|---|---|
| Polyvnyl butyral resin (Esurekkus BX-1, manufactured by Sekisui Kagaku Kogyo Co., Ltd.) | 10 parts |
| Water | 90 parts |

<Interlayer Forming Coating Composition>Layer thickness 1.0 μm

| | |
|---|---|
| Polyvinyl butyral resin described in Table 1 (Esurekku B Series, manufactured by Sekisui Kagaku Co., Ltd.) | 10 parts |
| Methyl ethyl ketone | 90 parts |
| Toughtech M-1953 (Asahi Kasei) | 1 part |

Hardening during addition of the hardening agent was carried out at 50° C. for 24 hours.

<Adhesive Layer Forming Coating Composition>Layer Thickness 0.5 μm

| Urethane-modified ethylene ethyl acrylate copolymer (Hitech S5254B, manufactured by Toho Kagaku Kogyo Co., Ltd.) | 8 parts |
|---|---|
| Polyacrylic acid ester copolymer (Jurimar AT510, manufactured by Nippon Junyaku Co., Ltd.) | 2 parts |
| Water | 45 parts |
| Ethanol | 45 parts |

Formation of Protective Layer onto Card

The recording surface of a card, which had been prepared in Table 1, was faced with the surface of a transfer layer, and transfer was carried out in such a manner that the surface of a heated roller comprised of a metal roller with an outer diameter of 3 cm, which was provided with silicone rubber (having a rubber hardness of 80) on its circumferential surface, was heated to 190 ° C., and pressure was applied from the thermal transfer sheet side under conditions of a transfer speed of 23 mm/second and a linear pressure of 10 kg/cm. Thus, a protective layer was formed on said card by peeling the thermal transfer sheet.

Example 7
Preparation of Protection Providing Transfer Foil

An actinic light-hardened layer forming coating composition, a hologram layer, a barrier layer, and an adhesive layer forming coating composition were multilayered in said order onto the releasing layer on a 20 μm thick polyethylene terephthalate film 2, provided with said releasing layer comprised of a 0.1 μm thick fluorine resin layer, and subsequently dried to prepare a thermal transfer foil.

<Actinic Light-hardened Layer Forming Coating Composition>

Binder Resin Layers 4 through 17, shown in the Table A, were employed.

Hardening after coating was carried out in such a manner that a high pressure mercury lamp of 160 W/cm was employed at an irradiation distance of 18 cm and a light scanning at a CS of 5 m. The coating thickness was 5.0 μm.

<Adhesive Layer Forming Coating Composition>Layer Thickness 0.5 μm

| Urethane-modified ethylene ethyl acrylate copolymer (Hitech S5254B, manufactured by Toho Kagaku Kogyo Co., Ltd.) | 8 parts |
|---|---|
| Polyacrylic acid ester copolymer (Jurimar AT510, manufactured by Nippon Junyaku Co., Ltd.) | 2 parts |
| Water | 45 parts |
| Ethanol | 45 parts |
| (Optical Variable Device Layer) Layer thickness | 2 μm |
| Hologram image | 90 parts |

<Interlayer Forming Coating Composition>Layer Thickness 1.0 μm

| Polyvinyl butyral resin described in Table 1 (Esurekku B Series, | 10 parts |
|---|---|

| manufactured by Sekisui Kagaku Co., Ltd.) | |
|---|---|
| Methyl ethyl ketone | 90 parts |
| Toughtech M-1953 (Asahi Kasei) | 1 part |

Hardening during addition of the hardening agent was carried out at 50° C. for 24 hours.

<Adhesive Layer Forming Coating Composition>Layer Thickness 0.5 μm

| Urethane-modified ethylene ethyl acrylate copolymer (Hitech S5254B, manufactured by Toho Kagaku Kogyo Co., Ltd.) | 8 parts |
|---|---|
| Polyacrylic acid ester copolymer (Jurimar AT510, manufactured by Nippon Junyaku Co., Ltd.) | 2 parts |
| Water | 45 parts |
| Ethanol | 45 parts |

Formation of Protective Layer onto Card

The recording surface of a card, which had been prepared in Table 1, was faced with the surface of a transfer layer, and transfer was carried out in such a manner that the surface of a heated roller comprised of a metal roller with an outer diameter of 3 cm, which was provided with silicone rubber (having a rubber hardness of 80) on its circumferential surface, was heated to 190° C., and pressure was applied from the thermal transfer sheet side under conditions of a transfer speed of 23 mm/second and a linear pressure of 10 kg/cm. Thus, a protective layer was formed on said card by peeling the thermal transfer sheet.

(Evaluation Method of Scratch Resistance (Abrasion Resistance))

A wear resistance tester (Heidon-18) was employed. Each surface of prepared cards or forgery altetration preventing cards was slid with a 0.1 mmφ sapphire needle while varying a load of 200 g to 300 g. At the time, a portion, in which abrasion was caused, was observed, and the load in g, which resulted in the abrasion, was recorded. Tables A, B, C, D and E show the results.

[Static Friction Coefficient]

A Tribogear Heidon Type 14DR (manufactured by Shinto Kagaku Co., Ltd.) was employed for measurement. Each of the cards or forgery altetration preventing cards was fixed on a measurement table, and measurement was carried out under conditions of a load of 100 g and a speed of 600 mm/minute. Tables A, B, C, D and E show the results.

(Evaluation of Blocking Properties of Transfer Foil During Storage for an Extended Period of Time)

Each load of 10 g/cm$^2$, 50 g/cm$^2$, and 100 g/cm$^2$ was applied to each of prepared transfer foils, and the loaded foils were stored at 40° C. and 60% for one month in a thermostat. The surface of the transfer foil was then observed.

A: no difference was observed from the initial surface.
B: slight pressure unevenness was observed on the surface.
C: pressure unevenness was clearly observed on the surface.

Further, The transfer foils after completing of the blocking properties test were subjected to transfer to prepare cards, or forgery altetration preventing cards. Then, they were subjected to evaluation of said scratch resistance test. (no variation was preferred.)

(Evaluation of Blocking Properties of Transfer Roll During Storage for an Extended Period of Time)

Specified load in g was applied to prepared transfer rolls. After storing those at 40° C. and 60% for one month in a thermostat, the applied load was released, and the surface was observed.

A: no difference was observed from the initial surface.
B: slight pressure unevenness was observed on the surface.
C: pressure unevenness was clearly observed on the surface.

Further, the transfer foil in the transfer roll after completing of the blocking properties test were subjected to transfer to prepare cards, or forgery alteration preventing cards. Then, they were subjected to evaluation of said scratch resistance test. (no variation was preferred.)

Examples of Resin Layers (Protective Layer Providing Agents)

Each of the resin layers described below was applied at 5.0 $\mu$m and was passed two times at a CS of 5 m under a mercury light of 160 W/cm$^2$. Then, evaluation was carried out.

Examples 95 to 100, relating to two sheets of transferring foil having an actinic light-hardened resin layer, are shown. These examples were conducted in accordance with methods shown in FIGS. 7 and 8. In case that the take up tension was 5,000 g or more, hurt of core was found.

TABLE A

| Binder Resin No. | Actinic Light-hardenable Compound (in parts by weight) | Reaction Initiator (in parts by weight) | Additive | | | | Resin | |
| | | | Non-hardening Resin | Unsaturated Group Containing Resin | Si, F Based Additive | Coupling Agent | Breaking Elongation (in %) | Friction Coefficient |
|---|---|---|---|---|---|---|---|---|
| | | (part 1) | | | | | | |
| 1 | bis(3,4-epoxy-6-methylcyclohexylmethyl)adipate/bisphenols glycidyl ether/1,4-butanediol A glycidyl ether = 70/10/13 in parts | triarylsulfonium antimony 7 parts | — | — | — | — | 76.3 | 0.53 |
| 2 | bis(3,4-epoxy-6-methylcyclohexylmethyl)adipate/bisphenols glycidyl ether/1,4-butanediol A glycidyl ether = 70/10/12.5 parts | triarylsulfonium antimony 7 parts | | | polydimethylsiloxane polymer 0.5 part | | 64.3 | 0.23 |
| 3 | 3,4-epoxycyclohexylmethyl-3,4-epoxycyclohexanecarboxylate/trimethylolpropane triglycidyl ether = 70/19.5 parts | triarylsulfonium antimony 10 parts | — | — | polydimethylsiloxane polymer 0.5 part | — | 67.4 | 0.22 |
| 4 | pentaerythritol acrylate/1,3-butanediol methacrylate = 60/35 parts | Irugacure 184, manufactured by Nihon Ciba Geigy 5 parts | — | — | — | — | 3.38 | 0.56 |
| | | (part 2) | | | | | | |
| 5 | PTMGA-250 manufactured by Kyoei Co./A-9300 manufactured by Shin-Nakamura Kagaku = 10/85 parts | Irugacure 184, manufactured by Nihon Ciba Geigy 5 parts | — | — | — | — | 21.4 | 0.57 |
| 6 | Nihon Kayaku DPHA = 95 | Irugacure 184, manufactured by Nihon Ciba Geigy 5 parts | — | — | — | — | 1.86 | 0.63 |
| 7 | Shin-Nakamura Kagaku UA-6HA = 25 parts | Irugacure 184, manufactured by Nihon Ciba Geigy 5 parts | — | — | — | — | 2.01 | 0.61 |
| 8 | pentaerythritol triacrylate/1,3-butanediol methacrylate = 60/35 parts | Irugacure 184, manufactured by Nihon Ciba Geigy 5 parts | Mitsubishi Rayon Dianal br-87/Sekisui Kagaku Esurekkusu BL-S = 5/5 parts | — | — | — | 3.38 | 0.56 |

TABLE A-continued

| Binder Resin No. | Actinic Light-hardenable Compound (in parts by weight) | Reaction Initiator (in parts by weight) | Additive | | | | Resin Breaking Elongation (in %) | Friction Coefficient |
| --- | --- | --- | --- | --- | --- | --- | --- | --- |
| | | | Non-hardening Resin | Unsaturated Group Containing Resin | Si, F Based Additive | Coupling Agent | | |

(part 3)

| 9 | pentaerythritol triacrylate/1,3-butanediol methacrylate = 60/35 parts | Irugacure 184, manufactured by Nihon Ciba Geigy 5 parts | — | compound of Synthesis Example 1 20 parts | — | — | 31.4 | 0.56 |
| 10 | pentaerythritol triacrylate/1,3-butanediol methacrylate = 60/35 parts | Irugacure 184, manufactured by Nihon Ciba Geigy 5 parts | — | compound of Synthesis Example 1 20 | — | — | 42.3 | 0.49 |
| 11 | pentaerythritol triacrylate/1,3-butanediol methacrylate = 60/35 parts | Irugacure 184, manufactured by Nihon Ciba Geigy 5 parts | — | MAC-2101, manufactured by Nihon Uniker Co. 20 parts | | — | 3.38 | 0.23 |

(part 4)

| 14 | pentaerythritol triacrylate/1,3-butanediol methacrylate = 60/35 parts | Irugacure 184, manufactured by Nihon ciba Geigy 5 parts | — | compound of Synthesis Example 1 20 parts | Dainippon Ink surface active agent F-177 0.5 part | — | 30.87 | 0.23 |
| 15 | pentaerythritol triacrylate/1,3-butanediol methacrylate = 60/35 parts | Irugacure 184, manufactured by Nihon Ciba Geigy 5 parts | — | compound of Synthesis Example 2 20 parts | Dainippon Ink surface active agent F-177 0.5 part | — | 40.21 | 0.23 |
| 16 | PTMGA-250 manufactured by Kyoei Co./Shin-Nakamura Kagaku A-B300/Nihon Kayaku DPHA = 10.45/19.5 | Irugacure 184, manufactured by Nihon Ciba Geigy 5 parts | — | compound of Synthesis Example 1 20 | Dainippon Ink surface active agent F-177 0.5 part | — | 52.1 | 0.21 |
| 17 | PTMGA-250 manufactured by Kyoei Co./Shin-Nakamura Kagaku A-B300/Nihon Kayaku DPHA = 10/45/19.5 | Irugacure 184, manufactured by Nihon Ciba Geigy 5 parts | — | compound of Synthesis Example 1 20 | Dainippon Ink surface active agent F-177 0.5 part | — | 75.2 | 0.19 |

TABLE B

| Example No. | Information Base Body | Protective Transfer Foil | Resin Layer No. | Support No. | Example No. | Scratch Resistance (in g) | Properties of Preventing Forgery & Alteration |
| --- | --- | --- | --- | --- | --- | --- | --- |

(part 1-1)

| 1 | 1 | Transfer Foil 1 | 1 | — | 1 | 251 | C |
| 2 | 1 | Transfer Foil 1 | 2 | — | 1 | 287 | C |
| 3 | 1 | Transfer Foil 1 | 3 | — | 2 | 273 | C |
| 4 | 1 | Transfer Foil 2 | 1 | — | 2 | 246 | A |
| 5 | 1 | Transfer Foil 2 | 2 | — | 2 | 264 | A |

TABLE B-continued

| Example No. | Information Base Body | Protective Transfer Foil | Resin Layer No. | Support No. | Example No. | Scratch Resistance (in g) | Properties of Preventing Forgery & Alteration |
|---|---|---|---|---|---|---|---|
| 6 | | Transfer Foil 2 | 3 | — | 2 | 267 | A |
| 8 | | Transfer Foil 2 | 5 | — | 2 | 154 | A |
| 9 | | Transfer Foil 2 | 8 | — | 2 | 139 | A |
| 10 | 1 | Transfer Foil 2 | 15 | — | 3 | 149 | A |
| 11 | 1 | Transfer Foil 1 | 1 | 2 | 3 | 133 | C |
| 12 | 1 | Transfer Foil 1 | 2 | 2 | 3 | 168 | C |
| 13 | 1 | Transfer Foil 1 | 3 | 2 | 3 | 174 | C |
| (part 2-1) | | | | | | | |
| Comparative Example 1 | 1 | Transfer Foil 1 | 4 | 2 | 3 | 120 | C |
| 14 | 1 | Transfer Foil 1 | 5 | 2 | 3 | 135 | C |
| Comparative Example 2 | 1 | Transfer Foil 1 | 6 | 2 | 3 | 114 | C |
| Comparative Example 3 | 1 | Transfer Foil 1 | 7 | 2 | 3 | 121 | C |
| 15 | 1 | Transfer Foil 1 | 8 | 2 | 3 | 196 | C |
| 16 | 1 | Transfer Foil 1 | 9 | 2 | 3 | 164 | C |
| 17 | 1 | Transfer Foil 1 | 10 | 2 | 3 | 187 | C |
| 18 | 1 | Transfer Foil 1 | 11 | 2 | 3 | 157 | C |
| 21 | 1 | Transfer Foil 1 | 14 | 2 | 3 | 245 | C |
| 22 | 1 | Transfer Foil 1 | 15 | 2 | 3 | 223 | C |
| 23 | 1 | Transfer Foil 1 | 16 | 2 | 3 | 206 | C |
| (part 3-1) | | | | | | | |
| 24 | 1 | Transfer Foil 1 | 17 | 2 | 3 | 211 | C |
| 25 | 1 | Transfer Foil 2 | 1 | 2 | 3 | 127 | A |
| 26 | 1 | Transfer Foil 2 | 2 | 2 | 3 | 161 | A |
| 27 | 1 | Transfer Foil 2 | 3 | 2 | 3 | 163 | A |
| Comparative Example 4 | 1 | Transfer Foil 2 | 4 | 2 | 3 | 111 | A |
| 28 | 1 | Transfer Foil 2 | 5 | 2 | 3 | 126 | A |
| Comparative Example 5 | 1 | Transfer Foil 2 | 6 | 2 | 3 | 102 | A |
| Comparative Example 6 | 1 | Transfer Foil 2 | 7 | 2 | 3 | 111 | A |
| 29 | 1 | Transfer Foil 2 | 8 | 2 | 3 | 190 | A |
| 30 | 1 | Transfer Foil 2 | 9 | 2 | 3 | 157 | A |
| 31 | 1 | Transfer Foil 2 | 10 | 2 | 3 | 181 | A |
| 32 | 1 | Transfer Foil 2 | 11 | 2 | 3 | 149 | A |

TABLE B

| | Blocking Properties of Protection Provided Transfer Foil during Storage of an Extended Period | | | | | | Blocking Properties of Transfer Roll (in 400 m roll) Winding Tension Conditions | | | |
|---|---|---|---|---|---|---|---|---|---|---|
| | Visual Evaluation Load Conditions | | | Scratch Evaluation Load Conditions | | | Visual Evaluation Winding Tension Conditions | | Scratch Evaluation Winding Tension Conditions | |
| | 100 g/ cm² | 50 g/ cm² | 10 g/ cm² | 100 g/ cm² | 50 g/ cm² | 10 g/ cm² | 1000 g | 3000 g | 1000 g | 3000 g |
| (part 1-2) | | | | | | | | | | |
| 1 | — | — | — | — | — | — | — | — | — | — |
| 2 | — | — | — | — | — | — | — | — | — | — |
| 3 | — | — | — | — | — | — | — | — | — | — |
| 4 | — | — | — | — | — | — | — | — | — | — |
| 5 | — | — | — | — | — | — | — | — | — | — |
| 6 | — | — | — | — | — | — | — | — | — | — |
| 8 | — | — | — | — | — | — | — | — | — | — |
| 9 | — | — | — | — | — | — | — | — | — | — |
| 10 | — | — | — | — | — | — | — | — | — | — |
| 11 | A | A | A | 133 | 133 | 133 | A | A | 133 | 133 |
| 12 | A | A | A | 168 | 168 | 168 | A | A | 168 | 168 |
| 13 | A | A | A | 172 | 174 | 174 | A | A | 174 | 172 |
| Comparative Example 1 | A | A | A | 119 | 120 | 120 | A | A | 120 | 119 |
| 14 | A | A | A | 135 | 135 | 135 | A | A | 135 | 135 |
| Comparative Example 2 | A | A | A | 111 | 114 | 114 | A | A | 114 | 111 |
| (part 2-2) | | | | | | | | | | |
| Comparative Example 3 | A | A | A | 113 | 117 | 121 | A | A | 117 | 113 |
| 15 | A | A | A | 194 | 196 | 196 | A | A | 196 | 194 |
| 16 | A | A | A | 164 | 164 | 164 | A | A | 164 | 164 |
| 17 | A | A | A | 185 | 185 | 187 | A | A | 185 | 185 |
| 18 | A | A | A | 154 | 155 | 157 | A | A | 155 | 154 |
| 21 | A | A | A | 241 | 241 | 245 | A | A | 241 | 241 |
| 22 | A | A | A | 223 | 223 | 223 | A | A | 223 | 223 |
| 23 | A | A | A | 203 | 206 | 206 | A | A | 206 | 203 |
| 24 | A | A | A | 211 | 211 | 211 | A | A | 211 | 211 |
| 25 | A | A | A | 127 | 127 | 127 | A | A | 127 | 127 |
| 26 | A | A | A | 161 | 161 | 161 | A | A | 161 | 161 |
| 27 | A | A | A | 162 | 163 | 163 | A | A | 163 | 162 |
| Comparative Example 4 | A | A | A | 106 | 111 | 111 | A | A | 111 | 106 |
| 28 | A | A | A | 126 | 126 | 126 | A | A | 126 | 126 |
| Comparative Example 5 | A | A | A | 99 | 102 | 102 | A | A | 102 | 99 |
| (part 3-2) | | | | | | | | | | |
| Comparative Example 6 | A | A | A | 106 | 111 | 111 | A | A | 111 | 106 |
| 29 | A | A | A | 190 | 190 | 190 | A | A | 190 | 190 |
| 30 | A | A | A | 157 | 157 | 157 | A | A | 157 | 157 |
| 31 | A | A | A | 176 | 181 | 181 | A | A | 181 | 176 |
| 32 | A | A | A | 149 | 149 | 149 | A | A | 149 | 149 |

TABLE C (part 1)

| Example No. | Information Base Body | Protective Transfer Foil | Resin Layer No. | Support No. | Example No. | Scratch Resistance (in g) | Properties of Preventing Forgery & Alteration |
|---|---|---|---|---|---|---|---|
| 35 | 1 | Transfer Foil 2 | 14 | 2 | 3 | 224 | A |
| 36 | | Transfer Foil 2 | 15 | 2 | 3 | 201 | A |
| 37 | 1 | Transfer Foil 2 | 16 | 2 | 3 | 199 | A |

TABLE C-continued (part 1)

| Example No. | Information Base Body | Protective Transfer Foil | Resin Layer No. | Support No. | Example No. | Scratch Resistance (in g) | Properties of Preventing Forgery & Alteration |
|---|---|---|---|---|---|---|---|
| 38 | | Transfer Foil 2 | 17 | 2 | 3 | 201 | A |
| 39 | 1 | Transfer Foil 2 | Hardening layer comprised of two layers; from the releasing layer side, No. 12/14 = 0.5 µ/2.5µ | 2 | 3 | 224 | A |
| 40 | 1 | Transfer Foil 2 | Hardening layer comprised of two layers; from the releasing layer side, No. 14/12 = 0.5µ/2.5µ | 2 | 3 | 219 | A |
| Comparative Example 7 | 1 | Transfer Foil 1 | 6 | 1 | 3 | 114 | C |
| 41 | | Transfer Foil 1 | 8 | 1 | 3 | 196 | C |
| 42 | 1 | Transfer foil 1 | 15 | 1 | 3 | 223 | C |
| Comparative Example 8 | 1 | Transfer Foil 2 | 6 | 1 | 3 | 102 | A |
| 43 | 1 | Transfer Foil 2 | 8 | 1 | 3 | 190 | A |
| 44 | 1 | Transfer Foil 2 | 15 | 1 | 3 | 201 | A |
| Comparative Example 9 | 1 | — | — | 4 | 2 | 4 | 112 | A |
| 45 | 1 | — | — | 5 | 2 | 4 | 128 | A |
| Comparative Example 10 | 1 | — | — | 6 | 2 | 4 | 111 | A |
| Comparative Example 12 | 1 | — | — | 7 | 2 | 4 | 119 | A |
| 46 | 1 | — | — | 8 | 2 | 4 | 203 | A |
| 47 | 1 | — | — | 9 | 2 | 4 | 164 | A |
| 48 | 1 | — | — | 10 | 2 | 4 | 192 | A |
| 49 | 1 | — | — | 11 | 2 | 4 | 151 | A |
| 52 | 1 | — | — | 14 | 2 | 4 | 228 | A |
| 53 | 1 | — | — | 15 | 2 | 4 | 227 | A |
| 54 | 1 | — | — | 16 | 2 | 4 | 213 | A |
| 55 | 1 | — | — | 17 | 2 | 4 | 214 | A |
| 56 | 1 | — | — | Hardening layer comprised of two layers; from the releasing side, No. 12/14 = 0.5µ/2.5µ | 2 | 4 | 245 | A |
| 57 | 1 | — | — | Hardening layer comprised of two layers; from the releasing layer side, No. 14/12 = 0.5µ/2.5µ | 2 | 4 | 221 | A |
| Comparative Example 13 | 1 | — | — | 6 | 1 | 4 | 111 | A |
| 58 | 1 | — | — | 8 | 1 | 4 | 203 | A |
| Comparative Example 14 | 1 | — | — | 4 | 2 | 4 | 107 | A |
| 59 | 1 | — | — | 5 | 2 | 4 | 129 | A |
| Comparative Example 15 | 1 | — | — | 6 | 2 | 4 | 98 | A |
| Comparative Example 16 | 1 | — | — | 7 | 2 | 4 | 106 | A |
| 60 | 1 | — | — | 8 | 2 | 4 | 187 | A |
| 61 | 1 | — | — | 9 | 2 | 4 | 152 | A |

TABLE C (part 2)

| | Blocking Properties of Protection Provided Transfer Foil during Storage of an Extended Period | | | | | | Blocking Properties of Transfer Roll (in 400 m roll) Winding Tension Conditions | | | |
|---|---|---|---|---|---|---|---|---|---|---|
| | Visual Evaluation Load Conditions | | | Scratch Evaluation Load Conditions | | | Visual Evaluation Winding Tension Conditions | | Scratch Evaluation Winding Tension Conditions | |
| | 100 g/ cm$^2$ | 50 g/ cm$^2$ | 10 g/ cm$^2$ | 100 g/ cm$^2$ | 50 g/ cm$^2$ | 10 g/ cm$^2$ | 1000 g | 3000 g | 1000 g | 3000 g |
| 35 | A | A | A | 224 | 224 | 224 | A | A | 224 | 224 |
| 36 | A | A | A | 201 | 201 | 201 | A | A | 201 | 201 |
| 37 | A | A | A | 199 | 199 | 199 | A | A | 199 | 199 |
| 38 | A | A | A | 201 | 261 | 201 | A | A | 201 | 201 |
| 39 | A | A | A | 222 | 224 | 224 | A | A | 224 | 222 |
| 40 | A | A | A | 219 | 224 | 224 | A | A | 224 | 219 |
| Comparative Example 7 | C | A | A | IT | 84 | 111 | A | C | 111 | IT |
| 41 | C | A | A | IT | 134 | 192 | A | C | 192 | IT |
| 42 | C | A | A | IT | 163 | 221 | A | C | 221 | IT |
| Comparative Example 8 | C | A | A | IT | 76 | 99 | A | C | 99 | IT |
| 43 | C | A | A | IT | 142 | 186 | A | C | 186 | IT |
| 44 | C | A | A | IT | 164 | 194 | A | C | 194 | IT |
| Comparative Example 9 | A | A | A | 111 | 112 | 112 | A | A | 111 | 102 |
| 45 | A | A | A | 128 | 128 | 128 | A | A | 128 | 128 |
| Comparative Example 10 | A | A | A | 111 | 111 | 111 | A | A | 111 | 111 |
| Comparative Example 12 | A | A | A | 119 | 119 | 119 | A | A | 119 | 119 |
| 46 | A | A | A | 195 | 203 | 203 | A | A | 203 | 195 |
| 47 | A | A | A | 164 | 164 | 164 | A | A | 164 | 164 |
| 48 | A | A | A | 192 | 192 | 192 | A | A | 192 | 192 |
| 49 | A | A | A | 149 | 151 | 151 | A | A | 151 | 149 |
| 52 | A | A | A | 228 | 228 | 228 | A | A | 228 | 228 |
| 53 | A | A | A | 227 | 227 | 227 | A | A | 227 | 224 |
| 54 | A | A | A | 213 | 213 | 213 | A | A | 213 | 213 |
| 55 | A | A | A | 214 | 214 | 214 | A | A | 214 | 211 |
| 56 | A | A | A | 245 | 254 | 254 | A | A | 245 | 245 |
| 57 | A | A | A | 219 | 221 | 221 | A | A | 221 | 221 |
| Comparative Example 13 | A | C | A | IT | 77 | 77 | A | C | 90 | IT |
| 58 | A | C | A | IT | 153 | 153 | A | C | 176 | IT |
| Comparative Example 14 | A | A | A | 105 | 107 | 107 | A | A | 107 | 99 |
| 59 | A | A | A | 129 | 129 | 129 | A | A | 129 | 128 |
| Comparative Example 15 | A | A | A | 95 | 98 | 98 | A | A | 98 | 98 |
| Comparative Example 16 | A | A | A | 106 | 106 | 106 | A | A | 106 | 106 |
| 60 | A | A | A | 187 | 187 | 187 | A | A | 187 | 187 |
| 61 | A | A | A | 152 | 152 | 152 | A | A | 152 | 152 |

TABLE D (part 1)

| Example No. | Information Base Body | Protective Transfer Foil | Resin Layer No. | Support No. | Example No. | Scratch Resistance (in g) | Properties of Preventing Forgery & Alteration |
|---|---|---|---|---|---|---|---|
| 62 | 1 | — | — | 10 | 2 | 5 | 182 | A |
| 63 | 1 | — | — | 11 | 2 | 5 | 138 | A |
| 66 | 1 | — | — | 14 | 2 | 5 | 224 | A |
| 67 | 1 | — | — | 15 | 2 | 5 | 209 | A |
| 68 | 1 | — | — | 16 | 2 | 5 | 201 | A |
| 69 | 1 | — | — | 17 | 2 | 5 | 203 | A |

TABLE D-continued

(part 1)

| Example No. | Information Base Body | Protective Transfer Foil | Resin Layer No. | Support No. | Example No. | Scratch Resistance (in g) | Properties of Preventing Forgery & Alteration |
|---|---|---|---|---|---|---|---|
| Comparative Example 17 | 1 | — | — | 6 | 1 | 5 | 101 | A |
| 70 | 1 | — | — | 8 | 1 | 5 | 211 | A |
| Comparative Example 18 | 1 | — | — | 4 | 2 | 6 | 114 | A |
| 71 | 1 | — | — | 5 | 2 | 6 | 126 | A |
| Comparative Example 19 | 1 | — | — | 6 | 2 | 6 | 104 | A |
| Comparative Example 20 | 1 | — | — | 7 | 2 | 6 | 110 | A |
| 72 | 1 | — | — | 8 | 2 | 6 | 190 | A |
| 73 | 1 | — | — | 9 | 2 | 6 | 159 | A |
| 74 | 1 | — | — | 10 | 2 | 6 | 190 | A |
| 75 | 1 | — | — | 11 | 2 | 6 | 139 | A |
| 78 | 1 | — | — | 14 | 2 | 6 | 231 | A |
| 79 | 1 | — | — | 15 | 2 | 6 | 216 | A |
| 80 | 1 | — | — | 16 | 2 | 6 | 209 | A |
| 81 | 1 | — | — | 17 | 2 | 6 | 207 | A |
| Comparative Example 21 | 1 | — | — | 6 | 1 | 6 | 104 | A |
| 82 | 1 | — | — | 8 | 1 | 6 | 190 | A |
| Comparative Example 22 | 1 | — | — | 4 | 2 | 7 | 112 | A |
| 83 | 1 | — | — | 5 | 2 | 7 | 114 | A |
| Comparative Example 23 | 1 | — | — | 6 | 2 | 7 | 94 | A |
| Comparative Example 24 | — | — | — | 7 | 2 | 7 | 103 | A |
| 84 | 1 | — | — | 8 | 2 | 7 | 186 | A |
| 85 | 1 | — | — | 9 | 2 | 7 | 152 | A |
| 86 | 1 | — | — | 10 | 2 | 7 | 182 | A |
| 87 | 1 | — | — | 11 | 2 | 7 | 136 | A |
| 90 | 1 | — | — | 14 | 2 | 7 | 222 | A |
| 91 | 1 | — | — | 15 | 2 | 7 | 209 | A |
| 92 | 1 | — | — | 16 | 2 | 7 | 201 | A |
| 93 | 1 | — | — | 17 | 2 | 7 | 203 | A |

TABLE D

(part 2)

| | Blocking Properties of Protection Provided Transfer Foil during Storage of an Extended Period | | | | | | Blocking Properties of Transfer Roll (in 400 m roll) Winding Tension Conditions | | | |
|---|---|---|---|---|---|---|---|---|---|---|
| | Visual Evaluation Load Conditions | | | Scratch Evaluation Load Conditions | | | Visual Evaluation Winding Tension Conditions | | Scratch Evaluation Winding Tension Conditions | |
| | 100 g/cm² | 50 g/cm² | 10 g/cm² | 100 g/cm² | 50 g/cm² | 10 g/cm² | 1000 g | 3000 g | 1000 g | 3000 g |
| 62 | A | A | A | 179 | 182 | 182 | A | A | 182 | 182 |
| 63 | A | A | A | 138 | 138 | 138 | A | A | 138 | 138 |
| 66 | A | A | A | 224 | 224 | 224 | A | A | 224 | 224 |
| 67 | A | A | A | 209 | 209 | 209 | A | A | 209 | 207 |
| 68 | A | A | A | 201 | 201 | 201 | A | A | 201 | 201 |
| 69 | A | A | A | 203 | 203 | 203 | A | A | 203 | 203 |
| Comparative Example 17 | C | A | A | IT | 100 | 101 | A | C | 101 | IT |
| 70 | C | A | A | IT | 173 | 211 | A | C | 202 | IT |
| Comparative Example 18 | A | A | A | 115 | 114 | 114 | A | A | 114 | 111 |
| 71 | A | A | A | 124 | 126 | 126 | A | A | 126 | 126 |
| Comparative Example 19 | A | A | A | 99 | 104 | 104 | A | A | 104 | 100 |

TABLE D-continued

(part 2)

| | Blocking Properties of Protection Provided Transfer Foil during Storage of an Extended Period | | | | | | Blocking Properties of Transfer Roll (in 400 m roll) Winding Tension Conditions | | | |
|---|---|---|---|---|---|---|---|---|---|---|
| | Visual Evaluation Load Conditions | | | Scratch Evaluation Load Conditions | | | Visual Evaluation Winding Tension Conditions | | Scratch Evaluation Winding Tension Conditions | |
| | 100 g/ cm² | 50 g/ cm² | 10 g/ cm² | 100 g/ cm² | 50 g/ cm² | 10 g/ cm² | 1000 g | 3000 g | 1000 g | 3000 g |
| Comparative Example 20 | A | A | A | 106 | 104 | 110 | A | A | 110 | 110 |
| 72 | A | A | A | 190 | 190 | 190 | A | A | 190 | 184 |
| 73 | A | A | A | 159 | 159 | 159 | A | A | 159 | 159 |
| 74 | A | A | A | 190 | 190 | 190 | A | A | 190 | 190 |
| 75 | A | A | A | 139 | 139 | 139 | A | A | 139 | 134 |
| 78 | A | A | A | 231 | 231 | 231 | A | A | 231 | 229 |
| 79 | A | A | A | 216 | 216 | 216 | A | A | 216 | 211 |
| 80 | A | A | A | 209 | 209 | 209 | A | A | 209 | 206 |
| 81 | A | A | A | 207 | 207 | 207 | A | A | 207 | 207 |
| Comparative Example 21 | C | B | A | IT | 100 | 101 | A | C | 101 | IT |
| 82 | C | B | A | IT | 137 | 216 | A | C | 196 | IT |
| Comparative Example 22 | A | A | A | 107 | 112 | 112 | A | A | 112 | 112 |
| 83 | A | A | A | 114 | 124 | 114 | A | A | 114 | 114 |
| Comparative Example 23 | A | A | A | 91 | 94 | 94 | A | A | 94 | 94 |
| Comparative Example 24 | A | A | A | 97 | 103 | 103 | A | A | 103 | 101 |
| 84 | A | A | A | 186 | 186 | 186 | A | A | 186 | 186 |
| 85 | A | A | A | 152 | 152 | 152 | A | A | 152 | 152 |
| 86 | A | A | A | 182 | 182 | 182 | A | A | 182 | 179 |
| 87 | A | A | A | 136 | 136 | 136 | A | A | 136 | 136 |
| 90 | A | A | A | 222 | 222 | 222 | A | A | 222 | 222 |
| 91 | A | A | A | 204 | 209 | 209 | A | A | 209 | 209 |
| 92 | A | A | A | 201 | 201 | 201 | A | A | 201 | 200 |
| 93 | A | A | A | 203 | 203 | 203 | A | A | 203 | 203 |

IT: insufficient transfer

TABLE E

(part 1)

| Example No. | Information Base Body | Protective Transfer Foil | Resin Layer No. | Support No. | Example No. | Scratch Resistance (in g) | Properties of Preventing Forgery & Alteration |
|---|---|---|---|---|---|---|---|
| Comparative Example 25 | 1 | — | — | 6 | 1 | 7 | 94 | A |
| 94 | 1 | — | — | 6 | 1 | 7 | 185 | A |
| 95 | 1 | — | — | 10/10 | 2/2 | 3/3 | 270 | A |
| 96 | 1 | — | — | 10/15 | 2/2 | 3/3 | 281 | A |
| 97 | 1 | — | — | 15/15 | 2/2 | 4/3 | 292 | A |
| 98 | 1 | — | — | 15/17 | 2/2 | 3/3 | 265 | A |
| 99 | 1 | — | — | 17/17 | 2/2 | 3/4 | 284 | A |
| 100 | 1 | — | — | 10/17 | 2/2 | 3/3 | 249 | A |

TABLE E (part 2)

| | Blocking Properties of Protection Provided Transfer Foil during Storage of an Extended Period | | | | | | Blocking Properties of Transfer Roll (in 400 m roll) Winding Tension Conditions | | | |
|---|---|---|---|---|---|---|---|---|---|---|
| | Visual Evaluation Load Conditions | | | Scratch Evaluation Load Conditions | | | Visual Evaluation Winding Tension | | Scratch Evaluation Winding Tension | |
| | 100 g/ cm² | 50 g/ cm² | 10 g/ cm² | 100 g/ cm² | 50 g/ cm² | 10 g/ cm² | Conditions | | Conditions | |
| | | | | | | | 1000 g | 3000 g | 1000 g | 3000 g |
| Comparative Example 25 | C | A | A | IT | 91 | 94 | A | C | 89 | IT |
| 94 | C | A | A | IT | 149 | 209 | A | C | 205 | IT |
| 95 | A | A | A | 270 | 269 | 273 | A | A | 271 | 271 |
| 96 | A | A | A | 290 | 273 | 270 | A | A | 269 | 263 |
| 97 | A | A | A | 293 | 281 | 284 | A | A | 270 | 268 |
| 98 | A | A | A | 270 | 253 | 249 | A | A | 259 | 257 |
| 99 | A | A | A | 279 | 218 | 279 | A | A | 280 | 280 |
| 100 | A | A | A | 240 | 243 | 244 | A | A | 250 | 253 |

As described above, the image recording body as well as the transfer foil of the present invention is capable of enhancing security such as prevention of forgery, altetration, and the like, and of minimizing the formation of abrasion as well as wrinkling due to higher abrasion resistance compared to those which are prepared employing conventional methods. Further, they are capable of minimizing adverse effects to the environment. Still further, they are capable of improving the external appearance of said image recording body. Still further, they are capable of increase the speed for providing the protective layer and thus of enhancing the maintainability. Still further, the transfer foil roll of the present invention is capable of minimizing adhesion due to improvement of blocking properties during storage for an extended period of time.

Disclosed embodiments can be varied by a skilled person without departing from the spirit and scope of the present invention.

What is claimed is:

1. A foil transferring a resin layer, comprising a support and an actinic light-hardened resin layer which is transferred, wherein a breaking elongation of the actinic light-hardened resin layer is 5 to 90 percent.

2. The foil of claim 1 wherein the actinic light-hardened resin layer is a UV-hardened resin layer.

3. The foil of claim 1 wherein the actinic light-hardened resin layer comprises an unsaturated group containing resin having an average molecular weight of 5,000 to 50,000.

4. The foil of claim 1 wherein the actinic light-hardened resin layer comprises a compound composed of a monomer having ethylenic unsaturated group or an oligomer having ethylenic unsaturated group.

5. The foil of claim 1 wherein the actinic light-hardened resin layer comprises a non-hardened resin.

6. The foil of claim 1 wherein a surface static friction coefficient of the actinic hardened resin layer is 0.01 to 0.5.

7. The foil of claim 6 wherein the actinic hardened resin layer comprises a silicon or fluorine compound.

8. The foil of claim 7 wherein the silicon or fluorine compound contains an unsaturated group containing silicon or fluorine compound.

9. The foil of claim 6 wherein the actinic light-hardened resin layer comprises a coupling agent.

10. The foil of claim 1 comprising a release layer and an adhesive layer wherein the actinic hardened resin layer is provided on the release layer.

11. The foil of claim 1 wherein at least one side of the support has a central line average roughness (Ra) of 0.05 to 0.5 $\mu$m.

12. The foil of claim 11 wherein the side of the support having the central line average roughness (Ra) of 0.05 to 0.5 $\mu$m is a side on which the actinic light-hardened resin layer is not provided.

13. An image recording body comprising a support, an image recording layer and an actinic light-hardened resin layer forming outermost layer, wherein a breaking elongation of the actinic light-hardened resin layer is 5 to 90 percent.

14. The image recording body of claim 13 wherein the actinic light-hardened resin layer is a UV-hardened resin layer.

15. The image recording body of claim 13 wherein the actinic light-hardened resin layer comprises an unsaturated group containing resin having an average molecular weight of 5,000 to 50,000.

16. The image recording body of claim 13 wherein the actinic light-hardened resin layer comprises a compound composed of a monomer having ethylenic unsaturated group or an oligomer having ethylenic unsaturated group.

17. The image recording body of claim 13 comprising two actinic light-hardened resin layers.

18. The image recording body of claim 17 wherein both of the two actinic light-hardened resin layers are transferred from a foil.

19. The image recording body of claim 13 comprising optical variable device layer.

20. The image recording body of claim 13 wherein the actinic light-hardened resin layer is transferred from a foil.

* * * * *